United States Patent
Snoddy et al.

(10) Patent No.: US 8,730,231 B2
(45) Date of Patent: May 20, 2014

(54) SYSTEMS AND METHODS FOR CREATING PERSONALIZED MEDIA CONTENT HAVING MULTIPLE CONTENT LAYERS

(75) Inventors: Jon Hayes Snoddy, Pasadena, CA (US); Jonathan Isaac Strietzel, Lakewood, CA (US); Douglas Alexander Fidaleo, San Diego, CA (US); Michael David Johnson, Long Beach, CA (US)

(73) Assignee: Image Metrics, Inc., Santa Monica, CA (US)

( * ) Notice: Subject to any disclaimer, the term of this patent is extended or adjusted under 35 U.S.C. 154(b) by 1050 days.

(21) Appl. No.: 12/274,268

(22) Filed: Nov. 19, 2008

(65) Prior Publication Data
US 2009/0135176 A1     May 28, 2009

Related U.S. Application Data

(60) Provisional application No. 60/989,251, filed on Nov. 20, 2007, provisional application No. 61/014,680, filed on Dec. 18, 2007, provisional application No. 61/015,083, filed on Dec. 19, 2007, provisional application No. 61/014,353, filed on Dec. 17, 2007.

(51) Int. Cl.
*G06T 15/00* (2011.01)
*G09G 5/00* (2006.01)

(52) U.S. Cl.
USPC .......................... 345/419; 345/629; 345/651

(58) Field of Classification Search
USPC ............................ 345/419, 629, 651
See application file for complete search history.

(56) References Cited

U.S. PATENT DOCUMENTS

| | | | |
|---|---|---|---|
| 4,710,873 | A | 12/1987 | Breslow et al. |
| 5,213,262 | A | 5/1993 | Violette |
| 5,327,521 | A | 7/1994 | Savic et al. |
| 5,821,943 | A | 10/1998 | Shashua |
| 6,044,168 | A | 3/2000 | Tuceryan et al. |
| 6,047,078 | A | 4/2000 | Kang |

(Continued)

FOREIGN PATENT DOCUMENTS

WO    WO 01/63560 A1    8/2001

OTHER PUBLICATIONS

Eric Cosatto and Hans Peter Graf, Sample-Based Synthesis of Photo-Realistic Talking Heads, Dec. 1998, pp. 103-110.*

(Continued)

*Primary Examiner* — Ke Xiao
*Assistant Examiner* — Robert Craddock
(74) *Attorney, Agent, or Firm* — Sunstein Kann Murphy & Timbers LLP

(57) ABSTRACT

Systems and methods are disclosed for creating personalized media content having multiple content layers in "one-click" fashion by selecting a background media template or by using an end-user media composition tool to create or modify a template. For example, the personalized media content can include at least two separate layers, the data of each being stored independently of one another. The two layers may include a background layer including at least one background character and an intermediate layer including an individualized three-dimensional (3D) head model, alignment information, and lighting information. The personalized media content can be displayed by overlaying the background layer using the alignment intermediate layer using the alignment information and the lighting information. In certain examples, template data associated with the background media is created and subsequently used on multiple occasions in generating personalized media content with various 3D head models.

28 Claims, 29 Drawing Sheets

(56) References Cited

U.S. PATENT DOCUMENTS

| | | |
|---|---|---|
| 6,078,701 A | 6/2000 | Hsu et al. |
| 6,141,060 A | 10/2000 | Honey et al. |
| 6,283,858 B1 | 9/2001 | Hayes, Jr. et al. |
| 6,313,835 B1 | 11/2001 | Gever et al. |
| 6,331,861 B1 | 12/2001 | Gever et al. |
| 6,350,199 B1 | 2/2002 | Williams et al. |
| 6,400,828 B2 | 6/2002 | Covell et al. |
| 6,425,825 B1 | 7/2002 | Sitrick |
| 6,492,990 B1 | 12/2002 | Peleg et al. |
| 6,496,598 B1 | 12/2002 | Harmon |
| 6,539,354 B1 | 3/2003 | Sutton et al. |
| 6,556,196 B1 | 4/2003 | Blanz et al. |
| 6,559,845 B1 | 5/2003 | Harvill et al. |
| 6,807,290 B2 | 10/2004 | Liu et al. |
| 6,816,159 B2 | 11/2004 | Solazzi |
| 6,894,686 B2 | 5/2005 | Stamper et al. |
| 6,919,892 B1 | 7/2005 | Cheiky et al. |
| 6,954,498 B1 | 10/2005 | Lipton |
| 6,975,750 B2 | 12/2005 | Yan et al. |
| 6,999,073 B1 | 2/2006 | Zwern et al. |
| 7,016,824 B2 | 3/2006 | Waupotitsch et al. |
| 7,027,054 B1 | 4/2006 | Cheiky et al. |
| 7,103,211 B1 | 9/2006 | Medioni et al. |
| 7,123,263 B2 | 10/2006 | Harvill |
| 7,137,892 B2 | 11/2006 | Sitrick |
| 7,184,071 B2 | 2/2007 | Chellappa et al. |
| 7,212,664 B2 | 5/2007 | Lee et al. |
| 7,218,774 B2 | 5/2007 | Liu |
| 7,224,357 B2 | 5/2007 | Chen et al. |
| 7,257,239 B2 | 8/2007 | Rowe et al. |
| 7,285,047 B2 | 10/2007 | Gilb et al. |
| 7,355,607 B2 | 4/2008 | Harvill |
| 7,415,152 B2 | 8/2008 | Jiang et al. |
| 7,444,195 B2 | 10/2008 | Smith et al. |
| 7,516,072 B2 | 4/2009 | Campbell et al. |
| 7,657,084 B2 | 2/2010 | Ives et al. |
| 7,697,787 B2 | 4/2010 | Illsley |
| 7,706,602 B2 | 4/2010 | Nakashima |
| 7,755,619 B2 | 7/2010 | Wang et al. |
| 7,907,774 B2 | 3/2011 | Parr et al. |
| 7,929,775 B2 | 4/2011 | Hager et al. |
| 8,126,261 B2 | 2/2012 | Medioni et al. |
| 2001/0020946 A1 | 9/2001 | Kawakami et al. |
| 2002/0031252 A1 | 3/2002 | Rozin |
| 2002/0164068 A1 | 11/2002 | Yan |
| 2003/0007700 A1 | 1/2003 | Gutta et al. |
| 2003/0063794 A1 | 4/2003 | Rubinstenn et al. |
| 2003/0091226 A1 | 5/2003 | Cahill et al. |
| 2003/0123713 A1 | 7/2003 | Geng |
| 2004/0041804 A1 | 3/2004 | Ives et al. |
| 2004/0051783 A1 | 3/2004 | Chellappa et al. |
| 2004/0070585 A1 | 4/2004 | Papiernik et al. |
| 2004/0085324 A1 | 5/2004 | Yao |
| 2004/0208344 A1 | 10/2004 | Liu et al. |
| 2004/0223630 A1 | 11/2004 | Waupotitsch et al. |
| 2004/0223631 A1 | 11/2004 | Waupotitsch et al. |
| 2005/0034076 A1 | 2/2005 | Belhumeur et al. |
| 2005/0063582 A1 | 3/2005 | Park et al. |
| 2005/0111705 A1 | 5/2005 | Waupotitsch et al. |
| 2005/0135670 A1 | 6/2005 | Vaidyanathan |
| 2005/0162419 A1 | 7/2005 | Kim et al. |
| 2005/0226509 A1 | 10/2005 | Maurer et al. |
| 2006/0028476 A1 | 2/2006 | Sobel |
| 2006/0067573 A1 | 3/2006 | Parr et al. |
| 2006/0126924 A1 | 6/2006 | Liu et al. |
| 2006/0212353 A1 | 9/2006 | Roslov et al. |
| 2007/0002057 A1 | 1/2007 | Danzig et al. |
| 2007/0061328 A1 | 3/2007 | Ramer et al. |
| 2007/0183653 A1 | 8/2007 | Medioni et al. |
| 2007/0242066 A1 | 10/2007 | Levy Rosenthal |
| 2008/0007567 A1 | 1/2008 | Clatworthy et al. |
| 2008/0019576 A1 | 1/2008 | Senftner et al. |
| 2008/0063263 A1 | 3/2008 | Zhang et al. |
| 2008/0152200 A1 | 6/2008 | Medioni et al. |
| 2008/0152213 A1 | 6/2008 | Medioni et al. |
| 2008/0307052 A1 | 12/2008 | Krishnan et al. |
| 2009/0132371 A1 | 5/2009 | Strietzel et al. |
| 2009/0135177 A1 | 5/2009 | Strietzel et al. |
| 2009/0153552 A1 | 6/2009 | Fidaleo et al. |
| 2009/0202114 A1 | 8/2009 | Morin et al. |

OTHER PUBLICATIONS

Tyler, Denise. Practical Poser 7. Boston, MA: Charles River Media, Dec. 1, 2006. Print, hereafter known as "Tyler".*

Blanz, V., et al., A Morphable Model for the Synthesis of 3D Faces, SIGGRAPH 1999, Proceedings of the 26th Annual Conference on Computer Graphics and Interactive Techniques, Jul. 1999, pp. 187-194.

Boughorbel et al., Estimating 3D camera motion without correspondences using a search for the best structure, Pattern Recognition Letters, Elsevier Science B.V., 2003, vol. 24, pp. 327-337.

Chowdhury, A., et al., Face Reconstruction from Monocular Video Using Uncertainty Analysis and a Generic Model, Computer Vision and Image Understanding, 91 (1-2), Jul.-Aug. 2003, pp. 188-213.

Decarlo, D., et al., The Integration of Optical Flow and Deformable Models with Applications to Human Face Shape and Motion Estimation, Proc. CVPR'96, 1996, pp. 231-238.

Fidaleo, D., et al., An Investigation of Model Bias in 3D Face Tracking, ICCV International Workshop on Analysis and Modeling of Faces and Gestures, Oct. 2005, pp. 1-15, Beijing.

Fua, P., Using Model-Driven Bundle-Adjustment to Model Heads From Raw Video Sequences, Proc. 7th International Conference on Computer Vision, Sep. 1999, vol. 1, pp. 46-53.

Ilic, S., et al., Implicit Meshes for Surface Reconstruction, IEEE Transactions on Pattern Analysis and Machine Intelligence, 28(2), Feb. 2006, pp. 328-333.

Medioni, G., et al., Generation of a 3D Face Model from One Camera, Proc. IEEE Computer Society 16th International Conference on Pattern Recognition, Aug. 2002, vol. 3, pp. 667-671.

Medioni, G., et al., Tensor Voting: Theory and Applications, 12 eme Congres Francophone AFRIF-AFIS . . . (RFIA), 59(3):, Feb. 2000, pp. 10.

Pollefeys, M., et al., Visual Modeling with a Hand-Held Camera, International Journal of Computer Vision, 59(3), Sep. 2004, pp. 207-232.

Romdhani, S., et al., Efficient, Robust and Accurate Fitting of a 3D Morphable Model, Proc. Ninth IEEE International Conference on Computer Vision (ICCV'03), , Oct. 2003, vol. 1, pp. 59-66.

Shan, Y., et al., Model-Based Bundle Adjustment with Application to Face Modeling, Proc. Eighth IEEE International Conference (ICCV'01), Jul. 2001, vol. 2, pp. 644-651.

International Search Report and Written Opinion relating to PCT Application No. PCT/US08/84093 mailed Jan. 23, 2009.

Douglas Fidaleo and Gerard Medioni, Model-Assisted 3D Face Reconstruction from Video, Lecture Notes in Computer Science, Oct. 20, 2007, Springer Berlin/Heidelberg, vol. 4778, pp. 124-138.

Oddcast, Inc.; Oddcast 3D Videostar; Printed from http://www.oddcast.com/home/videostar on Nov. 17, 2008, 4 pages.

Oddcast, Inc.; Create Custom Avatar Models—Turn your photo into an animated speaking avatar!; Printed from http://www.sitepal.com/photo2avatar.pop on Nov. 17, 2008, 1 page.

Gizmoz, Inc.; Gizmoz Home Page; Printed from http://www.gizmoz.com on Nov. 17, 2008, 1 page.

Gizmoz, Inc.; Gizmoz Beta—Create a Clip; Printed from http://www.gizmoz.com/create on Nov. 17, 2008, 1 page.

Gizmoz, Inc.; Gizmoz Beta—Movie Creation; Printed from http://www.gizmoz.com/newsite/widgets/movies/step1.jsp?partner= on Nov. 17, 2008, 1 page.

Chen et al.,, Building 3-D Human Face Models From Two Photographs, Journal of VLSI Signal Processing, 2001, vol. vol. 27, pp. 127-140, Los Angeles, USA.

Mao et al., "Constructing Dense Correspondences,—Facial Change", 1051-4651, ICPR, pp. 1-5., 2004., 2004.

(56) References Cited

OTHER PUBLICATIONS

Carr, et al., "Reconstruction and Representation of 3D Objects with Radial Basis Functions," Proceedings of SIGGRAPH 2001, pp. 67-76, ACM Aug. 2001.

Wookiepedia, The Star Wars Wiki, List of changes in Star Wars re-releases; http://starwars.wikia.com/wiki/List_of_changes_in_Star_wars_re-releases (retrieved Feb. 19, 2012).

Lavagetto, "Converting Speech into Lip Movements: A Multimedia Telephone for Hard of Hearing People," IEEE Transactions on Rehabilitation Engineering, vol. 3, No. 1, Mar. 1995.

* cited by examiner

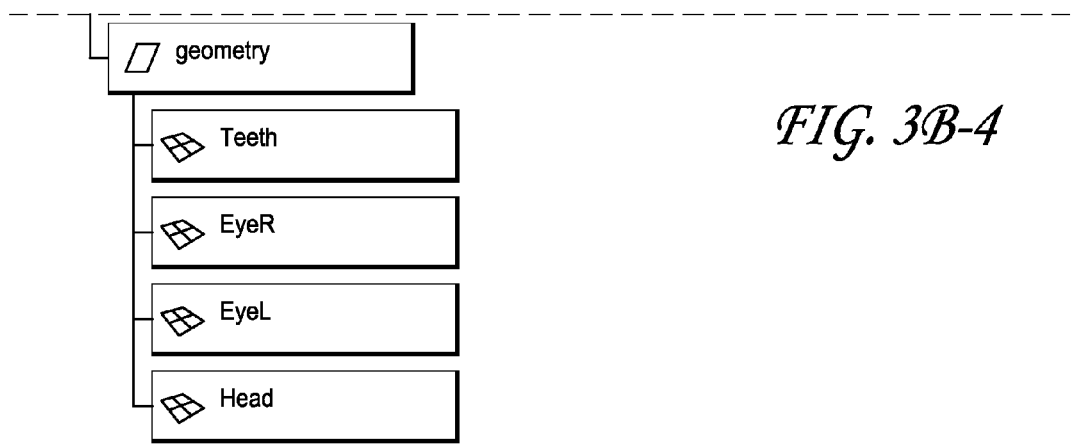
FIG. 3B-4
FIG. 3B
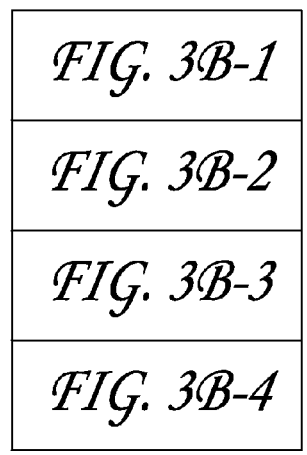

| ADVERTISEMENTS | VIEWER | COMMENT |
|---|---|---|
| 1 | JON | Great scene buddy, but I should be winning |
| 1 | DOUG | NO WAY MAN !!!!!! |
| 2 | GREG | Check this one out guys! |
| 2 | JON | Nice. |
| 2 | ERIC | You are both crazy. |

FIG. 24

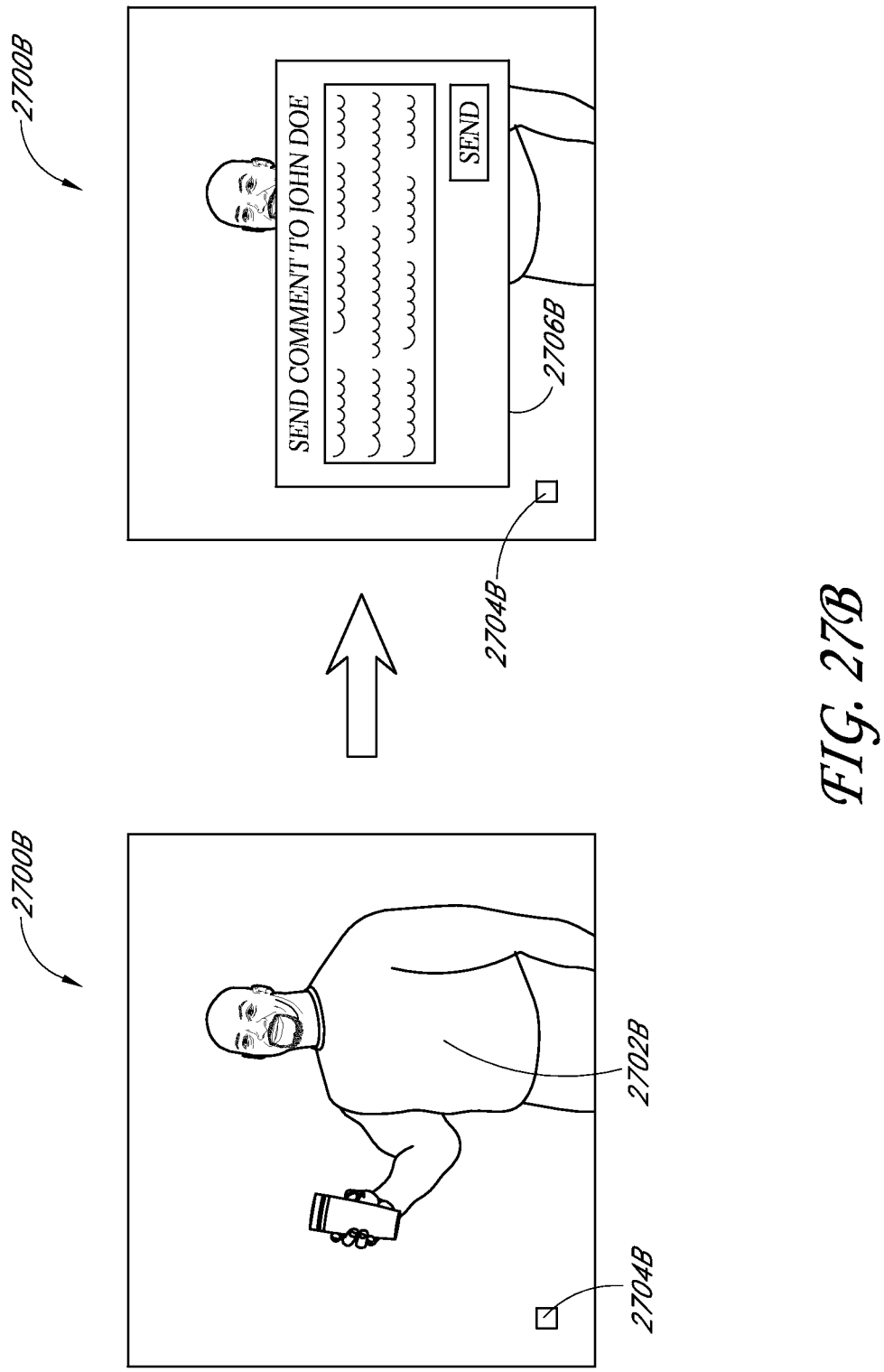

SYSTEMS AND METHODS FOR CREATING PERSONALIZED MEDIA CONTENT HAVING MULTIPLE CONTENT LAYERS

RELATED APPLICATIONS

This application claims priority benefit under 35 U.S.C. §119(e) to the following United States provisional patent applications, each of which is hereby incorporated herein by reference in its entirety to be considered part of this specification:

- U.S. Provisional Patent Application No. 60/989,251, filed Nov. 20, 2007, and entitled "SYSTEMS AND METHODS FOR GENERATING A 3D MODEL OF A HEAD AND FACE";
- U.S. Provisional Patent Application No. 61/014,353, filed Dec. 17, 2007, and entitled "INTERACTIVE ADVERTISING AND NETWORK ACCESSIBLE CONTENT";
- U.S. Provisional Patent Application No. 61/014,680, filed Dec. 18, 2007, and entitled "SYSTEMS AND METHODS FOR VOICE PERSONALIZATION OF VIDEO CONTENT"; and
- U.S. Provisional Patent Application No. 61/015,083, filed Dec. 19, 2007, and entitled "USER COMPOSITION TOOLS AND METHODS FOR CUSTOMIZING IMAGE DATA."

The present application is also related to the following applications filed on even date herewith, each of which is hereby incorporated herein by reference in its entirety:

- U.S. patent application Ser. No. 12/274,226, entitled "SYSTEMS AND METHODS FOR GENERATING INDIVIDUALIZED 3D HEAD MODELS";
- U.S. patent application Ser. No. 12/274,292, entitled "SYSTEMS AND METHODS FOR VOICE PERSONALIZATION OF VIDEO CONTENT"; and
- U.S. patent application Ser. No. 12/274,282, entitled "SYSTEMS AND METHODS FOR INTERACTIVE ADVERTISING USING PERSONALIZED HEAD MODELS".

BACKGROUND

1. Field of the Invention

Embodiments of the invention generally relate to three-dimensional (3D) image animation systems and methods, and more particularly, to systems and methods for personalization of background media content.

2. Description of the Related Art

One of the most intriguing and difficult problems in computer graphics is the creation of life-like human models and the photorealistic animation of those human models. Human head models, or avatars, are becoming increasingly more prevalent in a wide variety of applications, including computer gaming, video gaming, and film making.

One technique for creating a digital human face model requires the conforming of a two-dimensional image (e.g., a photograph) of an individual to a single generic head model. This technique often results in a distorted image that varies substantially from the individual's actual head proportions.

Another technique for generating human face models uses a triangulation system for projecting beams of laser light onto an individual's face. This technique collects the reflection information from a different location relative to the light source and then determines the coordinates of the point or points of reflection by triangulation. The accuracy of this technique may be high for reproducing a life-like model, but such systems can be prohibitively expensive for most consumers.

As can be seen, these and other model-generation techniques have significant drawbacks in that (i) they do not accurately reproduce a model of a user's head, (ii) they can require substantial knowledge to operate, and/or (iii) they are not applicable in many applications in which the average consumer desires them.

SUMMARY

In view of the foregoing, what is needed are improved systems and methods for generating individualized three-dimensional (3D) models of a human head. In certain embodiments, such systems and methods can be used to composite a digital likeness of a user into various forms of background media content, such as video clips, video games, computer games, movies, TV shows, and advertisements. For example, with the advanced features of the Internet and communications devices, it is desirable to provide 3D modeling and animation systems and methods that enable the typical user to rapidly and easily generate a highly accurate, individualized 3D model from his or her image that can be used to create a virtual 3D personality for online interaction with other users.

In certain embodiments of the invention, systems and methods automatically generate a life-like, full 3D head model of an individual based on two-dimensional (2D) image data. For example, in certain embodiments, the user uploads multiple (e.g., three) 2D digital pictures of his or her head to a processing device, which produces an individualized 3D head model that can be further customized with hair, headwear, eyewear, and/or other accessories. Moreover, the user can store several different versions of individualized 3D head models for later use in creating personalized media content.

In certain embodiments, the individualized 3D head model is generated from a blend fit model composed of a weighted combination of multiple basis head models. For instance, each of the basis models can incorporate various facial features and head sizes, the combination of which results in a 3D head model that closely matches the actual appearance of the individual's entire head.

In certain embodiments, the individualized 3D head model generated by the systems and methods described above can be utilized to create and display personalized media content starring the user. Display of the 3D head model data is in some embodiments portrayed as still image data. The portrayal of still image data can occur from a plurality of perspectives to indicate and represent the 3D aspects of the information. In other embodiments, the display of the 3D head model data can occur as video or moving images and can further include animation. Animation of video data can include portrayal of such events as turning or tilting of the head, speaking, blinking, and/or different facial expressions. In yet other embodiments, 2D or 3D representations of an individual other than those generated by the systems and methods for generating individualized 3D head models described above can be used in the personalized media.

Certain embodiments of the invention provide for an end-user composition tool that allows a user to create a personalized piece of image content (e.g., video and/or a still image). The composition tool can comprise, for example, a computer software program executable on a user computer and/or remote server that facilitates compositing a 2D or 3D representation of an individual (e.g., the user) into an image or video template. In certain embodiments, the composition tool allows a user to create new personalized media templates. In other embodiments, a user simply selects a predefined background template and the system automatically generates personalized media content incorporating the user's 3D head model.

Certain embodiments of the invention utilize three separate content layers for creating personalized media content: a background layer, an intermediate layer and a foreground layer. The background layer can comprise a background media file, such as, for example, a video, a still image, an animated cartoon or the like. The intermediate layer comprises an individualized 3D head model. In certain embodiments, the 3D head model is associated with an animation rig, as well as template data, which can comprise movement or alignment information, lighting or illumination information, and/or voice information. The foreground layer comprises masking information that can be still or animated in various embodiments. In certain embodiments, each of these content layers can be stored independently, with the intermediate and foreground layers being layered over the background layer to provide personalized media content starring a user without altering or copying the background layer.

In addition, certain embodiments of the invention enable a user to personalize video content with a voice track. For instance, certain systems and methods allow an individualized 3D head model to be inserted into a video template and facially animated so as to "lip sync" the corresponding voice track. In certain embodiments, the voice track is generated by capturing voice signals of the user through a microphone or other like input device of a computing device. In other embodiments, the voice track can be advantageously generated from voice signals captured through a telephone, such as a landline phone or a cell phone. In yet other embodiments, a user can customize the voice track or corresponding facial animation of the 3D head model by selecting one or more predetermined emotional expressions from a graphical user interface.

Moreover, in other embodiments, voice characteristics of an individual can be acquired from one or more voice samples of the individual. The acquired voice characteristics can then be used to simulate the voice of the individual from a predefined text transcript or from user-inputted text. In other embodiments, a source voice from a predefined background template is transformed into a target voice of the individual using the acquired voice characteristics.

One example of personalized media content is interactive advertisements. Certain embodiments of the invention are directed to systems and methods for providing interactive advertising, wherein an individualized 3D head model of the viewer, or of a person associated with a profile of the viewer, is automatically inserted into a background advertisement. Certain embodiments include the insertion of individualized 3D head models of "buddies" associated with the viewer. These "buddies" can be selected from a buddy list, email history, chat history, comment history on blogs or social networking sites, combinations of the same or the like. Moreover, certain embodiments further include systems and methods for allowing viewers to dynamically create and/or alter the content of interactive advertisements. In addition, certain embodiments allow users to send, save, comment on, and/or rate advertisement banners or other content they see.

In certain embodiments, a method is disclosed for computer modeling a human head. The method includes receiving a plurality of input images comprising a human head, each of the plurality of input images being associated with a different view of the human head. The method also includes reconstructing a textured three-dimensional (3D) face mask from the plurality of input images, the 3D face mask having a non-uniform surface. The method further includes detecting a plurality of first landmark locations of the 3D face mask, each of the plurality of first landmark locations corresponding to selected facial locations of the 3D face mask, and aligning the plurality of first landmark locations of the 3D face mask with a plurality of second landmark locations corresponding to a generic head model. The method also includes comparing the aligned 3D face mask with a plurality of basis head models, each of the plurality of basis head models including a unique set of facial features, and generating a blend fit head model from a combination of selected ones of the plurality of basis head models, the combination of the selected basis head models approximating parameters of the aligned 3D face mask. The method further includes deforming portions of the blend fit head model to approximate the non-uniform surface of the aligned 3D face mask to generate a personalized 3D head model and storing the personalized 3D head model in a memory.

In certain other embodiments, a method is disclosed for computer modeling a human head that includes receiving at least one image comprising at least a frontal portion of a face. The method also includes detecting a plurality of first landmark locations of the at least one image, each of the plurality of first landmark locations corresponding to selected facial locations of the at least one image, and aligning the plurality of first landmark locations of the at least one image with a plurality of second landmark locations corresponding to a generic head model. The method further includes comparing the aligned at least one image with a plurality of basis head models, each of the plurality of basis head models including a unique set of facial features, and generating a blend fit head model from a combination of selected ones of the plurality of basis head models, the combination of the selected basis head models approximating parameters of the aligned at least one image. In certain further embodiments, the blend fit model can optionally be further deformed and/or realigned to approximate one or more characteristics of the at least one image.

In certain embodiments, a system is disclosed for generating a model of a head. The system includes head data representing at least one image comprising at least a frontal portion of a face. The head data further includes first landmark data identifying a plurality of first facial locations of the face. The system also includes generic head model data representing a 3D generic head model, the generic head model data further including second landmark data identifying a plurality of second facial locations of the 3D generic head model. The system also includes basis head model data representing a plurality of 3D basis head models, each of the 3D basis head models having a unique set of facial attributes associated therewith. The system further includes a processor configured to receive the head data, the generic head model data and the basis head model data. The processor is configured to use the received data to align the at least one image with the 3D generic head model by comparing the first landmark data with the second landmark data; to compare the aligned at least one image with the plurality of 3D basis head models; to create, based on the comparison, a 3D blend fit head model from a combination of selected ones of the plurality of 3D basis head models; and to deform portions of the 3D blend fit head model to approximate a non-uniform surface of the aligned at least one image to generate a personalized 3D head model.

In other embodiments, a system is disclosed for modeling a human head. The system includes means for receiving a plurality of first landmark locations of at least one head image of at least a frontal portion of a face, the at least one head image having a non-uniform surface. The system also includes means for aligning the plurality of first landmark locations of the at least one head image with a plurality of second landmark locations corresponding to a generic head model. The system also includes means for comparing the aligned 3D at least one head image with a plurality of basis head models, each of the plurality of basis head models having a unique set of facial features. The system further includes means for generating a blend fit head model from a weighted combination of selected ones of the plurality of basis head models, the weighted combination of the selected basis head models approximating parameters of the aligned at least one head image. The system further includes means for deforming portions of the blend fit head model to approximate the non-uniform surface of the aligned at least one head image to generate a personalized 3D head model.

In certain embodiments, a method is disclosed for generating an audio portion of media content. The method includes receiving a selection from a user of a piece of prerecorded media content, the prerecorded media content including a background scene having a character therein. The method also includes accessing an individualized 3D head model and at least one voice sample of the user and converting the at least one voice sample to at least one audio track. The method also includes detecting from the at least one audio track a plurality of phonemes and creating at least one viseme track that associates the plurality of phonemes with a plurality of visemes, each of the plurality of visemes being indicative of an animated mouth movement of the individualized 3D head model. The method further includes synchronizing the at least one audio track and the at least one viseme track. The method further includes generating personalized media content by associating the individualized 3D head model with the character of the background scene and associating the synchronized at least one audio track and at least one viseme track with the individualized 3D head model to cause the animated mouth movement of the individualized 3D head model to correspond to the at least one audio track during playback of the personalized media content.

In certain embodiments, an animation system is disclosed for performing voice personalization of media content. The animation system includes a piece of media content comprising a background scene having a character, head model data representing an individualized 3D head model, and audio data representing at least one voice sample of a user, the at least one voice sample corresponding to a first text. The animation system also includes a processor configured to receive the media content, the head model data and the audio data to generate personalized media content. The processor is configured to generate personalized media content by processing the at least one voice sample to create at least one audio track; detecting from the at least one audio track a plurality of phonemes; creating at least one viseme track that associates the plurality of phonemes with a plurality of visemes, each of the plurality of visemes comprising instructions for a corresponding animated mouth movement of the individualized 3D head model; and compositing the media content, the individualized 3D head model, the at least one audio track and the at least one viseme track such that the individualized 3D head model is associated with the character and such that the at least one audio track and the at least one viseme track are associated with the individualized 3D head model to cause the animated mouth movement of the individualized 3D head model to correspond to the at least one audio track during playback of the personalized media content.

In other embodiments, a system is disclosed for animating media content. The system includes means for receiving a selection of a piece of media content, the media content including a background scene having a character therein. The system also includes means for receiving an individualized three-dimensional (3D) head model of a user. The system also includes means for receiving at least one voice sample of the user and means for converting the at least one voice sample to at least one audio track. The system also includes means for detecting from the at least one audio track a plurality of phonemes and means for creating at least one viseme track that associates the plurality of phonemes with a plurality of visemes, each of the plurality of visemes being indicative of an animated mouth movement of the individualized 3D head model. The system further includes means for generating personalized media content by associating the individualized 3D head model with the character of the background scene and associating the at least one audio track and the at least one viseme track with the individualized 3D head model to cause the animated mouth movement of the individualized 3D head model to correspond to the at least one audio track during playback of the personalized media content.

In certain embodiments, a method is disclosed for creating personalized media content having multiple content layers. The method includes receiving a selection from a user of prerecorded media content including multiple frames having at least a first character therein, receiving an individualized three-dimensional (3D) head model and receiving, from computer storage, template data associated with the prerecorded media content. The template data includes, for each of selected ones of the multiple frames, alignment data configured to cause positioning and sizing of the individualized 3D head model to substantially overlay a head of the first character in the selected frame and lighting data indicative of an illumination of the individualized 3D head model. The method further includes processing the prerecorded media content, the individualized 3D head model, and the template data to output personalized media content comprising a plurality of separate media layers. A background layer of the plurality of media layers includes the prerecorded media content. An intermediate layer of the plurality of media layers includes the individualized 3D head model overlaying the background layer according to the alignment data for each of the selected frames and illuminated according to the lighting data for each of the selected frames such that the personalized media content displays the first character with the individualized 3D head model.

In other embodiments, a method is disclosed for personalizing media content having multiple content layers. The method includes receiving prerecorded media content including multiple frames having at least a first character therein and accessing a 3D human head model. For selected ones of the multiple frames, the method includes overlaying the 3D human head model on a head of the first character. The overlaying includes generating alignment information indicative of a position and a scaling of the 3D human head model to substantially match the head of the first character in the respective frame and generating lighting information indicative of an illumination of the 3D human head model. The method further includes storing, in a memory, template data including the alignment information and the lighting information for each of the selected frames, wherein the template data is associated with the prerecorded media content, and wherein the template data is stored separate from the prerecorded media content for subsequent playback with each of a plurality of personalized human head models different from the 3D human head model.

In certain embodiments, a system is disclosed for generating personalized media content having multiple content layers. The system includes means for receiving prerecorded media content including multiple frames having at least a first character therein and means for overlaying a 3D human head model on a head of the first character for selected ones of the multiple frames. The overlaying includes generating alignment data indicative of a position of the 3D human head model to substantially match the head of the first character in the respective frame and generating lighting data indicative of an illumination of the 3D human head model. The system further includes means for storing template data including the alignment data and the lighting data for each of the selected frames, wherein the template data is associated with the prerecorded media content, and wherein the template data is stored separate from the prerecorded media content for later playback with at least one personalized human head model different from the 3D human head model.

In certain embodiments, a method is disclosed for creating personalized advertisements. The method includes receiving a selection of advertisement content having at least a first character and a second character therein and receiving a first personalized 3D head model of a viewer. The method also includes automatically selecting a second personalized 3D head model of an individual associated with the viewer. In certain embodiments, automatically selecting a second personalized 3D head model includes accessing a database associated with the viewer to identify the individual from a plurality of individuals listed in the database without receiving a viewer selection of the individual. The method also includes accessing an advertisement template corresponding to the selected advertisement content, wherein the advertisement template includes template data defining a layering of the first and second personalized 3D head models over the selected advertisement content. The method further includes outputting a personalized advertisement comprising multiple layers, wherein a first layer of the multiple layers comprises the selected advertisement content, and wherein a second layer of the multiple layers comprises the first personalized 3D head model overlaying a head of the first character and the second personalized 3D head model overlaying a head of the second character based on the template data of the advertisement template.

In certain embodiments, a system is disclosed for creating personalized advertisements. The system includes a background advertisement including multiple frames having at least a first character therein and a plurality of personalized 3D head models. The system also includes a processor configured to access a profile of a viewer to identify a plurality of individuals associated with the profile of viewer and to automatically select one of the personalized 3D head models that corresponds to one of the plurality of individuals. The system further includes an advertisement template, which is associated with the background advertisement, and includes instructions for inserting the selected personalized 3D head model as a head of the first character of the background advertisement. The processor is further configured to output a personalized advertisement that combines the background advertisement and the selected personalized 3D head model based on the instructions of the advertisement template.

In other embodiments, a system is disclosed for creating personalized advertisements. The system includes means for selecting advertisement content having at least a first character therein. The system also includes means for automatically selecting a personalized 3D head model of an individual associated with a viewer by accessing a database associated with the viewer to identify the individual from a plurality of individuals listed in the database without receiving a viewer selection of the individual. The system also includes means for defining a layering of the personalized 3D head model on the selected advertisement content and means for outputting a personalized advertisement including multiple layers. A first layer of the multiple layers includes the selected advertisement content and a second layer of the multiple layers includes the personalized 3D head model overlaying a head of the first character based on the means for defining a layering of the personalized 3D head model on the selected advertisement content.

For purposes of summarizing the disclosure, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIGS. 3B-1, 3B-2, 3B-3, and 3B-4 illustrate a hierarchical representation of an exemplary embodiment of an animation rig associated with an individualized 3D head model during the 3D head model generation process of FIG. 2.

FIGS. 3C-3G illustrate exemplary blendshapes usable for controlling the animation of an individualized 3D head model having an associated animation rig.

FIG. 4A illustrates an exemplary set of input images usable with the 3D head model generation process of FIG. 2.

FIG. 4B illustrates an exemplary reconstructed 3D frontal face mask generated by the 3D head model generation process of FIG. 2.

FIG. 5 illustrates exemplary landmark points corresponding to characteristic points or regions on a human face that are identified and used by the 3D head model generation process of FIG. 2.

FIG. 6 illustrates an initial mask alignment of the reconstructed face mask to a generic head model, in accordance with an embodiment of the 3D head model generation process of FIG. 2.

FIG. 7 illustrates an exemplary set of basis head models used to generate a blend fit head model, in accordance with an embodiment of the 3D head model generation process of FIG. 2.

FIG. 8A illustrates a reconstructed 3D frontal face mask aligned with a generic head model, in accordance with an embodiment of the invention.

FIG. 8B illustrates a reconstructed 3D frontal face mask aligned with a blend fit head model generated in accordance with an embodiment of the 3D head model generation process of FIG. 2.

FIG. 9A illustrates identification of several target areas of a 3D head model for extrapolation of texture and/or skin color from the face portion to the remainder of the head, in accordance with an embodiment of the 3D head model generation process of FIG. 2.

FIG. 9B illustrates a completed 3D head model after extrapolation is performed, in accordance with an embodiment of the 3D head model generation process of FIG. 2.

FIG. 16 illustrates three exemplary embodiments of 3D head models with various neck boundaries.

FIG. 24 illustrates an exemplary embodiment of a table that associates comments with a particular advertisement generated by the system of FIG. 23.

FIGS. 27A and 27B illustrate exemplary screen displays having a user comment option according to the system of FIG. 23, with reference to certain embodiments of the invention.

DETAILED DESCRIPTION OF THE PREFERRED EMBODIMENTS

Figure 1:
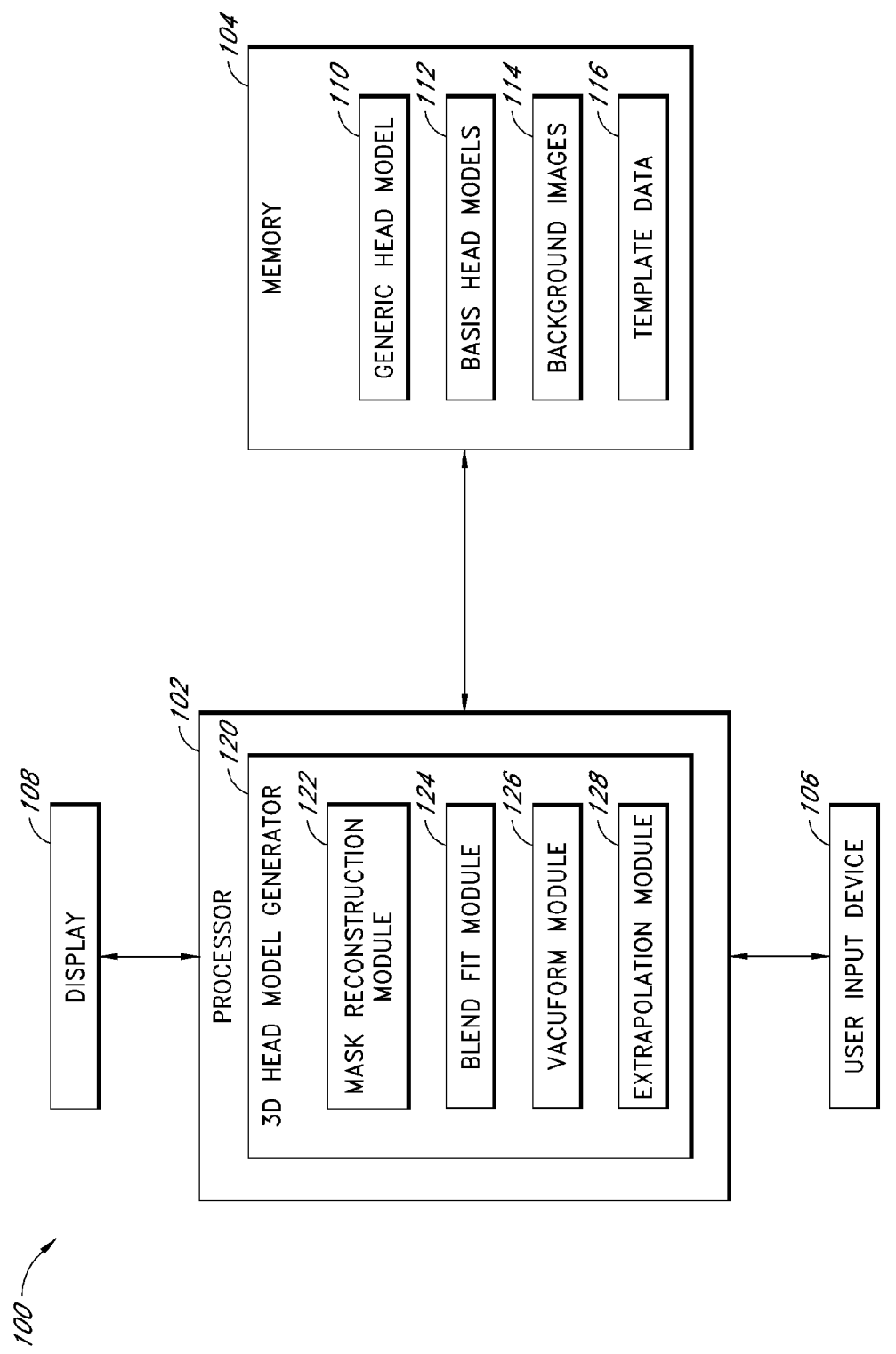
FIG. 1 illustrates a block diagram of an individualized 3D head model generation system according to an embodiment of the invention.

Systems and methods are disclosed herein for generating improved 3D head models for use in a variety of applications, such as video games, advertisements, movie clips and the like. In certain embodiments, the 3D head models are generated to more accurately reflect facial features and/or head shapes of a particular user. Moreover, such head models can be further customized with accessories, expressions, voice characteristics or the like.

In certain embodiments of the invention, systems and methods automatically generate a life-like, full 3D head model of an individual based on two-dimensional (2D) image data. For example, in certain embodiments, the user uploads multiple (e.g., three) 2D digital pictures of his or her head to a processing device, which produces an individualized 3D head model that can be further customized with hair, headwear, eyewear, and/or other accessories. Moreover, the user can store several different versions of individualized 3D head models for later use in creating personalized media content.

In certain embodiments, the individualized 3D head model is generated from a blend fit model composed of a weighted combination of multiple basis head models. For instance, each of the basis models can incorporate various facial features and head sizes, the combination of which results in a 3D head model that closely matches the actual appearance of the individual's entire head.

In certain embodiments, the individualized 3D head model generated by the systems and methods described above can be utilized to create and display personalized media content starring the user. Display of the 3D head model data is in some embodiments portrayed as still image data. The portrayal of still image data can occur from a plurality of perspectives to indicate and represent the 3D aspects of the information. In other embodiments, the display of the 3D head model data can occur as video or moving images and can further include animation. Animation of video data can include portrayal of such events as turning or tilting of the head, speaking, blinking, and/or different facial expressions. In yet other embodiments, 2D or 3D representations of an individual other than those generated by the systems and methods for generating individualized 3D head models described above can be used in the personalized media.

Certain embodiments of the invention provide for an end-user composition tool that allows a user to create a personalized piece of image content (e.g., video and/or a still image). The composition tool can comprise, for example, a computer software program executable on a user computer and/or remote server that facilitates compositing a 2D or 3D representation of an individual (e.g., the user) into an image or video template. In certain embodiments, the composition tool allows a user to create new personalized media templates. In other embodiments, a user simply selects a predefined background template and the system automatically generates personalized media content incorporating the user's 3D head model.

Certain embodiments of the invention utilize three separate content layers for creating personalized media content: a background layer, an intermediate layer and a foreground layer. The background layer can comprise a background media file, such as, for example, a video, a still image, an animated cartoon or the like. The intermediate layer comprises an individualized 3D head model. In certain embodiments, the 3D head model is associated with an animation rig, as well as template data, which comprises movement information, lighting information, and/or voice information. The foreground layer comprises masking information that can be still or animated in various embodiments. In certain embodiments, each of these content layers can be stored independently, with the intermediate and foreground layers being layered over the background layer to provide personalized media content starring a user without altering or copying the background layer.

In addition, certain embodiments of the invention enable a user to personalize video content with a voice track. For instance, certain systems and methods allow an individualized 3D head model to be inserted into a video template and facially animated so as to "lip sync" the corresponding voice track. In certain embodiments, the voice track is generated by capturing voice signals of the user through a microphone or other like input device of a computing device. In other embodiments, the voice track can be advantageously generated from voice signals captured through a telephone, such as a landline phone or a cell phone. In yet other embodiments, a user can customize the voice track or corresponding facial animation of the 3D head model by selecting one or more predetermined emotional expressions from a graphical user interface.

Moreover, in other embodiments, voice characteristics of an individual can be acquired from one or more voice samples of the individual. The acquired voice characteristics can then be used to simulate the voice of the individual from a predefined text transcript or from user-inputted text. In other embodiments, a source voice from a predefined background template is transformed into a target voice of the individual using the acquired voice characteristics.

One example of personalized media content is interactive advertisements. Certain embodiments of the invention are directed to systems and methods for providing interactive advertising, wherein an individualized 3D head model of the viewer, or of a person associated with a profile of the viewer, is automatically inserted into a background advertisement. Certain embodiments include the insertion of individualized 3D head models of "buddies" associated with the viewer. These "buddies" can be selected from a buddy list, email history, chat history, comment history on blogs or social networking sites, combinations of the same or the like. Moreover, certain embodiments further include systems and methods for allowing viewers to dynamically create and/or alter the content of interactive advertisements. In addition, certain embodiments allow users to send, save, comment on, and/or rate advertisement banners or other content they see.

To facilitate the description of embodiments of the present invention, it deems necessary to provide definitions for some terms that will be used throughout the disclosure herein. It should be noted that the following definitions are to facilitate the understanding and describe certain embodiments of the invention. The definitions may appear to include some limitations with respect to certain embodiments; however, the actual meaning of the terms has applicability well beyond such embodiments, which can be appreciated by those skilled in the art, upon reading the disclosure herein.

For instance, the terms "insert", "replace," and "composite" as used herein are broad terms and include, without limitation, digitally or optically combining an individualized 3D head model with background media content and/or overlaying individualized 3D head models on top of background media content.

The term "3D head model" as used herein is a broad term and includes, without limitation, a 2D representation of a 3D head or a 3D representation of at least a portion of a 3D head.

The features of the systems and methods will now be described with reference to the drawings summarized above. The drawings, associated descriptions, and specific implementation are provided to illustrate embodiments of the invention and not to limit the scope of the disclosure.

In addition, methods and processes described herein are not limited to any particular sequence, and the blocks or states relating thereto can be performed in other sequences that are appropriate. For example, described blocks or states can be performed in an order other than that specifically disclosed, or multiple blocks or states can be combined in a single block or state.

FIG. 1 illustrates a block diagram of an exemplary embodiment of a 3D head model generation system 100 In certain embodiments, the 3D head model generation system 100 generates a fully-textured, life-like 3D model of an individual's head from one or more 2D images (e.g., photographs) of the individual. For example, the generated head model can, in certain embodiments, more accurately reflect the actual shape and feature proportions of the individual's head in comparison with other systems that create 3D models from a 2D image.

In certain embodiments, the individualized 3D head model can be inserted into various types of personalized media content, including, for example, movie scenes, TV shows, video games, computer games, music videos, video clips, virtual worlds, cartoons, advertisements, still images, user-generated content, animated messages, e-mails, online greeting cards, combinations of the same or the like. Moreover, in certain embodiments, the 3D head model generation system 100 advantageously provides for repeatability and custom animation of the 3D head models generated. Custom animation of the 3D head models can also include portrayal of such events as turning or tilting of the head, speaking or singing, blinking, winking, and/or different facial expressions.

As shown in FIG. 1, the 3D head model generation system 100 comprises a processor 102 that communicates with a memory 104, a user input device 106, and a display 108. In general, the processor 102 receives user input (e.g., 2D images, commands, text) through the user input device 106 and controls and transmits output (e.g., 3D head model, sound, animated media content) to the display 108. In certain embodiments, the processor 102 comprises a general or a special purpose microprocessor. The processor 102 can comprise an application-specific integrated circuit (ASIC) or one or more modules configured to execute on one or more processors.

The processor 102 can communicate with the memory 104 to retrieve and/or store data and/or program instructions for software and/or hardware. As shown, the memory 104 stores a generic head model 110, one or more basis head models 112, one or more background images 114, and template data 116.

In certain embodiments, the generic head model 110 is a generic 3D head model that is used by the processor 102 to perform an initial alignment with a reconstructed face mask of an individual. In certain embodiments, the generic head model 110 may come in the form of a generic head shape defined by an artist. In other embodiments, the generic head model 110 is an average head shape computed from a plurality of known head shapes.

In some embodiments, the generic head model 110 comprises prior knowledge of generic human head and face structure that can be used to determine the presence or likely locations of different kinds of head and/or facial features, such as face perimeter, eyes, nose, mouth, and/or ears. For instance, the generic head model 110 can comprise landmark data corresponding to characteristic points or regions of a human face, which are used for an initial alignment between the generic head model and the reconstructed face mask. In certain embodiments, the generic head model can also be associated with a generic animation rig, which can be used as a reference for scaling the animation rigs of generated 3D head models generated by the 3D head model generation system 100.

The basis head models 112 can represent a variety of head shapes and/or facial features for comparison with a reconstructed face mask in order to create a highly accurate individualized 3D head model based upon a weighted combination of the basis models 112. Background images 114 can include still images, videos, or other media content, onto which the generated 3D head model can be inserted without altering the content of the background images 114. Template data 116 can include information such as animation features, accessory data, voice data, and the like, for use in creating personalized media content.

As will be understood by a skilled artisan from the disclosure herein, the memory 104 can comprise any type of memory capable of storing data, including, for example, random access memory (RAM), ROM, on-chip or off-chip memory, cache memory, or other more static memory such as magnetic or optical disk memory. The memory 104 can also access and/or interact with CD-ROM data, PDAs, cellular phones, laptops, portable computing systems, wired and/or wireless networks, landline phones, VoIP modules, combinations of the same, or the like. In certain embodiments, the memory 104 is located external to the processor 102 but remains in communication with the processor 102. In other embodiments, the memory 104 resides on the processor 102.

As shown, the processor 102 comprises a 3D head model generator 120, which, upon being executed by the processor 102, generates life-like individualized 3D head models in accordance with certain embodiments of the invention. The 3D head model generator 120 advantageously comprises a mask reconstruction module 122, a blend fit module 124, a vacuform module 126, and an extrapolation module 128. Although depicted within the processor 102, it should be appreciated that the 3D head model generator 120 can reside on the memory 104 or other location to be executed by the processor 102.

In certain embodiments, the mask reconstruction module 122, upon execution by the processor 102, reconstructs a 3D face mask of a particular individual from one or more 2D images of the individual's head (e.g., photographs from a digital camera). In certain embodiments, the blend fit module 124 and the vacuform module 126, upon execution by the processor 102, use the generic head model 110 and the one or more basis head models 112 to reconstruct the remainder of the head model to match the proportions and facial features of the reconstructed 3D face mask of the individual. The extrapolation module 128, upon execution by the processor 102, can extrapolate texture, skin color, eye color, and/or other information from the generated 3D face mask to the remainder of the head model.

In certain embodiments, the final product of the 3D head model generator 120 advantageously results in a highly accurate, individualized 3D head model that is rigged for custom animation and available for insertion into personalized media content. An exemplary 3D head model generation process usable by the 3D head model generation system 100 will be discussed in more detail below, in conjunction with the description of FIG. 2.

With continued reference to FIG. 1, the user input device 106 can comprise a keyboard, a cellular telephone, a landline telephone, a smartphone, a mouse, a microphone, a touch screen, a trackball, a touch pad, combinations of the same, or any other input device for inputting information to a processor. User input to the processor 102 can comprise data (e.g., 2D image data, partial 3D image data, voice data, text data), user commands (e.g., keyboard, mouse, or touch commands), combinations of the same and the like. In certain embodiments, the data comprises still images taken by a camera device, such as a digital still camera, a digital video camera, a web camera, a camera-equipped cell phone, or any other device capable of capturing digital images of an object.

The display 108 can have any suitable construction for displaying information, such as a computer screen (e.g., a cathode ray tube monitor, an LCD), a television screen, a cell phone, or a portable digital assistant (PDA). Output to the display 108 can comprise, without limitation, a still image, a sequence of images, a video, an animation, a cartoon, a video game, a composite image, an interactive advertisement, combinations of the same or the like. Output to the display 108 can be generated automatically by the 3D head model generation system 100 upon a "single click" by the user or can be generated after user customization using a media composition tool.

In certain embodiments, the user input device 106 and the display 108 reside on a single user interface device, such as a personal computer, a portable computing device, a cell phone, a PDA, or an interactive kiosk. In other embodiments, the user input device 106 and the display 108 reside on separate user interface devices. Moreover, in certain embodiments, the display 108 can also comprise audio capabilities, such as speakers, for outputting sound (e.g., voice data) associated with the visual display.

In certain embodiments, the processor 102 and the memory 104 are located external to, or remote to, the user input device 106 and the display 108. For example, the processor 102 and the memory 104 can reside on a remote server while the user input device 106 and the display 108 reside on a separate user interface device in communication with the remote server. In accordance with this particular embodiment, the processor 102 can communicate with the user input device 106 and the display 108 over a telecommunications network. The telecommunications network can comprise a public network such as the Internet, a virtual private network (VPN), a token ring or TCP/IP based network, a wide area network (WAN), a local area network (LAN), an intranet network, a point-to-point link, a wireless network, a cellular network, a telephone network, a wireless data transmission system, a two-way cable system, a satellite network, a broadband network, a baseband network, combinations of the same, or the like. In yet other embodiments, the processor 102, the memory 104, the user input device 106, and the display 108, all reside on a single stand-alone computing device, such as a server, a personal computer, or a portable computing device, with each of the components being in communication with each other.

Figure 2:
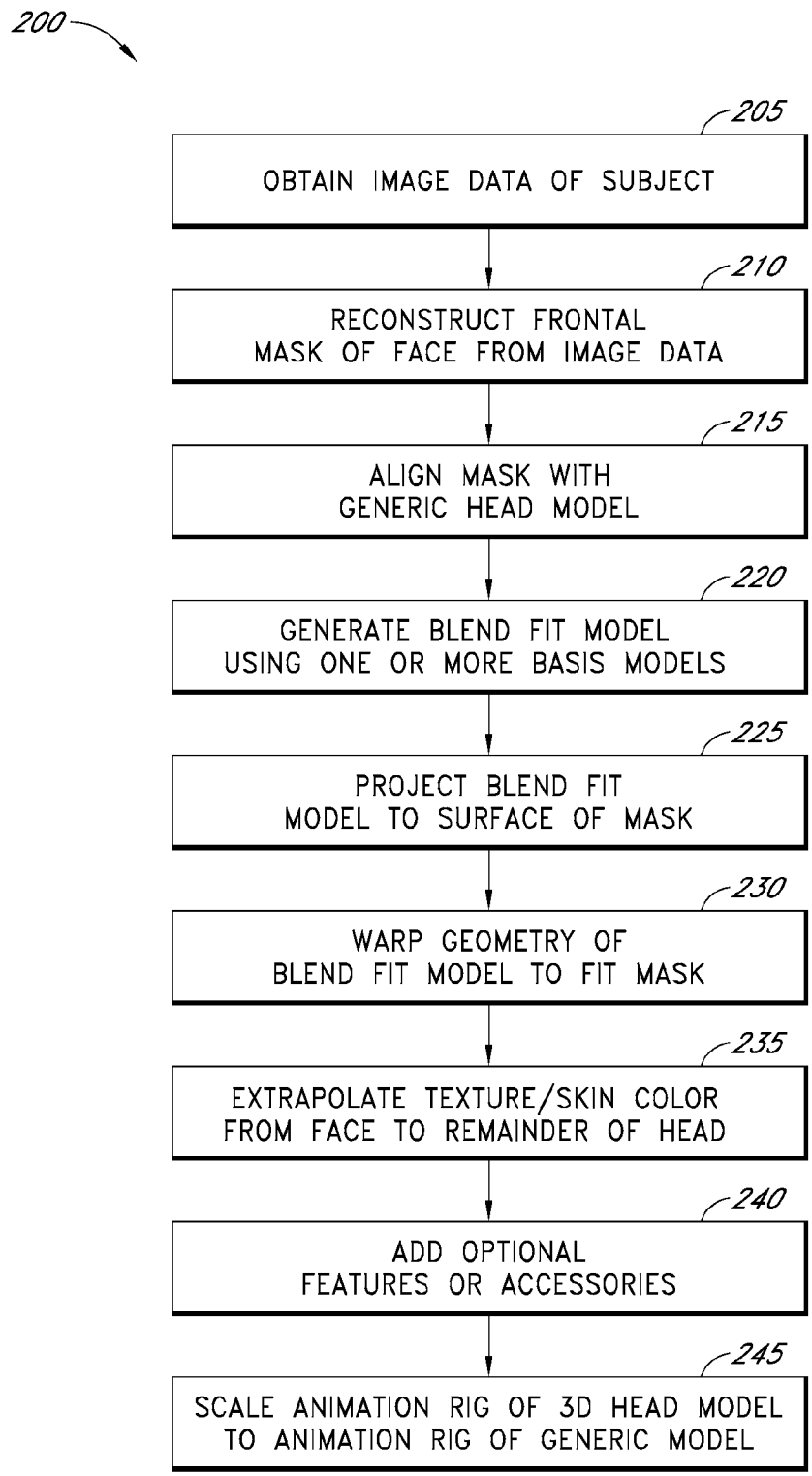
FIG. 2 illustrates a flowchart of an exemplary embodiment of a 3D head model generation process executable by the individualized 3D head model generation system of FIG. 1.

FIG. 2 illustrates a flowchart of an exemplary embodiment of a 3D head model generation process 200 for generating a complete 3D head model of an individual. In certain embodiments, the 3D head model generation process 200 is executed by the 3D head model generation system 100 of FIG. 1 to generate individualized, or personalized, 3D head models. For exemplary purposes, the 3D head model generation process 200 will be described herein with reference to the components of the 3D head model generation system 100 of FIG. 1. For example, the various blocks of the 3D head model generation process 200 will be described as being executed by the processor 102. In certain embodiments, the blocks are executed by the 3D head model generator 120, which is in communication with the processor 102.

As shown in FIG. 2, the 3D head model generation process 200 begins with Block 205, where the processor 102 receives the input image data 114 from the user input device 106. The input image data 114 can be received by any means of transferring digital data. For example, the input image data 114 can be received through a wireless or wired network or, alternatively, can be received through a connector cable. As yet another alternative, the input image data 114 can be received by the processor 102 from a recording medium such as a flash memory, a floppy disk, a CD or DVD through an appropriate drive for reading the data from the recording medium. In certain embodiments, the user can "manually" initiate the transmission of the input image data 114 to the processor 102 or its associated memory 104. In other embodiments, the input image data 114 is automatically transmitted to the processor 102.

For example, the user can enter an interactive kiosk in a mall, wherein several photographs of the user are taken with one or more cameras (e.g., substantially simultaneously) and automatically transmitted to the processor 102. The processor 102 can then generate an individualized 3D head model that the user can view on a display and modify or accessorize by entering commands on a keyboard and/or selecting options from a touchscreen. The user can also select a background media template into which the individualized 3D head model should be inserted. The user can then send the customized 3D head model or customized media output via e-mail to himself and/or to third parties.

In certain embodiments, the input image data 114 can comprise 2D video data and/or a plurality of 2D still images of the individual. For instance, the still image data can comprise one or more photographs obtained from a digital camera, a web camera, a field camera, and/or cell phone; one or more frames from a video sequence; a scanned image; combinations of the same; or the like. In other embodiments, the input image data 114 comprises one or more artist- or computer-generated sketches that are then digitized. The input image data 114 can be raw or processed data from one or more cameras. In certain embodiments, the input image data 114 advantageously comprises still images or video obtained from a plurality of different perspectives and/or orientations to obtain more complete 3D surface image data of the individual's head and face.

In yet other embodiments, the input image data 114 comprises partial 3D image data. For example, the input image data 114 can comprise a plurality of disjointed portions of a 3D model obtained by a laser scan or other source. In certain embodiments, the partial 3D image data advantageously includes at least a frontal portion of the face (e.g., the eyes and nose). In other embodiments, the partial 3D image data includes, but is not limited to, 3D image data of the frontal portion of the face. For example, the input image data 114 can include 3D image data corresponding to non-facial portions of the head (e.g., the sides and back of the head).

In still other embodiments, the input image data 114 can comprise complete 3D image data, such as a previously-generated 3D face mask generated by the individualized 3D head model generation system 100 or by other 3D head model generation systems. The complete 3D image data can also include 3D image data corresponding to non-facial portions of the head. In some embodiments, the complete 3D image data can be generated by a 3D digital camera, wherein the camera itself creates 3D images that can be uploaded or otherwise transmitted to the processor 102.

In certain embodiments, the input image data 114 is advantageously stored on the memory 104 (e.g., as JPEG or MPEG image files). Such embodiments advantageously allow for the later and/or repeated retrieval of the image data for use in 3D head model generation and/or other media compositing processes.

At Block 210, the processor 102 reconstructs a 3D face mask of the individual's face from the image data using, for example, the mask reconstruction module 122. In certain embodiments, the processor 102 can perform such mask reconstruction using systems and methods similar to those described in U.S. Pat. No. 7,224,357, issued May 29, 2007, and/or in Douglas Fidaleo and Gerard Medioni, "Model-Assisted 3D Face Reconstruction from Video," Proceedings of the Third International Analysis and Modeling of Faces and Gestures (AMFG) Workshop, Rio de Janeiro, Brazil, Oct. 20, 2007 (published in Lecture Notes in Computer Science, Springer Berlin/Heidelberg, vol. 4778, pp. 124-138). Each of these documents is hereby incorporated herein by reference in its entirety. In certain embodiments, the 3D face mask does not include the back portion of the head and/or hair features. In some embodiments, the reconstructed face mask has a non-uniform surface reflecting the accurate facial geometry of the individual's face.

At Block 215, the processor 102 aligns and/or sizes the reconstructed face mask with a generic head model. In certain embodiments, the generic head model comprises prior knowledge of generic human head and face structure that can be used in performing an alignment of the reconstructed face mask with the generic head model. For example, the generic head model can include a plurality of landmark points that indicate the likely location and size of facial features (e.g., eyes, nose, mouth, ears), a generic head shape (i.e. face perimeter), and a generic neck.

In certain embodiments, the alignment of the reconstructed face mask with the generic head model is performed by first detecting and defining a plurality of landmarks or fiducial monuments in the reconstructed face mask. In other embodiments, the landmarks can be first detected and defined from the input image data 114 used to generate the reconstructed face mask. These landmarks can include, but are not limited to, points on the chin, nostrils, peripheral regions of the eye lids, eyebrows, lips and mouth, combinations of the same or the like. In certain embodiments, the landmarks advantageously include at least points corresponding to the nose tip, eye corners, and mouth corners.

In certain embodiments, the landmarks can be selected "manually" by identifying the important facial features. In other embodiments, the landmarks can be detected automatically using any method of facial landmark detection of digital face data, such as the methods described by Zhang et al. in U.S. Patent Application Publication No. 2008/0063263, which is hereby incorporated herein by reference. For example, the input image data 114 can be separated into several resolution layers, each successive layer having a higher resolution than the previous layer. In certain embodiments, texture classifiers, which have been pre-trained to recognize feature texture, are associated with each resolution layer. For example, the lowest resolution may have a single texture classifier that detects the entire face in the image. Successive layers contain greater numbers of texture classifiers that are trained to detect more localized features. The detection process is repeated for each successive layer, with the texture classifiers gradually refining the localization of landmark features in each successive layer.

With continued reference to Block 215 of the 3D head model generation process 200, to align the reconstructed face mask and the generic head model, the processor 102 registers and/or compares at least some of the defined landmarks from the reconstructed face mask with corresponding landmarks from the generic head model. For instance, in certain embodiments, the processor 102 uses an iterated closest point (ICP) algorithm or process to align the reconstructed face mask with the generic head model. Such an iterative process can include, for example: (1) associating the landmarks using nearest neighbor criteria, (2) estimating parameters using a mean square cost function, (3) translating the points using the estimated parameters, and (4) further iteration (to re-associate the points and so on). This initial alignment provides the starting point in the generation of complete 3D head models from reconstructed face masks.

At Block 220, the processor 102 executes the blend fit module 124 to generate a 3D blend fit model that more closely matches the proportions and features of the reconstructed face mask. In certain embodiments, the blend fit model is generated as a weighted combination of a set of one or more 3D basis head models.

For example, each 3D basis head model can be developed from an artist's rendition of a real-life individual and/or an accurate 3D model acquired by laser scanning or like means. In certain embodiments, the basis head models in the set can advantageously represent a variety of head shapes and/or facial features. For instance, in one embodiment, the set can advantageously include approximately one hundred basis head models, which can indicate certain surface contours and influences of underlying muscle and bone tissues. In yet other embodiments, once a blend fit model is created, that particular model is added to the existing set of basis head models for use in later generating other blend fit models.

During the execution of the blend fit module 124, the processor 102 can compare the reconstructed face mask with a set of basis head models using a least squares fitting analysis. The least squares fitting analysis compares certain defined parameters of the reconstructed face mask with corresponding parameters of each of the basis head models to compute the closest possible head model that can be generated from a combination of basis head models. Such parameters can include landmark points, head configurations, or other like measurements or locations. In yet other embodiments, other matching and/or regression analyses can be used to compare the reconstructed face mask with the basis head models. Additional details of the generation of a blend fit model based on a weighted combination of 3D basis head models are provided later in connection with FIG. 7.

In certain embodiments, although the shape of the blend fit model is close to that of the reconstructed face mask after Block 220, there may not be an exact match of the two. For example, the reconstructed face mask can contain geometry data that the overly smooth surface of the blend fit model does not accurately render or portray. At Block 225, the processor 102 executes a "vacuform" routine using, for example, the vacuform module 126, to project, or deform, the smooth surface of the blend fit model to the non-uniform surface of the reconstructed face mask. In certain embodiments, the vacuform routine comprises a localized, unconstrained process, wherein select portions of the blend fit model are "sucked," as if by a vacuum, toward the 3D surface boundaries of the reconstructed face mask in a linear fashion, thereby approximating the non-uniform surface of the 3D face mask.

In certain embodiments, the execution of the vacuform routine allows for a more accurate reproduction of the subtle, detailed geometry of distinct facial characteristics, such as a non-uniform nose profile or a large mole. For example, if an individual has a distinct mole on his or her face that projects outward from the surface of the face, the smooth, uniform surface of the blend fit model will not accurately depict the texture of the mole. However, execution of the unconstrained vacuform routine ensures that the localized area of the blend fit model where the mole is located is projected outward from the smooth surface boundary of the blend fit model. Moreover, in certain embodiments, during the vacuform routine, the parameters of the reconstructed face mask are advantageously not warped or modified. The result of Block 225 is a vacuform head model.

At Block 230, the processor 102 warps the geometry of the blend fit head model to more precisely align the facial features of the blend fit head model with the textured facial features of the reconstructed face mask. For instance, although the vacuform routine may have projected the blend fit model to the surface of the reconstructed face mask, the facial features, such as the eye and mouth corners of the blend fit model and the reconstructed face mask may still not be aligned with sufficient precision and accuracy. In certain embodiments, the warping routine can be performed using landmark points and/or other reference points or features. In certain embodiments, a feature alignment process is performed utilizing radial-basis function (RBF) interpolation or like interpolation.

Upon execution of the warping routine, the geometry of the 3D head model is complete; however, the 3D head model still lacks texture. At Block 235, the processor 102 continues by extrapolating texture and/or skin color from the perimeter of the face portion to the remainder of the head using, for example, the extrapolation module 128. In certain embodiments, the processor 102 detects the outer perimeter of the facial skin using edge and color information and then extracts skin color information at each pixel around the facial perimeter. This skin color information is then extrapolated to the remainder of the head, thus creating a bald head model. In yet other embodiments, skin color information from a select number of pixels or a combination of pixels around and/or near the facial perimeter can be used for such extrapolation.

By extrapolating skin color information at each pixel around the perimeter of the reconstructed face mask, rather than a few target areas located near the center of the face, the completed 3D head model can more accurately represent the actual appearance of the individual because each pixel contains subtle variations in hue, color, lighting, and other appearance factors. Also at Block 235, the processor 102, in certain embodiments, extrapolates eye color information. Additional details regarding exemplary extrapolation processes are provided in connection with FIGS. 11 and 12.

At Block 240, the processor 102 optionally adds features and/or accessories to the completed 3D head model. Such features and accessories can include, for example, hair on the head, facial hair (e.g., moustache, beard), jewelry (e.g., earrings, nose rings), scars, wrinkles, beauty marks, moles, blemishes, birthmarks, headwear, eyewear, face paint, skin color, bruises, shadows, or other like effects. In addition, the processor 102 can alter the appearance of the textured 3D head model. For example, the processor 102 can alter the 3D head model to appear more or less cartoon-like, more or less caricature-like, older- or younger-looking, thinner- or heavier-looking, more or less feminine, combinations of the same, or the like. The processor 102 can make desired adjustments to individual facial features, such as creating a witch-like nose or bug eyes.

At Block 245, the processor 102 associates an animation rig with the generated 3D head model and scales the animation rig of the generated 3D head model to an animation rig of the generic head model. In certain embodiments, the animation rig facilitates animation or movement of the 3D head model.

For example, in certain embodiments, an animation rig comprises a virtual muscle system that allows the head geometry to be deformed in such a way that it can express, emote, and/or speak. However, it should be appreciated by one of ordinary skill in the art that an animation rig need not be tied to any physical embodiment, but instead can comprise a set of data parameters and/or one or more underlying deformation systems.

For instance, in certain embodiments, the animation rig comprises a bone deformation system that includes a virtual skeleton of key control joints that, when moved, cause the adjacent vertices on the 3D head model to follow. The animation rig can, thereby, be controlled by animation data, which specifies the location of each key control joint within the 3D head model and the vertices that will be influenced by the movement of each key control joint.

Figure 3A:
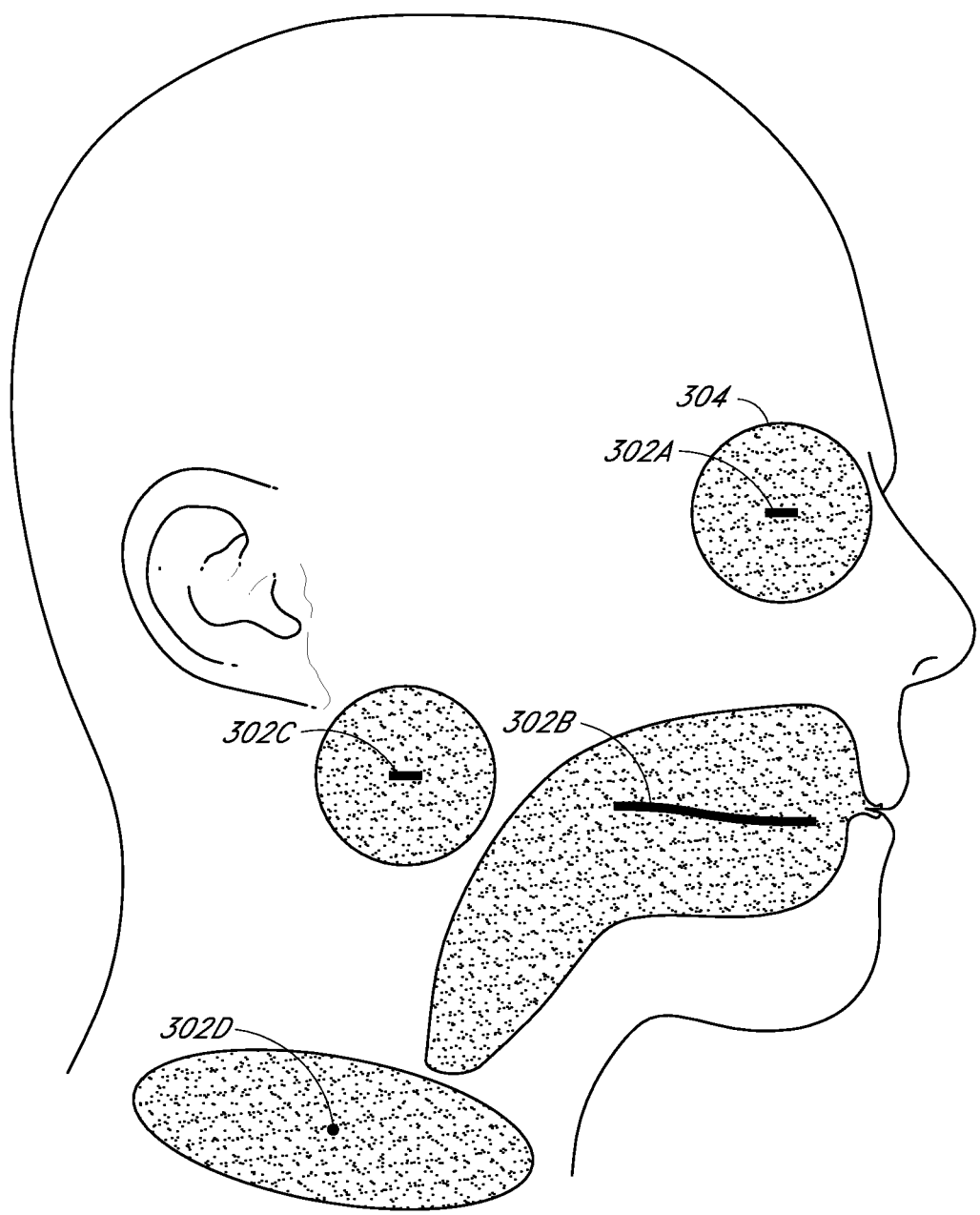
FIG. 3A illustrates an exemplary embodiment of a virtual representation of an animation rig associated with a 3D head model generated by the individualized 3D head model generation system of FIG. 1.

For example, FIG. 3A illustrates a virtual representation of a bone deformation system in accordance with an embodiment of the invention. As shown, the bone deformation system defines an exemplary set of six control joints 302 corresponding to various muscles of the head and face. In certain embodiments, each of the control joints 302 is associated with a region of adjacent vertices (shown as shaded areas), which are influenced by the movement of the control joints 302.

As shown in FIG. 3A, the control joints 302 can be advantageously located in regions of the eyes, the jaw, the neck, and/or the cheeks. In other embodiments, control joints can be located in other regions, such as the nose and ear region. Moreover, the bone deformation system can comprise more or fewer than six control joints in other embodiments.

As one example, the right eye control joint 302A can be positioned near the center of the right eye and can influence the adjacent vertices located within a right eye influence region 304. Movement of the right eye control joint 302A causes the adjacent vertices within the right eye influence region 304 to move as well.

Figures 1, 3B:
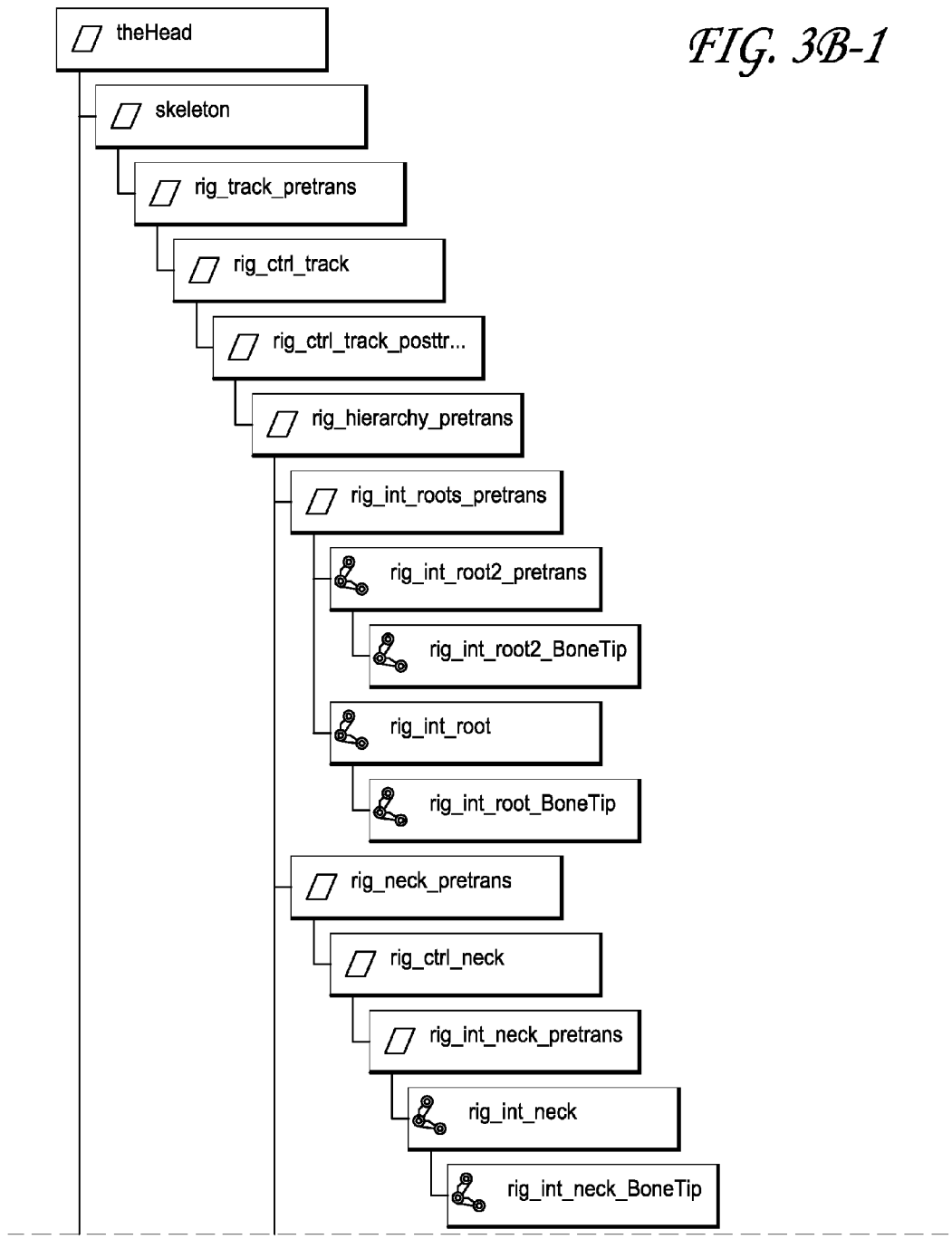
Figures 2, 3B:
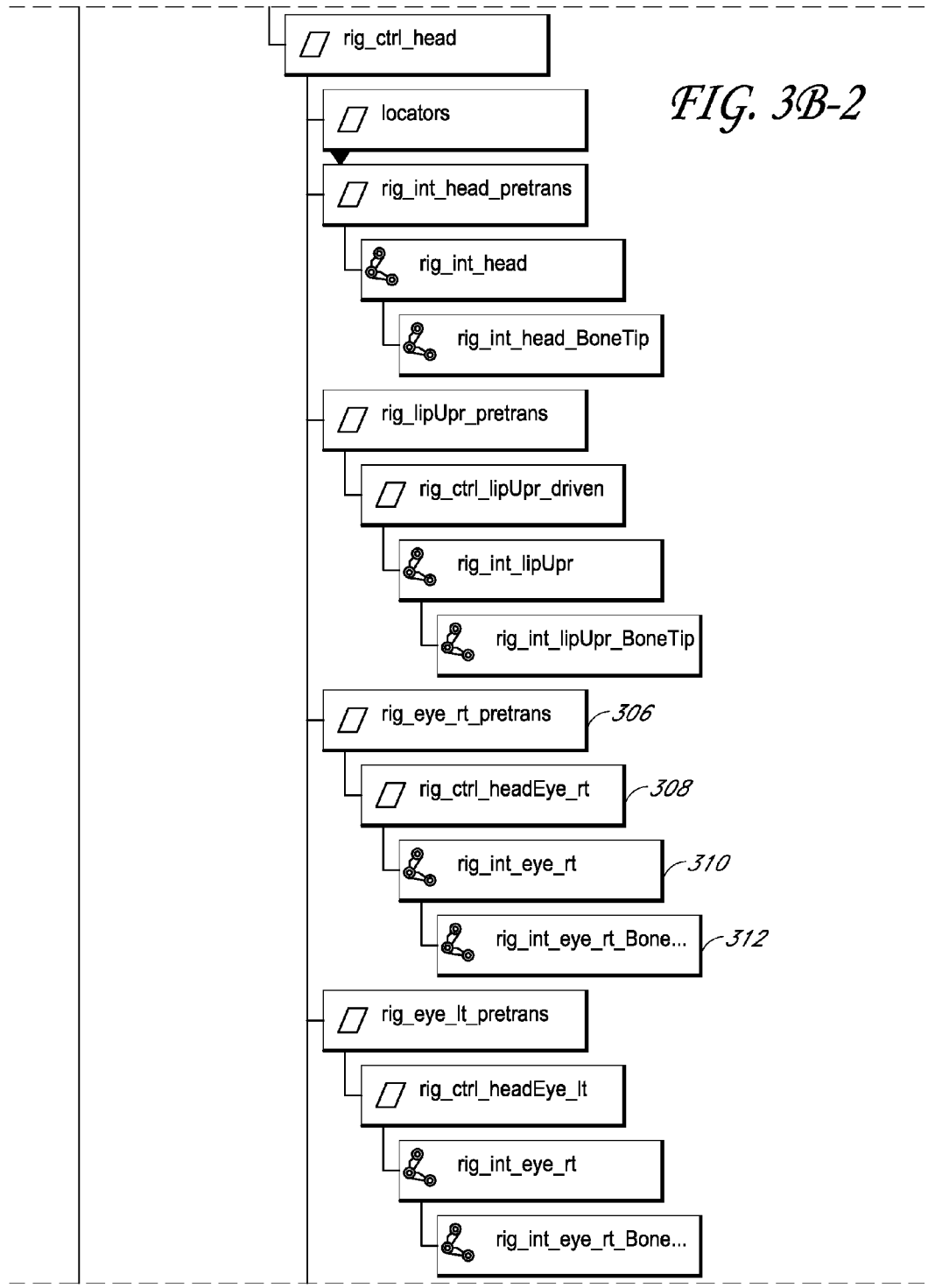
Figures 3, 3B:
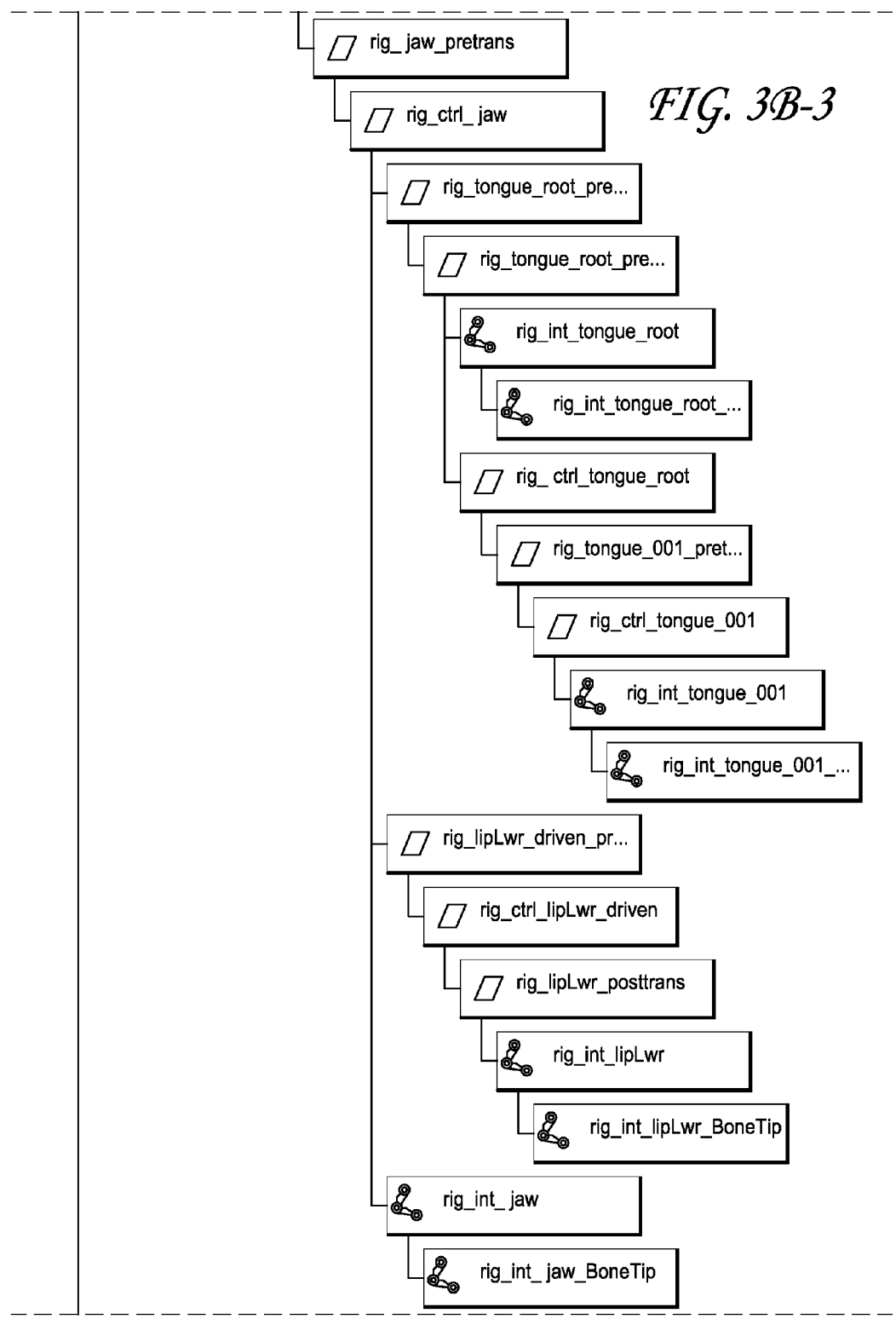

FIGS. 3B-1-3B-4 illustrate a hierarchical representation of an exemplary animation rig utilizing an underlying bone deformation system. Each of the boxes illustrated in FIGS. 3B1-3B4 represents a node of the animation rig. It should be appreciated that, in certain embodiments, changes to a "parent" node affects the "child" nodes associated under the parent node.

Some of the depicted nodes specify the initial location and position parameters of the key control joints within the 3D head model. Other nodes define the key control joints and the adjacent vertices influenced by each particular key control joint. For example, right eye rig positioning nodes 306 and 308 (shown in FIG. 3B-2) can include information to perform a pretranslation of the right eye rig control joint 302A so that it is positioned in the right eye region of the 3D head model as opposed to the default center of the 3D head model. In certain embodiments, right eye rig joint nodes 310 and 312 can include information that defines key control joints for right eye animation and the adjacent vertices in the right eye influence region 304 that will be influenced by the key control joints for right eye animation.

In other embodiments, the animation rig comprises a blendshape deformation system. In certain embodiments, blendshapes can be created that explicitly define the position of the vertices for a given head animation or facial expression. Starting from a neutral head pose, individual blendshapes can be added with different weights to create a final expression target. A weighted combination of individual blendshapes can advantageously be used to create substantially life-like facial animation that is smooth and continuous.

FIGS. 3C-3G illustrate 3D head models reflecting five different exemplary blendshapes. As shown, each of the five exemplary blendshapes illustrates animation of a different facial feature. FIG. 3C illustrates the result of adding a right_mouth_smile_blendshape to a neutral head pose. FIG. 3D illustrates the result of adding a right_cheek_smile_puff blendshape to a neutral head pose. In certain embodiments, the right_cheek_smile_puff_blendshape is added at the same time as the right_mouth_smile_blendshape to create photorealistic facial animation.

FIG. 3E illustrates the result of adding a right_nostril_sneer blendshape to a neutral head pose. FIG. 3F illustrates the result of adding a left_upper_eyelid_close blendshape to a neutral head pose. The left_upper_eyelid_close blendshape can be used, for example, to animate blinking or winking.

FIG. 3G illustrates the result of adding a left_brow_up blendshape to a neutral head pose. In certain embodiments, the weight of the blendshape can be used to control the degree of the target expression. For example, a "0.5*left_brow_up" instruction could raise the left eyebrow half as much as a "1.0*left_brow_up" instruction.

In yet other embodiments, the animation rig comprises a combination of bone and blendshape deformation systems. It should be appreciated by one of ordinary skill in the art, upon reading this disclosure, that the bone and blendshape deformation systems can be used to not only animate a mouth portion, but also to animate other facial features to convey emotion and expression, thereby producing more lifelike animation. For example, to create a "surprise" expression on a face, the animation data may direct that the left_brow_up and right_brow_up blendshapes be used in conjunction with a jaw_open bone motion.

It should be appreciated by one of ordinary skill in the art that, in certain embodiments, appropriately scaling the animation rig advantageously results in repeatability of animation since all generated 3D head models come out of the 3D head model generation process 200 configured and scaled to the same animation rig template of the generic head model.

In certain embodiments, the animation rig is defined in an open XML-based file format for interchange of graphics and animation data between computer graphics modeling and animation applications. For example, the animation rig can be stored as a .DAE (Digital Asset Exchange) file, such as used in COLLADA-related files. In certain embodiments, the completed personalized 3D model, along with its associated animation rig, is stored in the memory 104.

Although the 3D head model generation process 200 has been described with reference to particular embodiments, other embodiments of the invention can utilize more or fewer blocks than those described with reference to FIG. 2. Moreover, in certain embodiments, other similar algorithms for matching and aligning can be used during the 3D head model generation process 200 including, but not limited to, regression algorithms, linear and non-linear analysis, correlation functions, interpolation functions, best-fit algorithms, combinations of the same, and the like.

For example, in certain embodiments, Blocks 220, 225, and 230 can be combined into a single routine. That is, execution of the blend fit module can further include projecting the blend fit model to the surface of the reconstructed face mask and warping the blend fit model to match the features of the reconstructed face mask. In other embodiments, Blocks 225 and 230 can be combined into a single deformation routine that includes the precise alignment of facial features as well as approximating the non-uniform surface of the reconstructed face mask.

In yet other embodiments, the input image data acquired during Block 205 can comprise any 3D image data, such as, for example, a textured partial 3D head model of at least a portion of the frontal face, and possibly portions of the sides and/or back of the head. In such embodiments, the 3D head model generation process 200 need not perform Block 210 if the 3D image data provides sufficient information for generating a full 3D head model. Moreover, in other embodiments, the alignment and warping process in Block 230 can occur before the creation of the vacuform head model in Block 225. In yet other embodiments, the 3D head model generation process 200 can operated without one or more of Blocks 230, 235 and 240.

FIGS. 4A, 4B and 5-10 illustrate stages of an exemplary 3D head model generation process, according to certain embodiments of the invention. In particular, FIG. 4A illustrates an exemplary set of three 2D still images 402A, 402B and 402C (402, collectively) taken by a digital camera to be used as input to the 3D head generation process 200 of FIG. 2 (see Block 205). Each of the still images 402 advantageously depicts the individual from a slightly different perspective. In addition, the still images 402 advantageously depict the individual with little to no facial expression, little to no facial hair, and without accessories, such as headwear or eyewear. In certain embodiments, the still images 402 can be stored as the input image data 114 on the memory 104 for later access and use (e.g., as JPEG or MPEG digital image files).

FIG. 4B illustrates an example of both a textured reconstructed face mask 404 and an untextured reconstructed face mask 406 generated using the three 2D still images 402 of FIG. 4A. For example, one or both of the masks 404, 406 can, in certain embodiments, be generated by the execution of the mask reconstruction module 122, in accordance with Block 210 of the 3D head model generation process 200.

FIG. 5 illustrates an exemplary head model with identified landmarks, or fiducial monuments, corresponding generally to characteristic points or regions on an individual's face, in accordance with certain embodiments of the invention. As illustrated in FIG. 5, the landmark points can define the location and/or boundaries of important facial features, such as the eye corners, the eyebrow corners, the nose tip, the nose width, the mouth corners, and/or the face perimeter. In certain embodiments, at least a portion of these seventy-four depicted landmarks can be used by the 3D head model generation process 200 to align a reconstructed face mask with a generic head model. In other embodiments, more or fewer landmark points can be used.

FIG. 6 illustrates a reconstructed face mask 604 generated from the input images 402 of FIG. 4A with thirty detected landmark points and a generic head model 608 having approximately forty identified landmark points. In certain embodiments, the landmark points of the reconstructed face mask 604 are associated and registered with corresponding landmark points of the generic head model 608 using nearest neighbor criteria in conjunction with an iterated closest point algorithm. The corresponding landmark points of the reconstructed face mask 604 and the generic head model 608 are then aligned to perform an initial starting point in the generation of a complete 3D head model. In certain embodiments, the number of landmark points on the reconstructed face mask 604 advantageously matches the number of landmark points on the generic head model 608 to create a one-to-one correspondence. In certain embodiments, FIGS. 5 and 6 graphically illustrate Block 215 of the 3D head model generation process 200.

FIG. 7 illustrates a set of basis head models 710A-710D and a blend fit head model 712, in accordance with certain embodiments of the invention. For example, FIG. 7 provides a simplified illustration of Block 220 of the process 200, wherein a blend fit model is generated using one or more basis head models. In particular, FIG. 7 depicts a blend fit model 712 generated from a combination of four basis head models 710A-710D, the combination being derived according to a weighted ratio of 3:2:4:1. In certain embodiments, the blend fit model 712 is generated to reduce the distance, in the aggregate, between corresponding points of a reconstructed face mask and a blend fit model. It will be understood that FIG. 7 is for exemplary purposes only and that, in other embodiments, a variety of other ratios and/or number of basis head models can be used to create the blend fit model 712.

In yet other embodiments, the blend fit model 712 can be generated by mixing and matching different portions of various basis head models 710A-710D to merge and create a new head model best matching the characteristics and proportions of the individual. For instance, each of the basis head models 710A-710D can be partitioned into different sections (e.g., jaw, ears, forehead) for comparison with the corresponding section of a reconstructed face mask.

In certain embodiments, the processor 102, in executing the blend fit module 124, generates a 3D head model that more closely fits the actual head of the individual in comparison to a generic head model. For instance, FIG. 8A illustrates a reconstructed face mask 804 aligned with a generic head model 808, wherein the generic head model 808 has a longer, thinner shape than the actual head of the individual.

FIG. 8B illustrates the same mask 804 associated with a blend fit model 812, which more closely fits the actual shape of the individual's head and results in a more accurate, individualized 3D head model, in accordance with certain embodiments of the invention. It should be appreciated by one of ordinary skill in the art, upon reading this disclosure, that the use of basis models advantageously overcomes the difficulty of recreating an entire head model from a reconstructed face mask that accurately matches the proportions and unique features of the individual's head.

FIG. 9A illustrates an exemplary 3D head model before an extrapolation process (e.g., execution of the extrapolation module 128). In particular, FIG. 9A depicts several target areas 918A-918D identified around the perimeter of the face region, from which textural and color information are extracted for extrapolation to the remainder of the head (such as during Block 235 of the process 200). FIG. 9B illustrates a completed 3D head model 920 after extrapolation.

Figure 10:
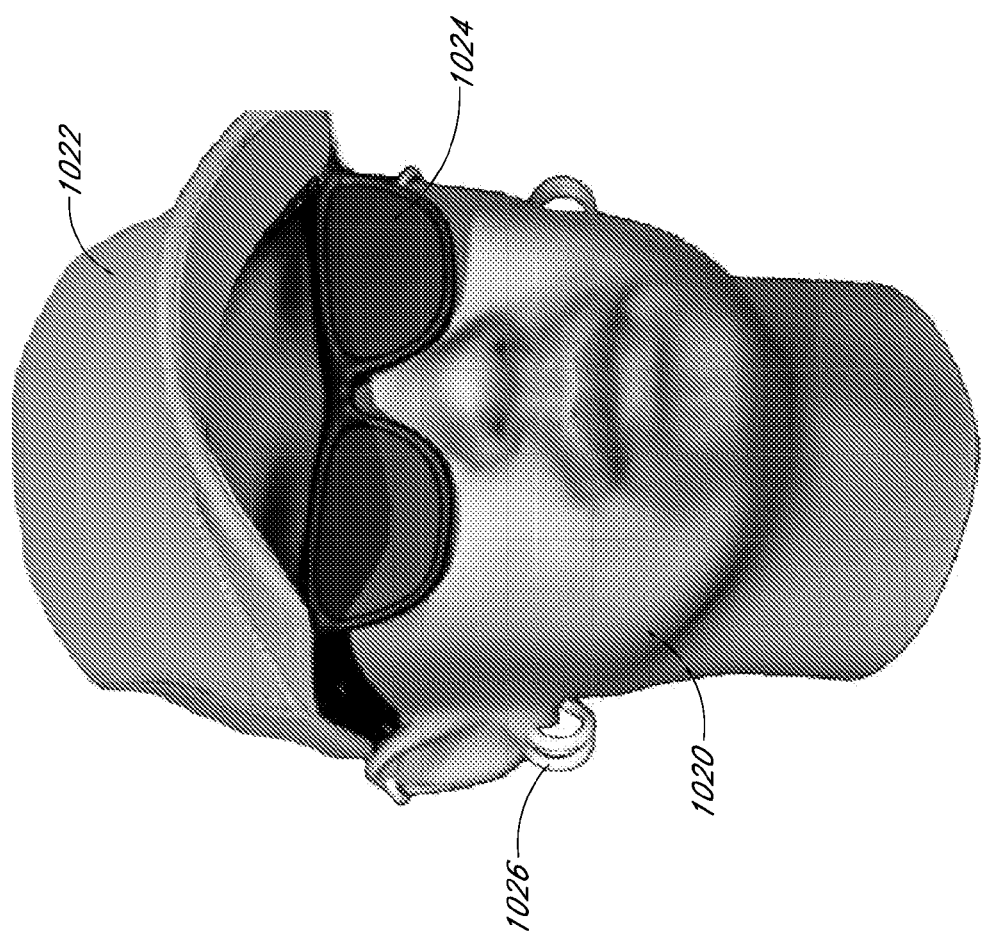
FIG. 10 illustrates a completed 3D head model with optional accessories, in accordance with an embodiment of the 3D head model generation process of FIG. 2.

FIG. 10 illustrates a completed 3D head model 1020 based on the input images 402 of FIG. 4A, according to certain embodiments of the invention. Moreover, the head model 102 includes additional optional accessories, including a hat 1022, sunglasses 1024, and earrings 1026, which can be added, for example, during Block 240 of the process 200.

Figure 11:
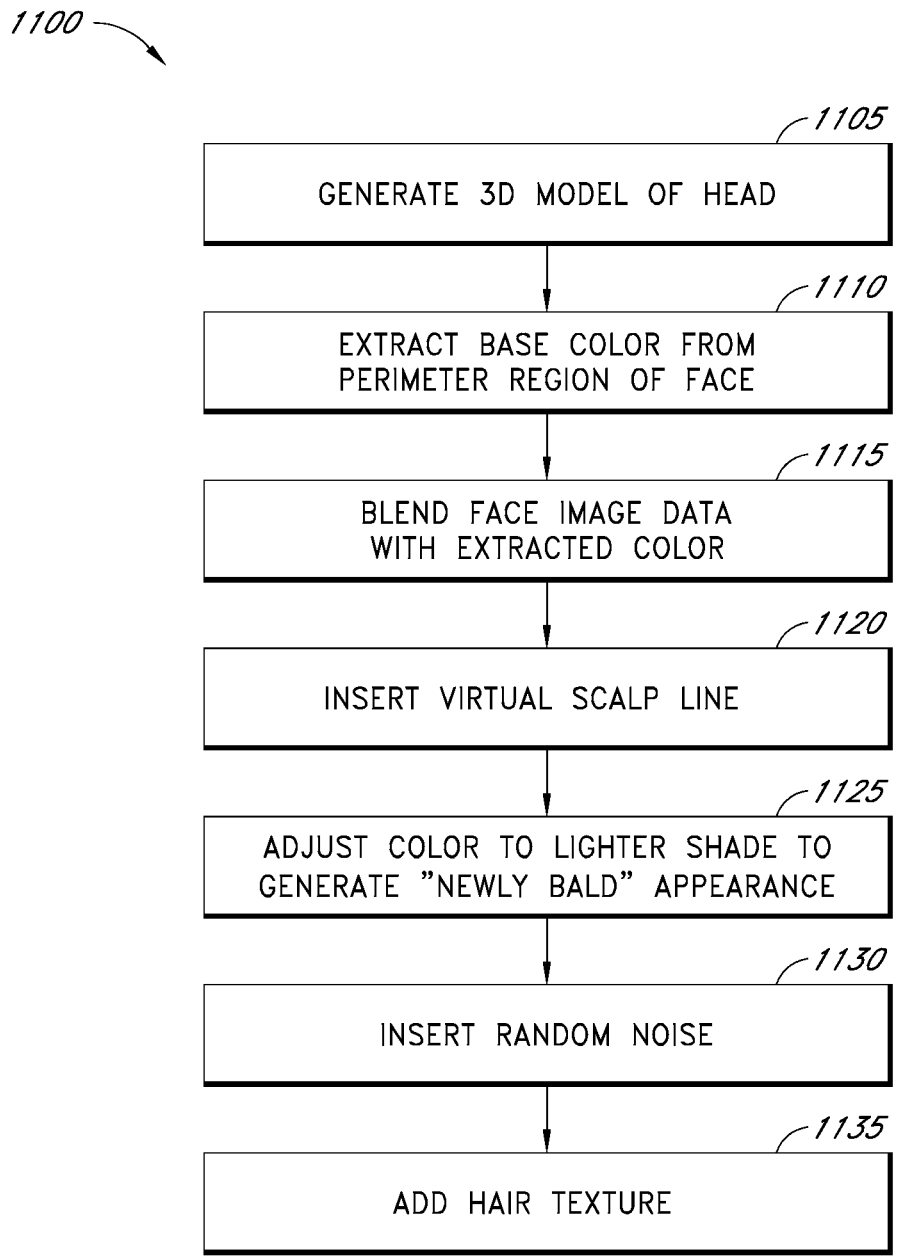
FIG. 11 illustrates a flowchart of an exemplary embodiment of an extrapolation process executed during the 3D head model generation process of FIG. 2.

FIG. 11 illustrates a flowchart of an exemplary embodiment of an extrapolation process 1100. In certain embodiments, the extrapolation process 1100 can be performed as Block 235 in the 3D head model generation process 200 of FIG. 2 to more fully define color and texture features of a head model beyond the boundary of a 3D mask. For exemplary purposes, the extrapolation process 1100 will be described with reference to the components of the 3D head model generation system 100 of FIG. 1.

As shown, the extrapolation process 1100 begins at Block 1105, where the processor 102 generates an individualized 3D head model. In certain embodiments, the head model can be generated according to Blocks 205-230 of the 3D head model generation process 200 of FIG. 2.

At Block 1110, the processor 102 extracts a base color and/or texture of the individual's face at a plurality of extrapolation points selected from a perimeter region of a reconstructed face mask. For instance, in certain embodiments, the processor 102 advantageously detects the facial skin perimeter using edge and color information and selects extrapolation points on the inner edge of the facial skin perimeter from which skin color and/or texture information is gathered to extrapolate to the remainder of the head. In certain embodiments, the plurality of extrapolation points advantageously includes each pixel around the facial perimeter. The facial skin perimeter can be detected using a skin detection method, wherein skin classifiers are generated from training samples and used to determine whether a particular pixel is skin or non-skin based on the pixel's extracted color value.

At Block 1115, the processor 102 blends the face image data with the extracted skin color and/or texture from Block 1110. At Block 1120, a virtual scalp line is inserted or demarcated on the 3D head model. For instance, in certain embodiments, the virtual scalp line can comprise a curvilinear contour corresponding generally to the extent of the subject's hair. This can include, but is not limited to, eyebrows and any facial hair features.

At Block 1125, the processor 102 adjusts the extracted base color and/or texture to a lighter shade within the boundary of the virtual scalp line. In some embodiments, this can be considered to give a "newly bald" appearance to the 3D head model, as shown in FIG. 9B.

At Block 1130, the processor 102 can insert random noise into the 3D head model to control reflectance properties for any distinct skin variations, such as blemishes, freckles, birthmarks, moles, facial hair, pore structure and the like so that, in certain embodiments the facial surface generated 3D head model is not perfectly smooth, but more accurately reflects the texture of the individual's actual face. In certain embodiments, the random noise is based on either a male or female baseline model. In yet other embodiments, the noise can be further customized to correspond to the actual face or characteristics of the individual. For instance, variations of noise patterns can be based on age, ethnicity, or other factors.

At Block 1135, the extrapolation process 1100 ends with the processor 102 optionally adding hair texture within the virtual scalp line region. Again, in some embodiments, this can include eyebrows and any facial hair features of the subject.

Figure 12:
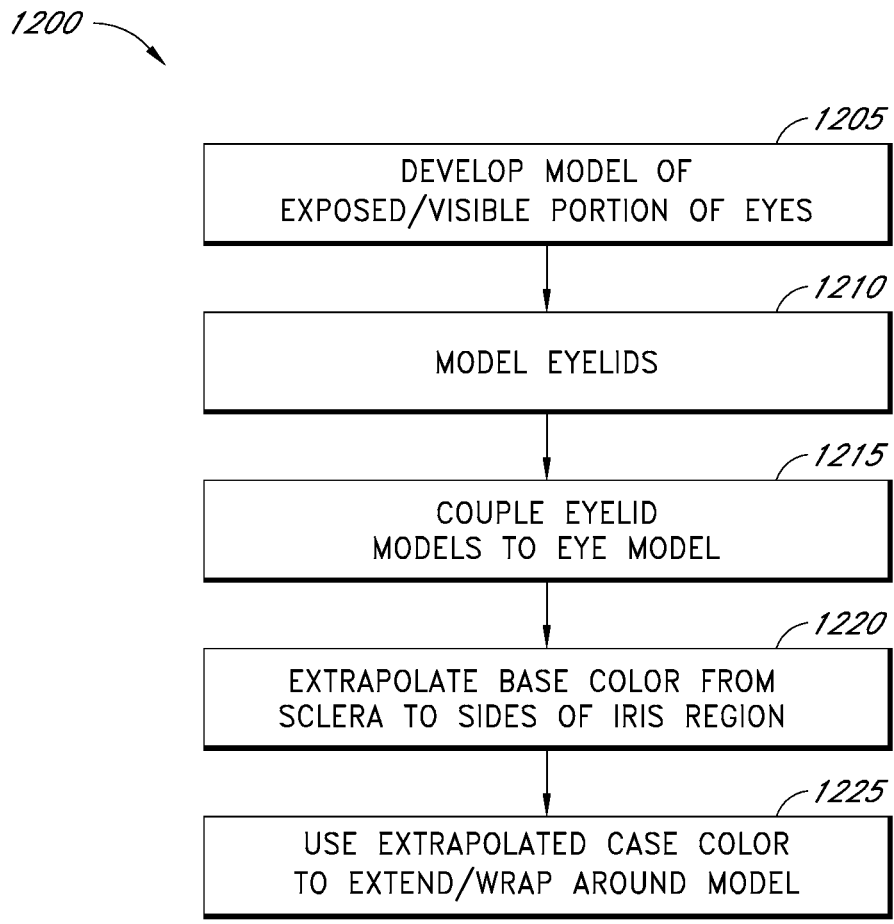
FIG. 12 illustrates a flowchart of an exemplary embodiment of an eye modeling process executed during the 3D head model generation process of FIG. 2.

Some embodiments of the invention are further directed at least partially to systems and methods for modeling a subject's eyes. FIG. 12 illustrates a flowchart of an exemplary embodiment of an eye modeling process 1200 that can be used with embodiments of the invention, such as in the 3D head model generation process 200 of FIG. 2. For exemplary purposes, the eye modeling process 1200 will be described with reference to the components of the 3D head model generation system 100 of FIG. 1.

As illustrated in FIG. 12, at Block 1205 the processor 102 generates a model of the exposed, or visible, portion of a subject's eyes. In some embodiments, the exposed or visible portion of the eyes corresponds to surfaces of the eyes that are not normally obscured by the eyelids or eye socket region disposed behind the visible portion.

At Block 1210, the processor 102 models eyelids of the subject. At Block 1215, the processor 102 couples the eyelid models to the eye model. In some embodiments, movement of the eye model and associated eyelids is performed in unison for up and/or down motion of the eye/eyelids. Such coupling can advantageously provide a more realistic visual representation of natural eye movement and reduce an artificial or fake appearance to the eye model.

At Block 1220, the processor 102 extrapolates a base color of the eye model. In some embodiments, this base color extrapolation can occur generally from the sclera region disposed generally to the sides of the iris, or colored portion of the eye. In certain embodiments, the processor 102 detects the outer perimeter of the iris using edge and color information and then extrapolates scleral portions outside the outer perimeter of the iris. In some embodiments, the extrapolated base color can be non-uniform. For example, in certain embodiments, a base color on the inner sides of the eyes can be redder than a base color on the outer sides of the eye. In some embodiments, this can provide a more accurate model of a subject's eyes as subjects often have a higher concentration of visible blood vessels and capillaries disposed on the inner sides of their eyes, for example, adjacent the nose.

At Block 1225, the processor 102 extends or wraps the extrapolated base color around the model of the exposed portion of the eye. The extension or wrapping around of the model can be utilized for left and right movement of the eye. In some embodiments, movement of the eye model is not coupled to movement of the eyelid model for left/right movement.

One exemplary use for the individualized 3D head models generated by the 3D head model generation process 200 is the creation of personalized media content. The personalized media content can include, without limitation, still images, video, advertisements, animations, cartoons, video games, computer games, combinations of the same, or the like. In certain embodiments, an individual can "insert" his or her individualized 3D head model (i.e., digital likeness) into a preexisting movie, thus enabling the individual to become the "star" of the movie. Embodiments can include face reconstructing systems and methods and/or full body reconstructing systems and methods. Some embodiments allow individuals to create full facial and body renderings that can then easily be altered to mirror the quality of predefined media content. Moreover, in certain embodiments, the user's digital likeness includes not only the individual's physical appearance, but the individual's voice as well.

Figure 13:
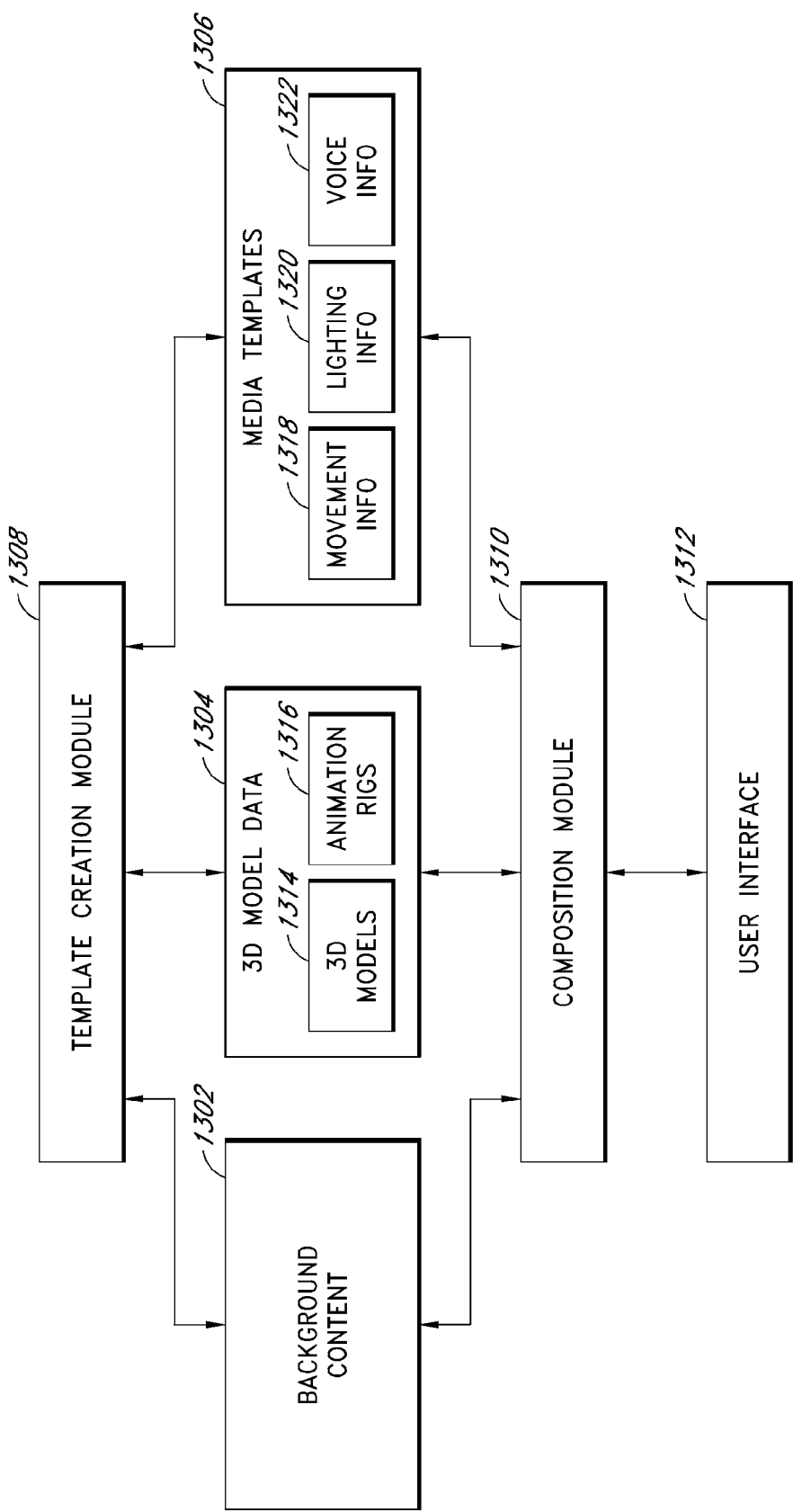
FIG. 13 illustrates a block diagram of a system for creating personalized media content, in accordance with an embodiment of the invention.

FIG. 13 illustrates a block diagram of an exemplary embodiment of a media content personalization system 1300. In certain embodiments, the media content personalization system 1300 automatically generates the personalized media content in one-click fashion (e.g., a user inserts a DVD into a player or selects a predefined media template). In other embodiments, the media content personalization system 1300 allows users to create a personalized piece of media content on their own using an end-user media composition tool.

As shown in FIG. 13, the system 1300 for creating personalized media content comprises background content 1302, 3D model data 1304, media templates 1306, a template creation module 1308, a composition module 1310, and a user interface 1312. The background content 1302, in certain embodiments, provides a prerecorded media into which the 3D head model of the user is to be "inserted." For example, the background content 1302 can include, without limitation, a short video clip, a full-length video, an advertisement, a video game, a computer game, an online greeting card, a cartoon, a still image, a sequence of images, combinations of the same, or the like.

The 3D model data 1304, in certain embodiments, comprises a database of 3D models 1314 and/or animation rigs 1316 corresponding to each of the 3D models 1314. In certain embodiments, the 3D models 1314 can be generated by the individualized 3D head model generation system 100. In other embodiments, the 3D models 1314 can be generated by other 3D model generation processes. It should be appreciated by one of ordinary skill, upon reading this disclosure, that the 3D models 1314 can be either 2D or 3D representations, depending on the media content to be generated. For example, video games can allow for 3D representation, while still images may only allow for 2D representation of 3D models.

Associated with the background content 1302 are the media templates 1306. The media templates 1306, in certain embodiments, comprise data usable for "inserting" the individualized 3D model 1314 into the background content 1302. For example, the media templates 1306 can include information on how many default characters in the background content 1302 are available for "replacement" by images (2D or 3D) of one or more individuals. In certain embodiments, "insertion" or "replacement" means that the individualized 3D model is actually digitally or optically combined with the background content 1302. In other embodiments, "insertion" or "replacement" means that the individualized 3D model is layered on top of the background content 1302. Additional details regarding layering will be provided in connection with FIG. 14.

As shown, the media templates 1306 further comprise movement information 1318, lighting information 1320, and voice information 1322. In certain embodiments, the movement information 1318 includes the size of the 3D head model, the position of the 3D head model, rotation and/or movement of the 3D head model, alignment information, and/or other instructions for animating the individualized 3D model in accordance with the particular background media content selected by the user. In certain embodiments, the movement information 1318 advantageously comprises animation data that acts on the animation rigs 1316 associated with the 3D models 1314 to be used to create the personalized media content.

The lighting information 1320 can comprise frame-by-frame information regarding how the individualized 3D model 1314 is to appear "lit" or illuminated in accordance with the particular background media content selected by the user. For example, the lighting information 1320 can comprise color/hue information, brightness/darkness information, shadow information, transparency information, combinations of the same or the like.

The voice information 1322, in certain embodiments, determines how the 3D head model 1314 speaks in the personalized media content. For example, the voice information 1322 can comprise instructions for lip movement (e.g., lip synching to voice data), text to be converted to speech, voice recordings, combinations of the same, or the like. In other embodiments, the instructions for lip movement are included with the movement information 1318.

It should be appreciated by one of ordinary skill in the art, upon reading this disclosure, that the information contained in the media templates 1306 allows the end user to insert his or her digital likeness into a predefined media template simply by selecting the media template that he or she wants to star in. In addition, the information contained in the media templates 1306 advantageously allows for repeatability using one or more of the 3D models 1314 with the same background content.

The template creation module 1308, in certain embodiments, provides one or more graphical tools for assisting the user in creating personalized media content. In certain embodiments, the template creation module 1308 advantageously reduces the time that a user spends creating media templates 1306 by providing straightforward controls and automatically associating animation rigs with the 3D models 1314 to provide for replication with any other 3D model without having to recreate a new template. In certain embodiments, the template creation module 1308 creates media templates 1306 using the background content 1302 and the 3D model data 1304 as input.

The composition module 1310 receives the background content 1302, the 3D model data 1304, and media templates 1306 to generate personalized media content. In certain embodiments, the personalized media content is output to the user interface 1312. In other embodiments, such personalized media content is stored in a memory for later viewing or transmitted to a remote computing device, such as via the Internet.

In certain embodiments, the media templates 1306 are predefined media templates that were previously created using generic 3D models or other 3D models and stored in memory. In certain embodiments, the composition module 1310 is configured to insert an individualized 3D model of the user (e.g., one of the 3D models 1314) into the background content 1302, along with the data from a user-selected predefined media template (e.g., movement information 1318, lighting information 1320, and voice information 1322). For instance, in embodiments wherein the 3D models 1314 comprise head models, the composition module 1310 "replaces" the head of at least one of the identified default characters in the background content 1302 with an individualized 3D head model (e.g., one of 3D models 1314). In other embodiments, the composition module 1310 is configured to insert a plurality of the 3D models 1314 into background content 1302.

In certain embodiments, the system 1300 allows a user to composite an individualized 3D model into a predefined media template through the composition module 1310 simply by selecting the predefined media template and the 3D models 1314 to be inserted. In other embodiments, the 3D models 1314 are selected automatically and inserted into the user-selected, predefined media template. In yet other embodiments, the system 1300 allows a user to create new media templates using the template creation module 1308.

In certain embodiments, the composition module 1310 is a component of the template creation module 1308. In some embodiments, the template creation module 1308 and the composition module 1310 reside on a remote server in network communication with the user interface 1312. In other embodiments, the template creation module 1308 and the composition module 1310 reside on the user interface 1312.

The user interface 1312 can comprise any type of computing device, such as a network computer, a server, a PDA, a workstation, a smartphone, a laptop, a virtual device, or the like. In certain embodiments, the user interface 1312 comprises a display and one or more input devices.

Although the system 1300 for creating personalized media content has been described with reference to particular embodiments, alternative arrangements can also be used. For instance, in certain embodiments, the background content 1302 and the media templates 1306 can be combined such that each media template includes both the background content 1302 and the information necessary to replace one or more characters in the background content, such as the movement information 1318, the lighting information 1320, and/or the voice information 1322.

Figure 14:
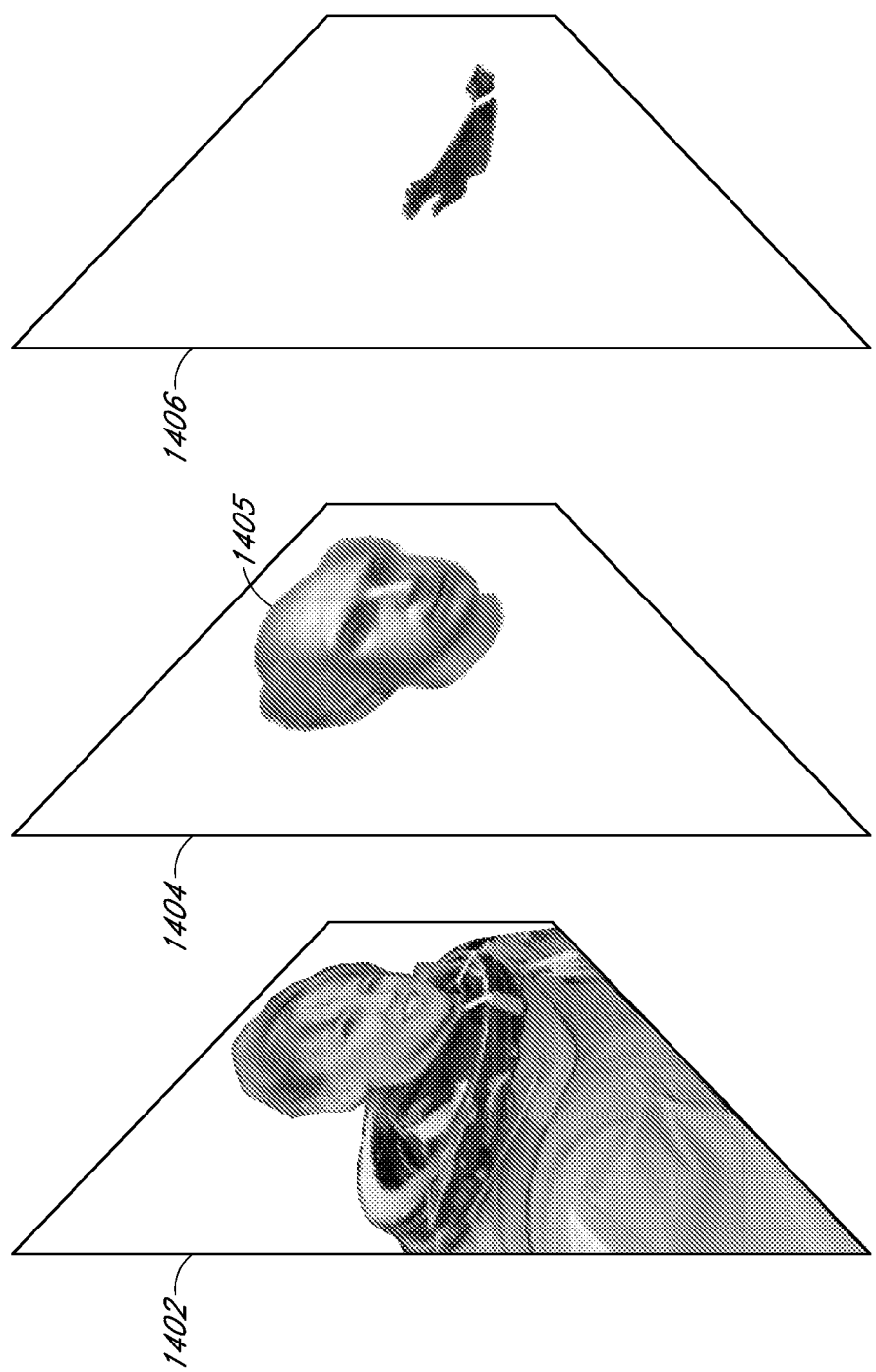
FIG. 14 illustrates an exemplary embodiment of layers usable by the system of FIG. 13 to form personalized media content, in accordance with an embodiment of the invention.

FIG. 14 illustrates an exemplary embodiment of three separate content layers that, when combined by the composition module 1310, form personalized media content that can be output to the user interface 1312. In certain embodiments, each content layer comprises data that can be stored and reproduced independently of the other content layers. In other embodiments, the content layers are merged into a single media file, e.g., a RIFF (Resource Interchange File Format) file.

For example, a background layer 1402 can include a video or still image that provides the setting for the personalized media content. In certain embodiments, the background layer 1402 comprises a video clip, an advertisement, a video game, a computer game, a cartoon, an animation, an online greeting card, a still image, a sequence of images, combinations of the same, or the like. In one embodiment of background video content, the background layer 1402 is stored as H.264-coded video stream data.

Overlaying the background layer 1402 is a personalized intermediate layer 1404, which can be still or animated. In certain embodiments, the intermediate layer 1404 includes an image 1405 of one or more individuals and/or objects to be "inserted" into the background video or image. In certain embodiments, the intermediate layer 1404 is transparent, or substantially transparent, except for the images 1405. In certain embodiments, the intermediate layer 1404 further includes information for conforming the image 1405 to the background layer 1402. For example, the intermediate layer 1404 can comprise the movement information 1318, the lighting information 1320, and the voice information 1322 discussed above with respect to the media templates 1306. In one embodiment, the intermediate layer 1404 is stored as a Collada file.

As illustrated in FIG. 14, the image 1405 of the intermediate layer 1404 can comprise a 2D representation of a lifelike head model, such as an individualized 3D head model generated by the 3D head model generation system 100. In other embodiments, the image 1405 comprises a 3D representation of an individualized head model generated by 3D head generation system 100. In yet other embodiments, the image 1405 can be a 2D or 3D representation of an individualized head model generated by other modeling systems and processes.

FIG. 14 further illustrates a foreground mask layer 1406 that overlays the personalized intermediate layer 1404. In certain embodiments, the foreground mask layer 1406 can be still or animated depending on the content of the background layer 1402. The foreground mask layer 1406 can advantageously be used to provide touch-up detail to the personalized media content.

For example, in certain embodiments, the foreground mask layer 1406 comprises any content that is to be displayed in front of the image 1405 of the intermediate layer 1404. Such content can include content from the background layer 1402 that would generally be located underneath (hidden by) the image 1405 of the intermediate layer 1404. In other embodiments, the foreground mask layer 1406 can include additional content not found in the background layer 1402 (e.g., accessories for the image 1405).

In certain embodiments, content in the foreground mask layer 1406 can comprise portions or images that cover or overlay the intermediate layer 1404. In other embodiments, content in the foreground mask layer 1406 can designate portions of the intermediate layer 1404 as transparent, thereby causing portions of the corresponding background layer 1402 to be visible through the intermediate layer 1404. In one embodiment, the foreground mask layer 1406 is stored as H.264-coded video stream data.

Although three templates or layers have been described herein, other embodiments of the invention can include more or fewer layers. Furthermore, one or more of the layers and/or templates can be stored separately or together as a single file. Moreover, in certain embodiments, the content of the background layer 1402 is advantageously stored and/or acquired separately from the other layers. For example, a user may acquire the background layer 1402 from a CD, a DVD, a data file, a streaming source over a network (e.g., the Internet), or other like video content storage means. As a result, the content corresponding to the intermediate layer 1404 (e.g., 3D head models, animation data, and/or voice data) can advantageously be layered on top of the background layer 1402 without copying or altering the content of the background layer 1402.

FIGS. 15A-15E illustrate various stages of a template creation process for creating media templates using the template creation module 1308, according to certain embodiments of the invention. For exemplary purposes, the media template creation process will be described with reference to the components of the media content personalization system 1300 and the content layers depicted in FIG. 14.

Figure 15A:
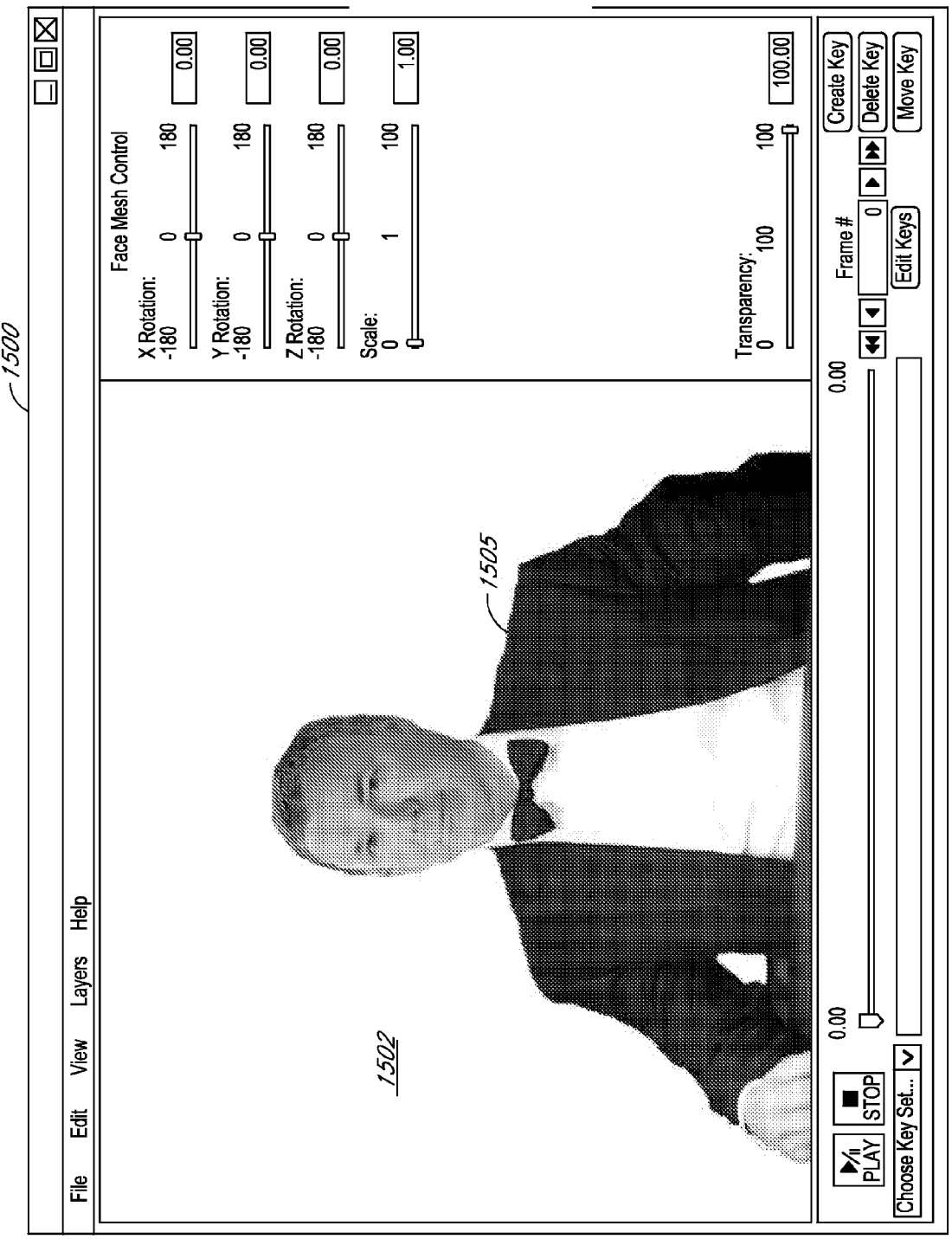
FIGS. 15A-15E illustrate an exemplary embodiment of a user interface of a template creation tool usable with the system of FIG. 13.

In particular, FIG. 15A illustrates a screen display of an exemplary embodiment of a graphical user interface of a template creation tool 1500 for creating media templates 1306. In certain embodiments, the template creation module 1308 of FIG. 13 generates and/or updates the template creation tool 1500 and displays the tool 1500 through the user interface 1312. In certain embodiments, the template creation tool 1500 advantageously comprises a consumer software program having a user-friendly graphical interface that allows individuals with little or no image editing experience to generate personalized media content. As shown, the user interface comprises a plurality of controls for template creation and/or manipulation.

To begin the template creation process, the user can load or select a still image or video as the background layer, which is displayed through a viewer window 1502. In certain embodiments, the user selects the background image from a plurality of stored images (e.g., background content 1302). In yet other embodiments, the user can load any type of digital image file or data that can serve as a background layer (e.g., a photograph or custom video clip), such as via an external device and/or a network (e.g., the Internet).

Figure 15B:
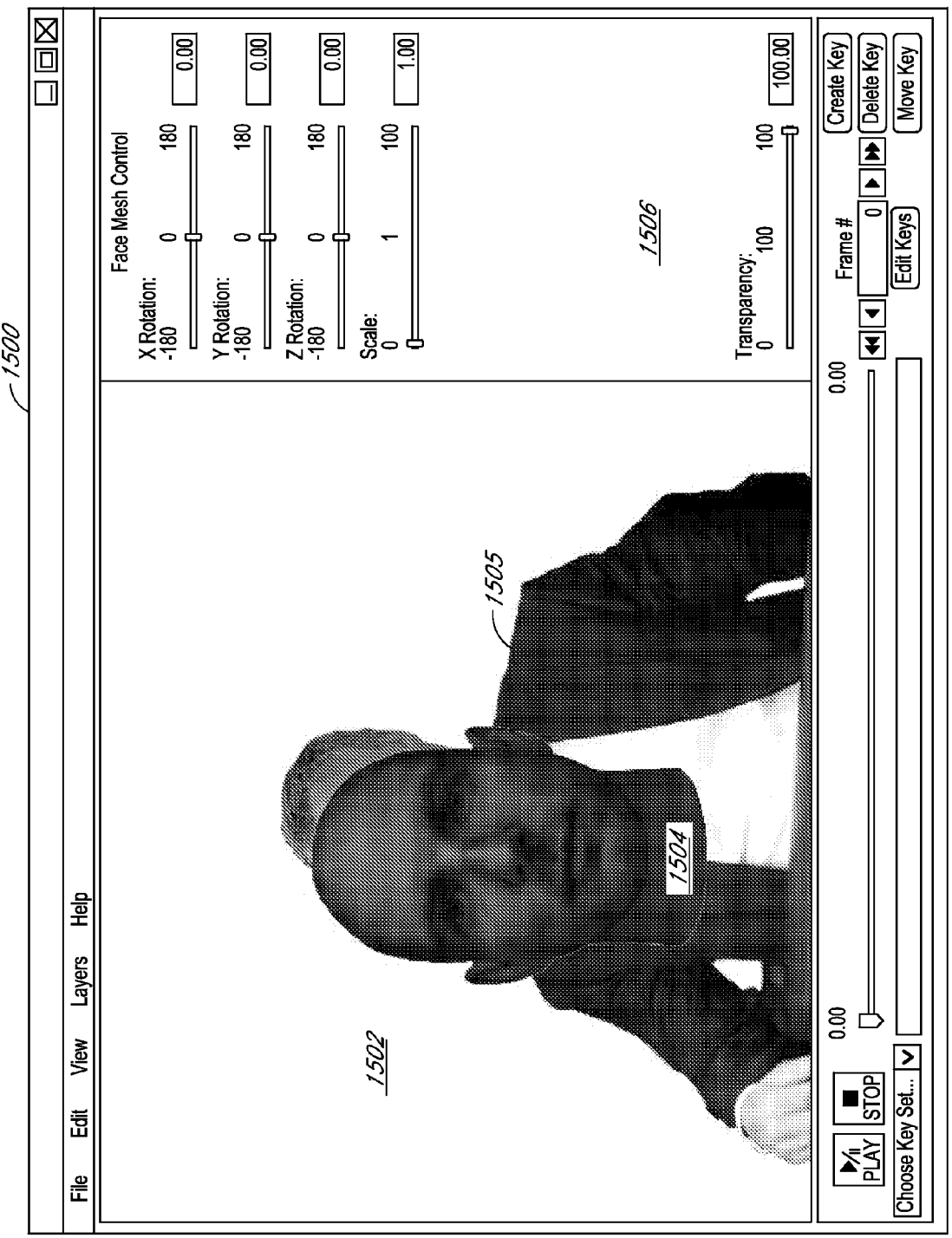
Figure 15C:
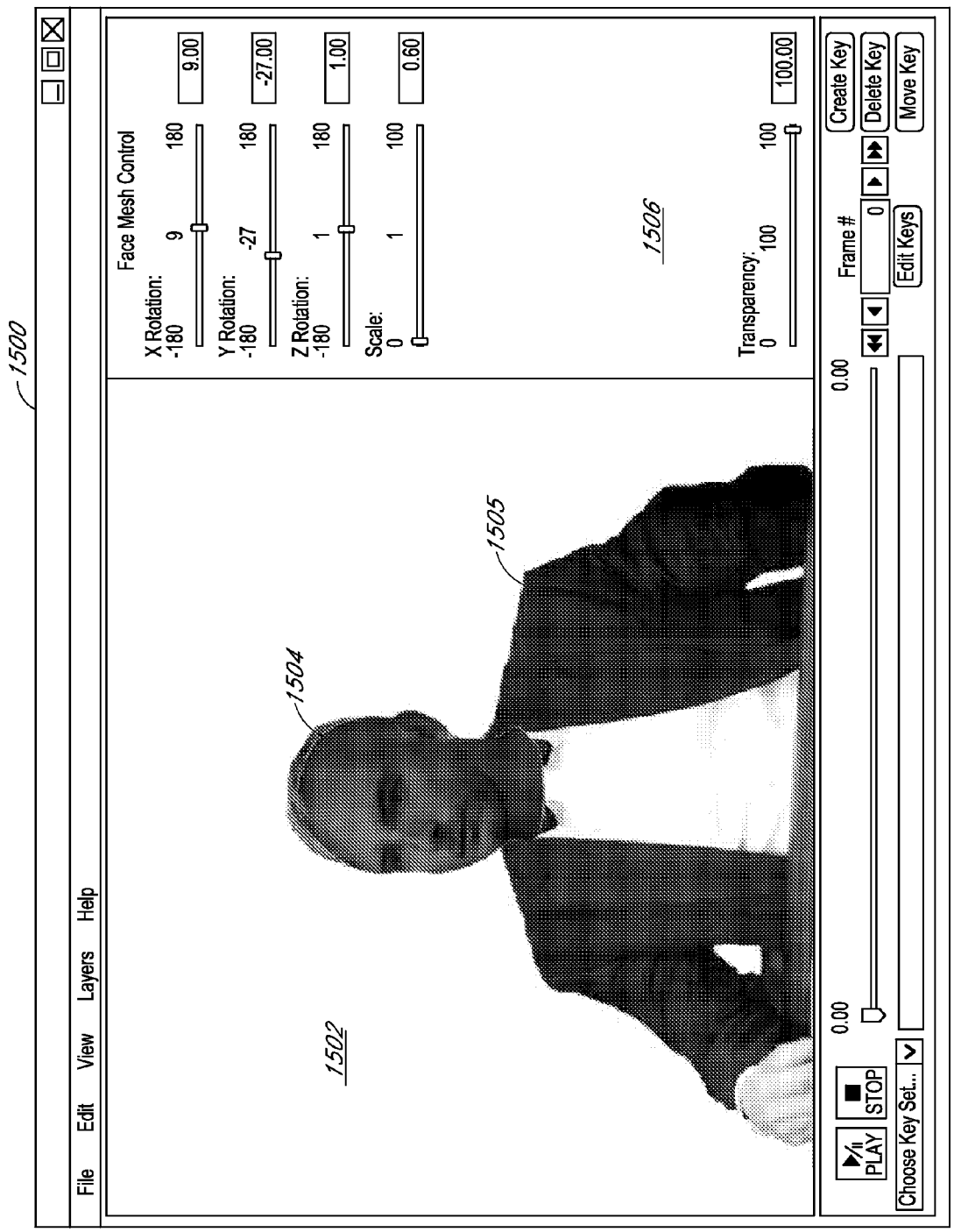

The user then selects a 3D head model 1504 to overlay the background layer (see FIG. 15B). Using a mouse or other like input means, the user scales, rotates and/or positions the 3D head model 1504 to match a corresponding portion of the background image (see FIG. 15C). For example, the user can manipulate the 3D head model 1504 so that it overlays a head of a character 1505 in the background content. This alignment information of the 3D head model within the frame can be stored in memory as movement information 1318.

As shown, the template creation tool 1500 includes face mesh controls 1506 that can be used to modify the 3D head model 1504 and/or to store data relating thereto for future use (e.g., to replicate the media content personalization process with a different 3D head model). In certain embodiments, the face mesh controls 1506 include slider input devices for scaling, for transparency, and/or for 3-axis rotation. In other embodiments, the user can also orient the 3D head model 1504 by clicking and dragging the 3D head model 1504 with an input device.

Figure 15D:
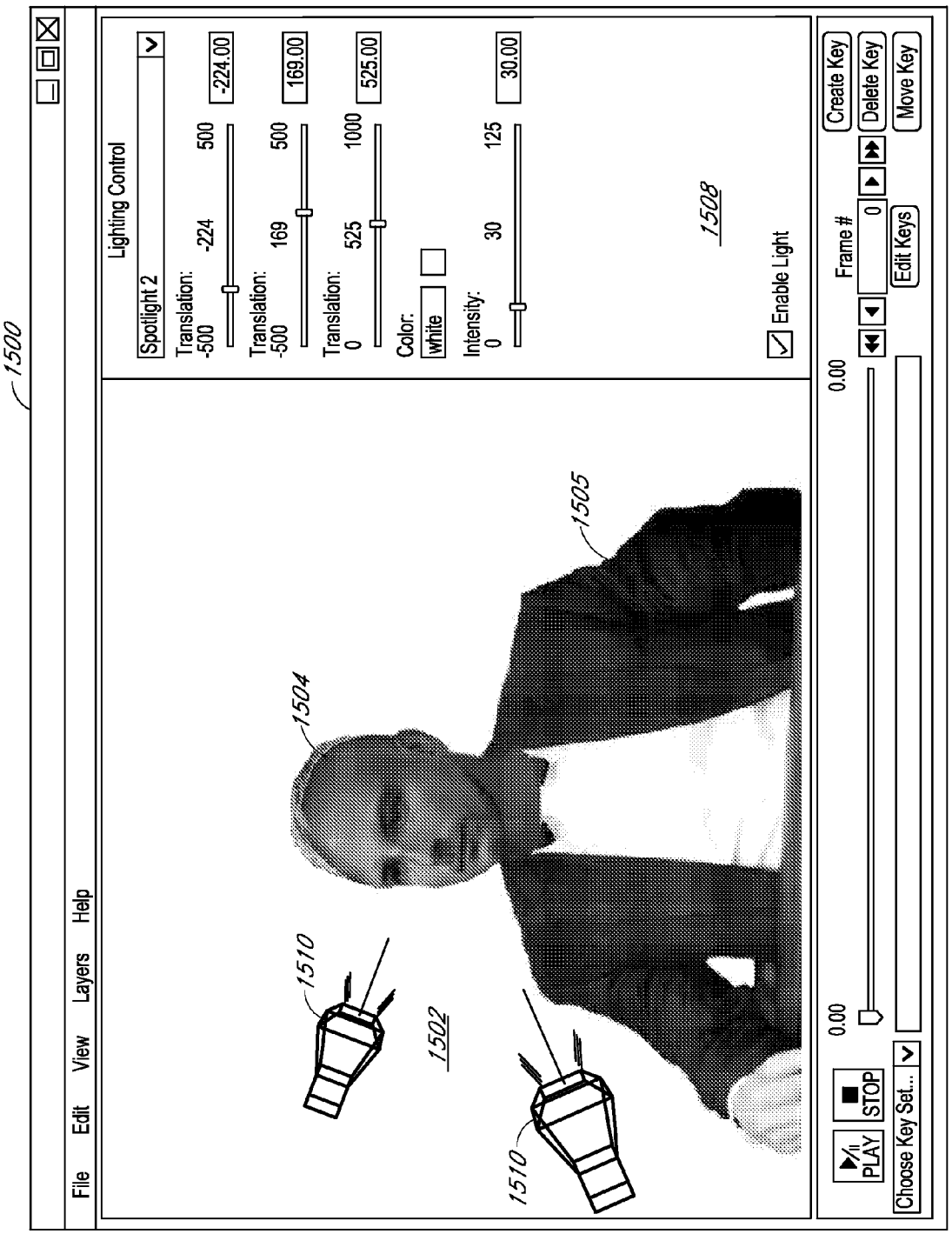

FIG. 15D illustrates an exemplary technique for modifying the lighting associated with the 3D head model 1504. In particular, the template creation tool 1500 includes a lighting control panel 1508 that allows a user to select properties of one or more spotlights 1510 that affect the lighting of the 3D head model 1504. For example, in certain embodiments, the user can control one or more of the following with respect to each of the spotlights 1510: x-axis translation, y-axis translation, z-axis translation, color, hue, and intensity. In certain embodiments, the user can also modify the lighting effects by clicking on one or more spotlights 1510 and dragging the spotlight to an appropriate location. For instance, moving the spotlight 1510 closer to the head model 1504 can have the effect of increasing the amount of light (e.g., intensity) shining from the spotlight 1510 onto the 3D head model 1504.

Figure 15E:
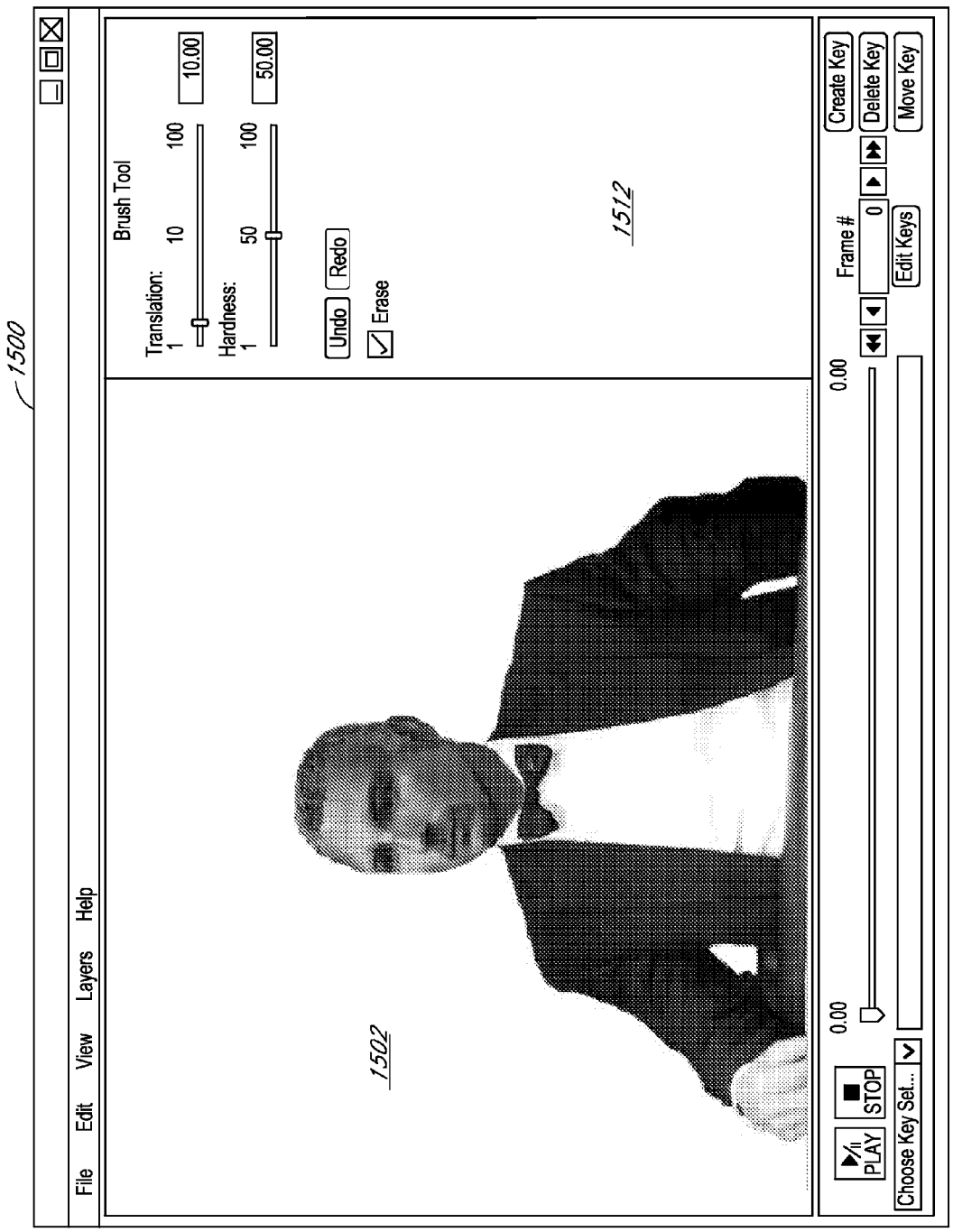

FIG. 15E illustrates the creation of a foreground mask layer, according to certain embodiments of the invention. For instance, the user can utilize a brush tool 1512, such as by using a mouse or other input device, to "paint" anything in the background layer that needs brought forward in front of the 3D head model 1504. In particular, the brush tool 1512 copies image data under the brush from the background layer to the foreground mask layer (e.g., hair, shirt collar). In other embodiments, the template creation module 1500 allows the user to make selected portions of the 3D head model 1504 transparent, while keeping other portions non-transparent, thus allowing the background layer to be visible through the intermediate layer.

In certain situations when creating personalized image content, an important consideration for life-like representations is the appearance of the neck region. Oftentimes, the position, size and/or orientation of the neck of a head model can have a substantial impact on how well the head model blends in with a neck image in the background layer. For instance, FIG. 16 illustrates three versions of a 3D head model 1605A, 1605B, 1605C with various neck boundaries. Such boundaries can be defined, for example, through designing the foreground mask layer via the template creation tool 1500.

Figure 17:
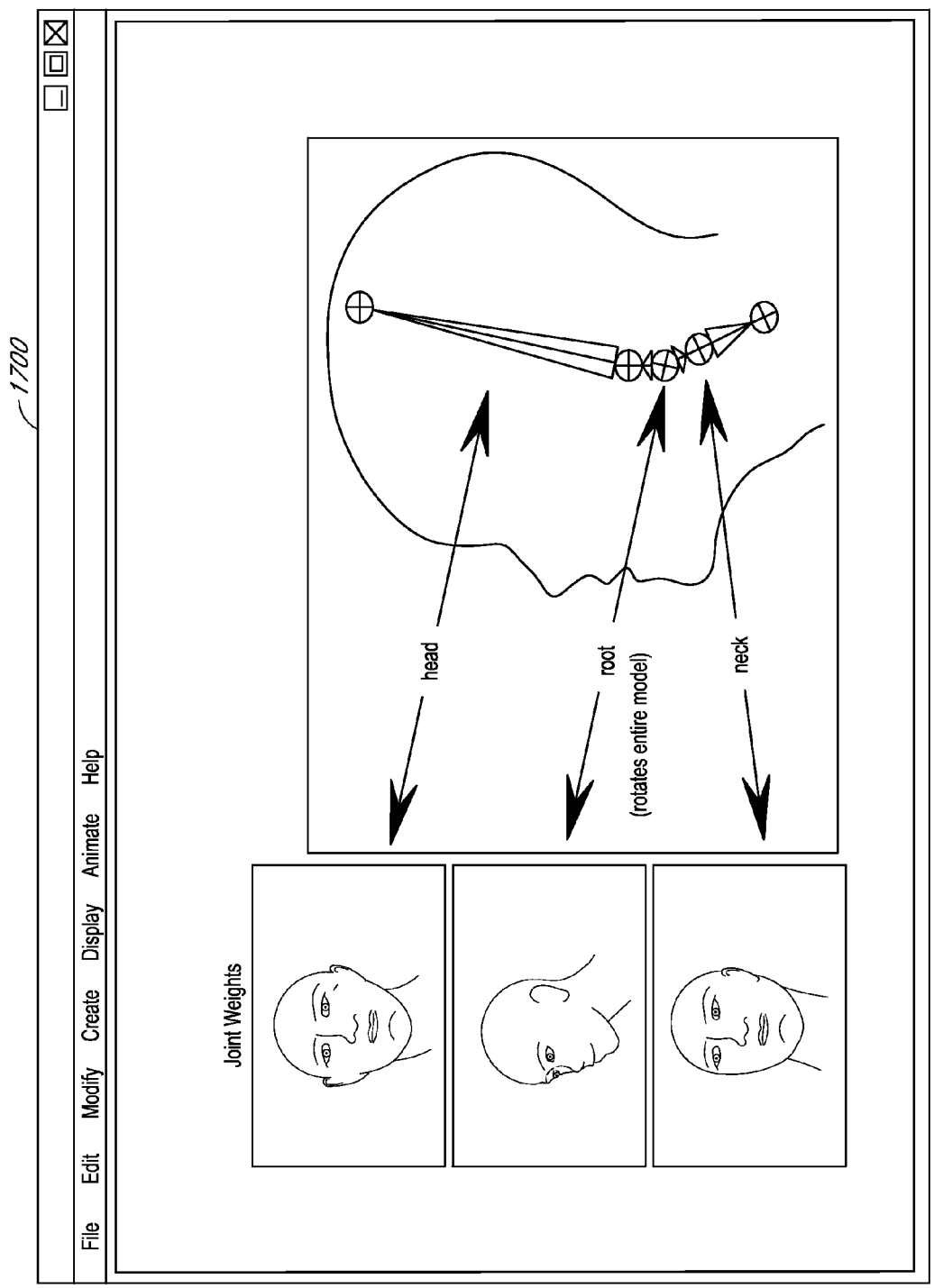
FIG. 17 illustrates an exemplary embodiment of a user interface of a media template creation tool usable with the system of FIG. 13.

Thus, embodiments of the template creation tool 1500 can advantageously comprise composition tools for manipulating and/or controlling a neck of a 3D head model for use in generating personalized media content. For example, FIG. 17 is a screen display of an exemplary embodiment of a graphical user interface of a composition tool 1700 for further customizing the neck of a 3D head model.

Certain embodiments of the composition tool 1700 can have multiple controls for aligning head geometry. In addition to rotation and translation of a head mesh, additional controls can be provided to enable better matching of the neck boundary of the head model to the background neck image. For example, the composition tool 1700 can include controls for modifying one or more of the following features: neck size blendshape, neck transparency, and neck pose.

Regarding neck size blendshape, a set of blendshapes can be provided to adjust the overall width and shape of the neck. Regarding neck transparency, the neck length can be adjusted using an opacity map applied to the head geometry. A feathered boundary allows smooth blending of the neck seam into the background neck image (see, e.g., FIG. 16). Regarding neck pose, the pose of the neck can be adjusted relative to the head. In certain embodiments, the specific bone structure associated with the head model is not limited. For instance, one arrangement creates two simulated joints that allow the head and neck to be oriented independently. This provides the template creator with the ability to pose the entire head mesh, and then make fine touches to the neck pose without modifying the overall head pose.

Although the media template creation process has been described with reference to particular embodiments, it should be understood that other means and/or features can be used to personalize an image. For instance, the template creation tool 1500 can include brightness, saturation, and/or hue controls to modify the 3D head model 1504 (e.g., a skin color) and/or the background layer. In other embodiments, a global light can be used to adjust the lighting of content of a scene.

Moreover, the template creation tool 1500 can include means for adding voice content and/or mouth animation content to cause the 3D head model to "lip sync" a corresponding audio track. Exemplary voice personalization systems and methods are described in further detail with respect to FIGS. 18-22.

In yet other embodiments, the above-described media template creation process can be used to customize a video image. For instance, the template creation process can be used for multiple frames to adjust the 3D head model 1504 for each frame. For example, the template creation process illustrated in FIGS. 15A-15E can be repeated for several key frames of the video content. In certain embodiments, such key frames are the important frames that can help to define movement of a character in an animation sequence. In yet other embodiments, the key frames are identified according to a particular frequency (e.g., every ten frames).

In certain embodiments, the key frames can specify the starting and ending position of an object of the 3D head model, such as a mouth corner. The template creation tool 1500 can then advantageously generate frames between the key frames that provide smooth translation of the object from the starting point to the ending point. In certain embodiments, this interpolation process, or "tweening," provides for simulated movement of the 3D head model without requiring the user to manually define a position of the 3D head model for each frame of the video content. In certain embodiments, the template creation tool 1500 can further provide transparency or flicker back and forth between two frames during playback such that the 3D head model of each frame can be seen at the same time for fine tuning.

Moreover, in certain embodiments, for each media template that is created, the template creation tool 1500 advantageously saves the alignment, lighting, animation, and/or other settings relating to the customization of the 3D head model 1504 in memory (e.g., as movement information 1318 and lighting information 1320). This allows for subsequent use of the media template with other 3D head models without requiring the user to manipulate (e.g., orient, rotate, adjust lighting) the features of the second 3D head model. In addition, for video templates, the template creation tool 1500 can save alignment, lighting, animation, voice, and other data for multiple frames in order to reproduce simulated movement of the 3D head model in a video.

In certain embodiments, one or more templates can be created by experienced 3D production houses. For instance, experienced and/or skilled users can use the tools at hand to make the template(s) for later use by less-experienced users. This allows users to insert themselves into media content simply by selecting desired predefined background content (e.g., inserting a DVD into a player, selecting a still image, or streaming a video clip from the Internet). In certain embodiments, the templates created by the experienced 3D production houses utilize generic head models with standardized geometry such that an animation rig can be applied to the generic head model, thus allowing for replication using any other individualized 3D head model.

In some instances, a user may want to personalize media content to not only include his or her digital appearance, but also to include his or her digital voice. Moreover, the user may want the mouth of the individualized model to move in correspondence with the words being spoken or sung. Therefore, in certain embodiments of system 1300, the media templates 1306 include voice information 1322 that enables a user to personalize video content or animated content with a voice track of the user. For instance, certain systems and methods allow a personalized 2D or 3D representation of a user to be inserted into a media template 1306 and to be facially animated so as to "lip sync" a corresponding voice track. In some embodiments, the voice track is generated using previously acquired voice characteristics of the user. This allows the system 1300 for creating personalized media content to incorporate the user's voice into the media content without requiring the user to submit a voice recording of the actual words contained in the background content.

In certain embodiments of the invention, a customizable template can be a packaged still image or video background, a 3D head model that is aligned and appropriately adapted (e.g., sized, lit) with the background, and a foreground mask used to blend the head into the background. A member site accessed by the user can be capable of combining the background layer, 3D head layer, and the foreground mask layer into a single image or video stream. The member site can be accessed by one or more communications devices. For example, certain embodiments allow a user to send a voice-personalized video greeting for viewing on a video-equipped cell phone, computer or like computing device using only a standard telephone. In certain embodiments, the member site combines the three layers using the composition module 1310 of FIG. 13.

In yet other embodiments, a user can customize the voice track or corresponding facial animation used for the personalized media content by selecting one or more predetermined emotional expressions from a graphical user interface. Moreover, in other embodiments, a user can send a voice track to a remote application/service and receive mouth animation channels back for use with a head model.

Figure 18:
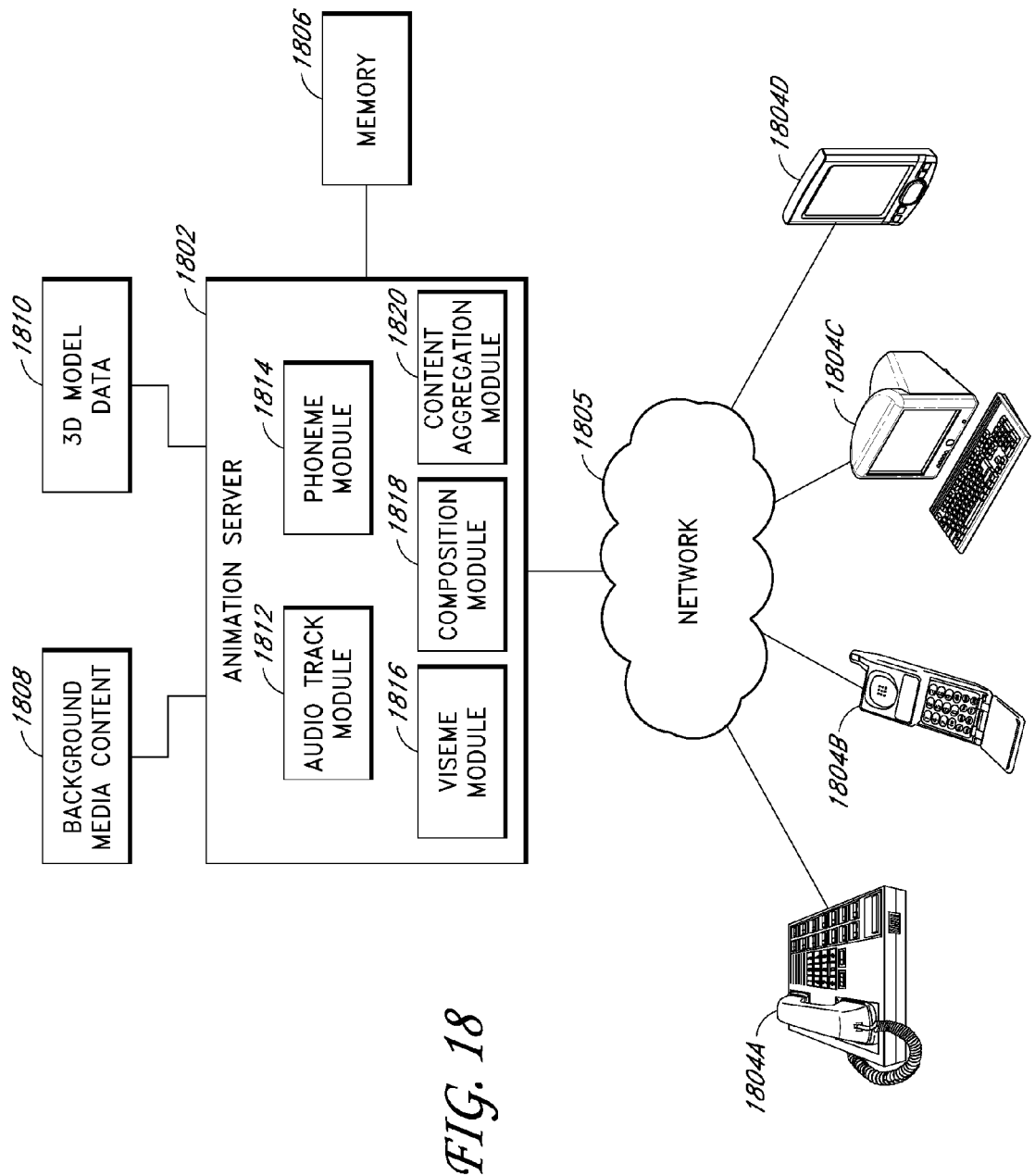
FIG. 18 illustrates a block diagram of a system for creating personalized media content with voice personalization, in accordance with an embodiment of the invention.

FIG. 18 illustrates a block diagram of an exemplary embodiment of a voice personalization system 1800. In certain embodiments, the voice personalization system 1800 enables a user to personalize video content with corresponding audio content that simulates the voice of the user. In general, the voice personalization system 1800 comprises an animation server 1802 in communication with one or more communications devices 1804 via a network 1805. The communications devices 1804 can be configured to transmit to and receive data from the animation server 1802. For example, the communications devices 1804 can transmit personalized voice recordings to the animation server 1802 to be associated with an individualized 3D model.

Communications devices 1804 can include any communications device capable of processing data and communicating, directly or indirectly, with a server, including, for example, a landline telephone 1804A, a cell phone 1804B, a personal computer 1804C, a portable computing device 1804D, and the like. In certain embodiments, the communications devices 1804 can comprise a display portion (e.g., monitor, LCD) and/or one or more input devices (e.g., keyboard, touch screen, mouse).

The illustrated network 1805 advantageously comprises any means for communicating data between two or more systems of components. In certain embodiments, the network 1805 comprises a telecommunications network. For example, the network 1805 can comprise a public network such as the Internet, a virtual private network (VPN), a token ring or TCP/IP based network, a wide area network (WAN), a local area network (LAN), an intranet network, a wireless network, a cellular network, a telephone network, a broadband network, a baseband network, a satellite network, a point-to-point link, a two-way cable system, combinations of the same, or the like.

The voice personalization system 1800 further comprises memory 1806, background media content 1808, and 3D model data 1810. In certain embodiments, the memory 1806 stores the background media content 1808 and/or 3D model data 1810, as well as the output personalized media content from the animation server 1802.

In certain embodiments, the background media content 1808 comprises media content capable of voice personalization and/or animation. It should be appreciated by one of ordinary skill upon reading this disclosure that the background media content 1808 can correspond with the background content 1302 of the media content personalization system 1300 illustrated in FIG. 13. In certain embodiments, the 3D model data 1810 corresponds with the 3D model data 1304 of FIG. 13, and includes one or more individualized 3D models with associated animation rigs.

The animation server 1802 further comprises an audio track module 1812, a phoneme module 1814, a viseme module 1816, a composition module 1818, and a content aggregation module 1820. In certain embodiments, the audio track module 1812 is configured to convert a voice recording received from one of the communications devices 1804 into an audio track. In other embodiments, the audio track module 1812 is configured to convert text received from one of the communications devices 1804 into an audio track using a text-to-speech module, such as MICROSOFT Speech. The audio track can be stored using a digital audio encoding format, such as the Waveform (.wav) or MPEG-1 Audio Layer 3 (.mp3) audio formats.

In certain embodiments, the phoneme module 1814 can be configured to convert the audio track into a phoneme track, consisting of a plurality of phonemes, using, for example, PRODUCTIONSYNC or INSTANTSYNC software developed by Automatic Sync Technologies, LLC or Voice Works software provided by Puppet Works (Toronto, Canada). The audio track-to-phoneme conversion can be performed during pre-production or in real time for streaming audio applications in various embodiments. As used in this disclosure, a phoneme represents a posited structural unit of speech that distinguishes meaning. Phonemes can be described as the basic unit of speech in the acoustic domain and represent individual speech sounds. For example, American English has approximately forty-two phonemes, which can be divided into four categories: vowels, diphthongs, semi-vowels, and consonants. Each of these categories can be subdivided in relation to the manner and place of articulation of the sound within the vocal tract.

The viseme module 1816 can be configured to convert the phoneme track into a viseme track. As used in this disclosure, a viseme is the visual counterpart of a phoneme and represents the basic unit of speech in the visual domain. In particular, a viseme can represent the particular facial and oral positions and movements that occur alongside the voicing of phoneme. In certain embodiments, phonemes and visemes do not share a one-to-one correspondence; often, several phonemes can share the same viseme. In other words, the facial and oral expressions for the phoneme are the same even though the sound is different. In certain embodiments, each individual phoneme in the phoneme track is mapped to a corresponding viseme using a mapping table and stored in the proper order in the viseme track. An example of one method for phoneme-to-viseme conversion that can be used is Annosoft's Lipsync SDKs (software development kits).

In certain embodiments, the composition module 1818 is configured to combine the background media content 1808, one or more individualized 3D models, the audio track, and the viseme track to generate a finalized animation with voice personalization. Moreover, the content aggregation module 1820 can be configured to perform any necessary format conversion to make the finalized animation conform to appropriate network standards.

Figure 19:
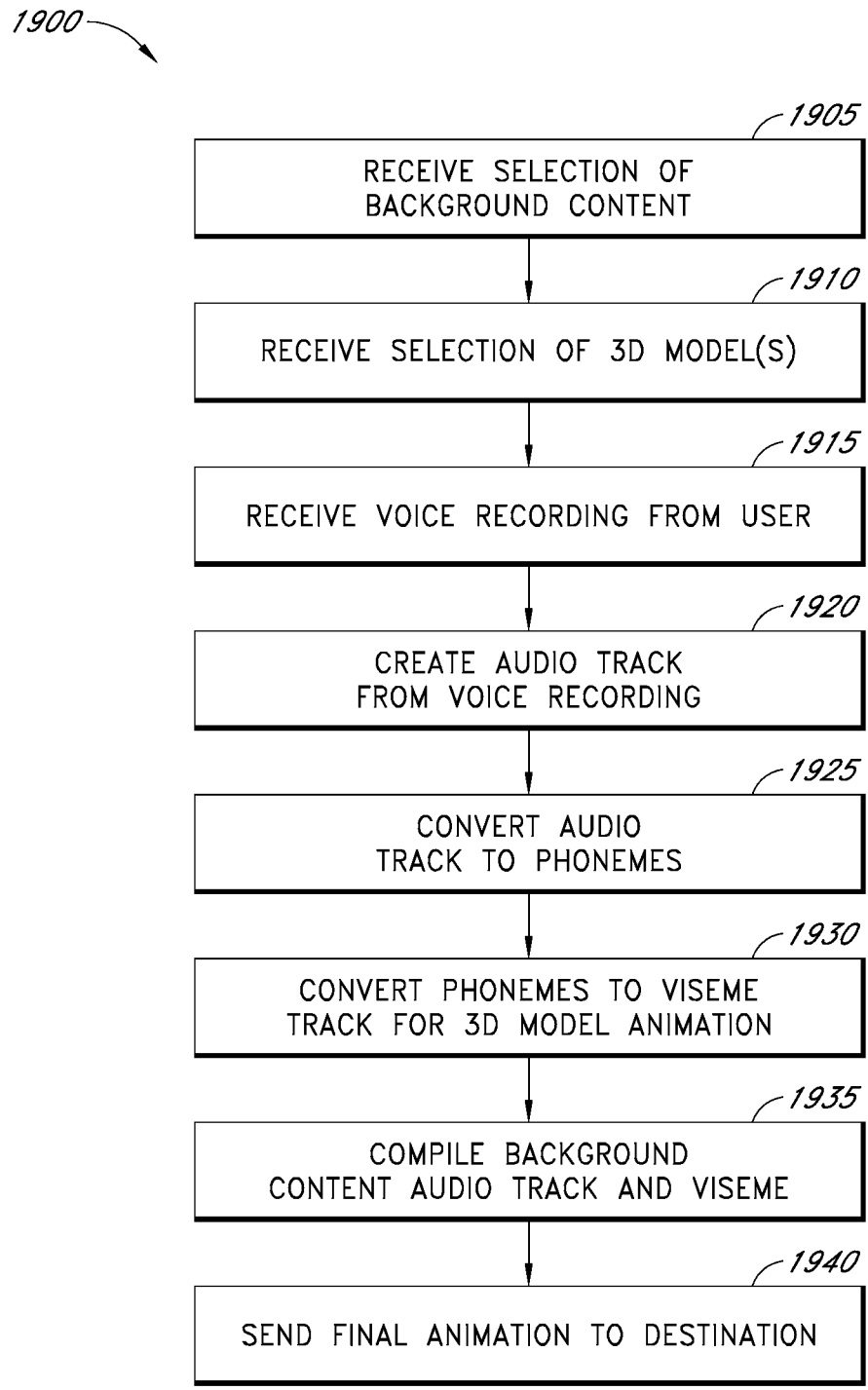
FIG. 19 illustrates a flowchart of an exemplary embodiment of an animation process for creating media content with voice personalization.

FIG. 19 illustrates an exemplary voice personalization process 1800, according to certain embodiments of the invention. In particular, the voice personalization process 1900 can be performed to create one or more personalized pieces of video content, such as a video clip, an online greeting card, an advertisement, or the like. In certain embodiments, the voice personalization process 1900 enables a user to not only replace the background actor's head but the actor's voice as well. Some embodiments receive a voice recording from the user that matches the speech of the background media content. Other embodiments receive one or more voice recordings from which unique voice characteristics are gathered such that the voice personalization process 1900 can output speech that sounds like the individual without having received a voice recording of the actual words to be output.

In certain embodiments, the voice personalization process 1900 is executed on one or more servers or like computing devices. For exemplary purposes, the voice personalization process 1900 will be described with reference to the animation server 1802 of FIG. 18. It should be appreciated by one of ordinary skill in the art, based on the disclosure herein, that the animation server 1802 can be one embodiment of the template creation module 1308 or the composition module 1310 of FIG. 13. Therefore, the voice personalization process 1900 can be performed by the system 1300 for creating personalized media content.

As shown, the voice personalization process 1900 begins with Block 1905, wherein the animation server 1802 receives a selection of background media content 1808. For example, the background media content 1808 can include an advertisement, an online greeting card, a video clip, a cartoon, combinations of the same, or the like. In certain embodiments, a user can select between a plurality of templates, wherein such selection is made online, through a cell phone, or the like.

At Block 1910, the animation server 1802 receives a selection of one or more 3D models to be inserted into the background media content 1808. In certain embodiments, such a selection is made by the user. In yet other embodiments, the 3D models can be automatically selected and/or inserted into the background media content 1808, as discussed in more detail herein.

In certain preferred embodiments, the 3D models comprise a life-like, individualized 3D head model of the user. For instance, the 3D models can be generated and stored by the individualized 3D head generation system 100. In yet other embodiments, other types of 3D representations or 2D representations can be used for insertion into the background content.

At Block 1915, the animation server 1802 receives a voice recording from the user. For instance, the user can be prompted to read one or more set phrases that correspond with the phrases uttered by the character to be replaced in the selected background media content.

In certain embodiments, the voice recording is received from a computer over a network (e.g., the Internet). For instance, the animation server 1802 can comprise a Voice over Internet Protocol (VoIP) module configured to capture the user's voice when spoken into a microphone of a computer. In other embodiments, the user can record his or her voice at his or her computer and send an audio file (e.g., a WAV file) to the animation server 1802.

In other embodiments, a user can advantageously use a landline telephone, cell phone, handset, or the like to record his or her voice. For example, the user can be prompted to dial a specific telephone number associated with the animation server 1802 and communicate with the animation server 1802. Such embodiments allow for a user to engage the voice personalization process 1900 without using a computer and/or when working with a computer without a microphone.

In yet other embodiments, the user can utilize his or her cell phone as a microphone for a personal computer or a laptop. For example, the user can speak voice commands though a cell phone in direct and/or network communication with the computer. In yet other embodiments, the user can use the cell phone for dictation to be processed by the computer. For instance, voice commands and/or dictation can be captured through a telephone (or like device) and sent to a main server, which processes the speech and sends corresponding instructions and/or text over a network (e.g., the Internet) to the user's computer.

At Block 1920, the animation server 1802 creates an audio track from the user voice recording by executing the audio track module 1812, the audio track being customized for concurrent playback with the background media content 1808 (e.g., modifying timing characteristics). In other embodiments, the animation server 1802 can comprise a text-to-speech module that automatically generates an audio track for the user based on user-inputted and/or user-selected text.

At Block 1925, the animation server 1802 converts the user audio track to a phoneme track comprising a plurality of phonemes by executing the phoneme module 1814. In certain embodiments, the phoneme track is stored by the animation server 1802 in memory 1806.

The animation server 1802 then executes the viseme module 1816 to generate a viseme track corresponding to the phonemes from the phoneme track (Block 1930). In certain embodiments, this viseme track is advantageously used to animate the 3D model inserted into the background media content so that the 3D model "lip syncs" the words captured from the user (the audio track). For example, the viseme track can comprise a plurality of instructions for manipulating and/or animating a mouth portion of a 2D or 3D model. The animation instructions can control the movement of key points of the animation rig corresponding to face muscles, the mouth, the eyebrows, and/or the eyes in certain embodiments. In certain embodiments, in-between morph targets can be generated to provide for a smoother transition between the visemes corresponding to each phoneme in the phoneme track, similar to the tweening process discussed above in connection with FIGS. 15A-15E.

In other embodiments, morph targets can be generated that correspond to emotional expressions, such as happiness, sadness, surprise, fear, anger, and disgust. These expression morph targets can comprise a plurality of instructions for manipulating and/or animating both a mouth portion and facial portions of a 2D or 3D model. The expression morph targets can be blended with the visemes on the viseme track so that the 3D model can visually deliver the dialogue in the most convincing manner possible. In yet other embodiments, a viseme mask track is generated. The viseme mask track is the individualized blend influence for each channel of the viseme. In certain embodiments, the phoneme to viseme conversion is performed on the animation server 1802 to avoid placing a heavy processing load on the user's computer or other communications device.

At Block 1935, the animation server 1802 combines the background media content 1808 (e.g., the background layer 1402) with the 3D model, the audio track, and the viseme track (e.g., the intermediate layer 1404) by executing the composition module 1818 to create a final animation with voice personalization. This final animation can advantageously be stored in memory on the animation server 1802, on a user computer (e.g., communications device 1804C), and/or be sent to a desired destination (Block 1940).

For example, the user can have the option of sending the final animation via email, a multimedia messaging service ("an MMS message"), a streaming video, or the like to one or more of communications devices 1804 via the network 1805. In certain embodiments, the final animation is further processed by the content aggregation module 1820, which is configured to perform any necessary format conversion to make the final animation conform to appropriate network standards for delivery over a network.

It should be appreciated by one of ordinary skill in the art based on the disclosure herein that because the lip synching animation of the viseme track, in certain embodiments, is stored on a separate layer than the background template, the animation server 1802 can dub video content in multiple languages without having to reshoot the video footage. In addition, the system 1300 for creating personalized media content allows for dubs in which the movement of the mouth actually matches the words being spoken. For example, an individualized 3D model can be generated for each of the speaking characters and visemes can be generated for the phonemes based on the sounds from the different language. The individualized 3D model, along with the viseme track, audio track, and other animation data can then be overlaid on top of the background video content.

Although the voice personalization process 1900 has been described with reference to particular arrangements, other embodiments are also contemplated. For example, certain embodiments of the voice personalization process 1900 can combine Blocks 1915 and 1920 to directly record the audio track as the user speaks into an audio input device. In yet other embodiments, at Block 1910 the voice personalization process 1900 can use representations and voices of individuals other than the user (e.g., celebrities, athletes, acquaintances of the user, or the like).

In still other embodiments, at Block 1920 the animation server 1802 can create an audio track from the voice recording in which the words of the audio track are not the same as the words of the voice recording received from the user. In such embodiments, the animation server 1802 can generate a simulation of the user's voice using stored information related to his or her voice. The stored information related to the user's voice can comprise voice characteristics of the user (e.g., Prosodic features, pitch, accent, delivery speed, tonal qualities, inflection, emphasis, mannerisms, and the like). The stored voice characteristics allow the animation server 1802 to simulate the voice of the user without receiving a voice recording from the user that corresponds with the dialogue of the character to be replaced in the background media content.

Figure 20:
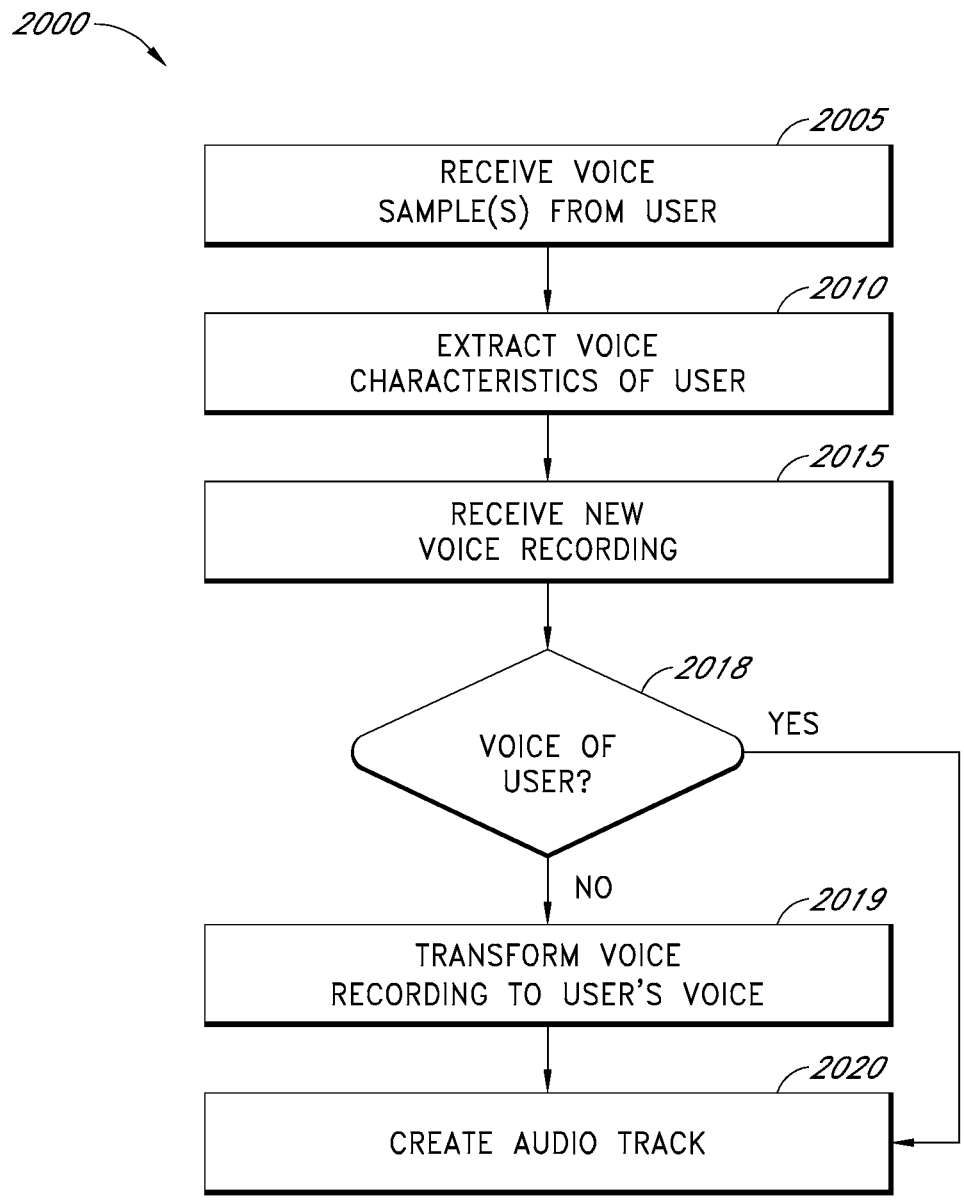
FIG. 20 illustrates a flowchart of an exemplary embodiment of a voice transformation process usable in the process of FIG. 19.

FIG. 20 illustrates a flowchart of an exemplary embodiment of a voice transformation process 2000. At Block 2005, the animation server 1802 receives one or more voice samples from the user. In certain embodiments, a single voice sample can be sufficient to acquire the voice characteristics necessary to simulate the voice of the user. For example, the voice sample can be the vocal reading of a page of specified training sentences or samples that have been predetermined to enable the animation server to acquire the unique voice characteristics of an individual. In other embodiments, the animation server 1802 receives several voice samples over time in various settings (e.g., online gaming, online chat, VoIP conversations, video clips), the combination of which is sufficient to acquire the voice characteristics necessary to simulate the voice of the user.

At Block 2010, the animation server 1802 extracts the unique voice characteristics of the user. The voice characteristics can comprise prosodic features, pitch, speech volume, accent, delivery speed, pause lengths, tonal qualities, inflection, emphasis, mannerisms, combinations of the same and the like. In certain embodiments, the voice characteristics are normalized to account for variations amongst a plurality of speakers and thereby to capture more accurate voice characteristics. The extraction of the user's voice characteristics can be performed through digital filtering techniques in certain embodiments. In other embodiments, methods other than filtering can be utilized to extract voice characteristics from an input user voice recording. In certain embodiments, the animation server 1802 can continue to can continue to improve the accuracy of the simulation of the user's voice through continued receipt of voice data from the user. The continued receipt of voice data broadens the sample from which the voice characteristics of the user are generated.

The extracted voice characteristics can be stored in a voice dictionary or other file corresponding to the user. In certain embodiments, the voice dictionary comprises an array of symbolic representations for phonemes associated with a target speaker output speech pattern segment. The animation server 1802 can then perform a "look-up" of target speaker output speech pattern segments based on the symbolic representations of the phonemes from the input voice pattern. Thus, for each symbolic representation, a target speaker output speech pattern segment is retrieved from the voice dictionary associated with the user.

At Block 2015, the animation server 1802 receives a new voice recording, the dialogue of which the user desires to be associated with the personalized media content to be created. In certain embodiments, the new voice recording comprises a voice recording of a character's dialogue from background media content (e.g., a video clip). In other embodiments, the new voice recording comprises a computer-generated, or synthesized, voice recording of text inputted by the user and converted to speech by a text-to-speech module. In still other embodiments, the new voice recording is a recording of the user's voice, as in Block 1915 of FIG. 19.

At Block 2018, the animation server 1802 determines if the new voice recording comprises a recording of the user's voice. If not, the animation server 1802 proceeds to Block 2019, wherein the source voice recording from the background media content or the synthesized voice recording is transformed into a target voice recording that simulates the voice of the user by incorporating the stored voice characteristics of the user.

The animation server 1802 can perform such voice transformation using systems and methods similar to those described in U.S. Pat. No. 5,327,521 issued Jul. 5, 1994, and U.S. Pat. No. 6,463,412, issued Oct. 8, 2002, the entirety of which are hereby incorporated herein by reference. It should be appreciated by one of ordinary skill in the art, upon reading this disclosure, that the term "source" refers to the voice to be transformed and that the term "target" refers to the user's voice.

In certain embodiments, the animation server 1802 transforms the source voice into the target user's voice by parsing the source voice recording into symbolic representations of phonemes using voice recognition methods, looking up the symbolic representations of phonemes in a voice dictionary associated with the user, and then outputting the user voice output segments corresponding to each of the symbolic representations of phonemes, as described in U.S. Pat. No. 6,463,412.

After the source voice is transformed into the target voice of the user, the voice transformation process 2000 proceeds to Block 2020, wherein the animation server 1802 creates an audio track of the transformed voice output segments having the user's voice characteristics that can be stored in memory 1806 and later be used by the animation server 1802 to create personalized media content having voice personalization.

If at Block 2018, the animation server 1802 determines that the new voice recording comprises a recording of the user's voice, the voice transformation process 2000 skips Block 2019 and proceeds directly to Block 2020, wherein the animation server 1802 creates an audio track directly from the new voice recording without undergoing any transformation, as is done in Block 1920 of FIG. 19.

In an exemplary embodiment of the voice personalization process 2000, the animation server 1802 receives two distinct voice recordings from the user and determines voice characteristics of the user based on the received recordings. The first recording is received while the user is playing an online computer game and yells "You are going down, buddy!" to his friend. The second recording is received while the user is conversing with his mother using a webcam and says "I need you to send me more money." The voice characteristics acquired from the two voice recordings allow the user to personalize, for example, a preexisting Star Wars parody video clip (e.g., a YouTube video) containing the phrase "I am not your father" with his own voice.

While embodiments of the voice personalization process have been described in the context of simulating a user's voice, those skilled in the art should recognize, based on the disclosure herein, that any voice can be simulated using the principles and techniques described herein, and that the foregoing is merely exemplary of a particular application of the invention and the invention is not limited to the simulation of a user's voice. For example, a user can personalize predefined media content such that the background character speaks or sings words inputted by the user in the background character's voice.

For instance, the user may want to create an individualized 3D head model of a third person (e.g., a famous celebrity, athlete, or politician) and cause the 3D head model to speak words of the user in the third person's voice. It should be appreciated by one of ordinary skill in the art, based on the disclosure herein, that instead of receiving voice samples of the user, the animation server 1802 can receive voice samples of third persons (Block 2005) and extract their voice characteristics (Block 2010). Then, the user can input text or a voice recording of his or her voice (Block 2015) and the voice transformation process 2000 can transform the user's voice into the third person's voice (Block 2019).

In other embodiments of the voice transformation process 2000, the animation server 1802, at Block 2017, receives textual input and converts the text directly to speech (e.g., using a text-to-speech module), wherein the speech simulates the user's voice using the acquired voice characteristics at Block 2016.

Figure 21:
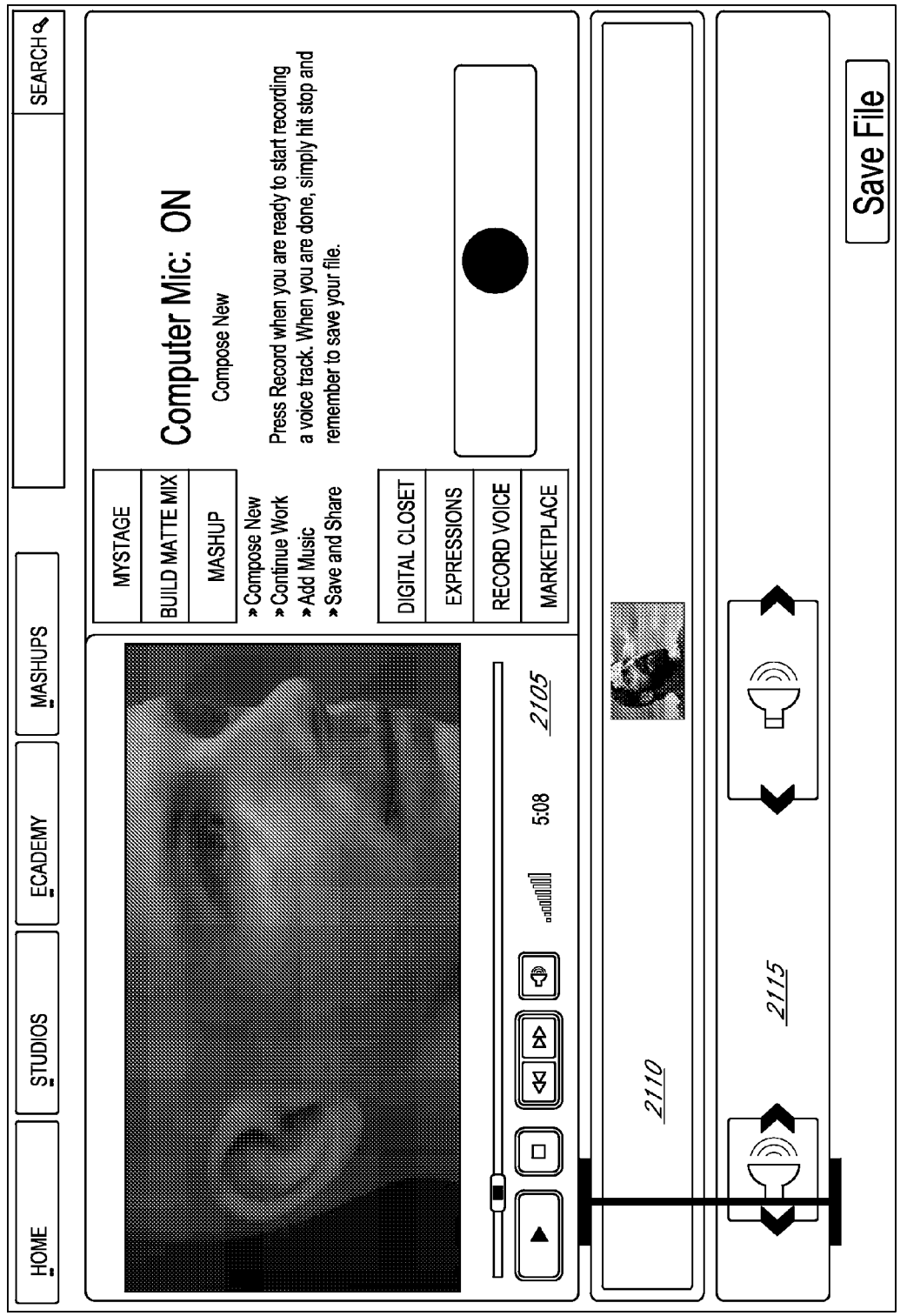
FIGS. 21 and 22 illustrate exemplary embodiments of a user interface of an animation creation tool usable with the system of FIG. 13 to personalize media content.

FIG. 21 illustrates an exemplary embodiment of a graphical user interface of an animation creation tool 2100 usable by an end-user to personalize a piece of video content. In certain embodiments, the composition module 1818 of FIG. 18 generates and/or updates the animation creation tool 2100 and displays the animation creation tool through a graphical user interface on a display of one of communications devices 1804. In other embodiments, the template creation module 1308 of FIG. 13 generates and/or updates the animation creation tool 2100 and displays the animation creation tool through the user interface 1312.

As illustrated, the animation creation tool 2100 includes a control panel 2105 for selecting and/or manipulating video content. For instance, the control panel 2105 comprises a plurality of video playback controls generally found on video players.

The animation creation tool 2100 also includes a video timeline 2110 that represents the duration of a selected background video. Situated beneath the video timeline 2110 is an audio timeline 2115 that represents the audio content to be associated with the video. Along the audio timeline are indications of where the user can insert one or more personalized voice recordings, as discussed above. Moreover, in certain embodiments, the user can modify the width of the voice recordings along the audio timeline 2115 (e.g., by dragging the ends of the voice recording icon) to increase or decrease the time that the personalized voice recording is applied to playback of the video content.

Figure 22:
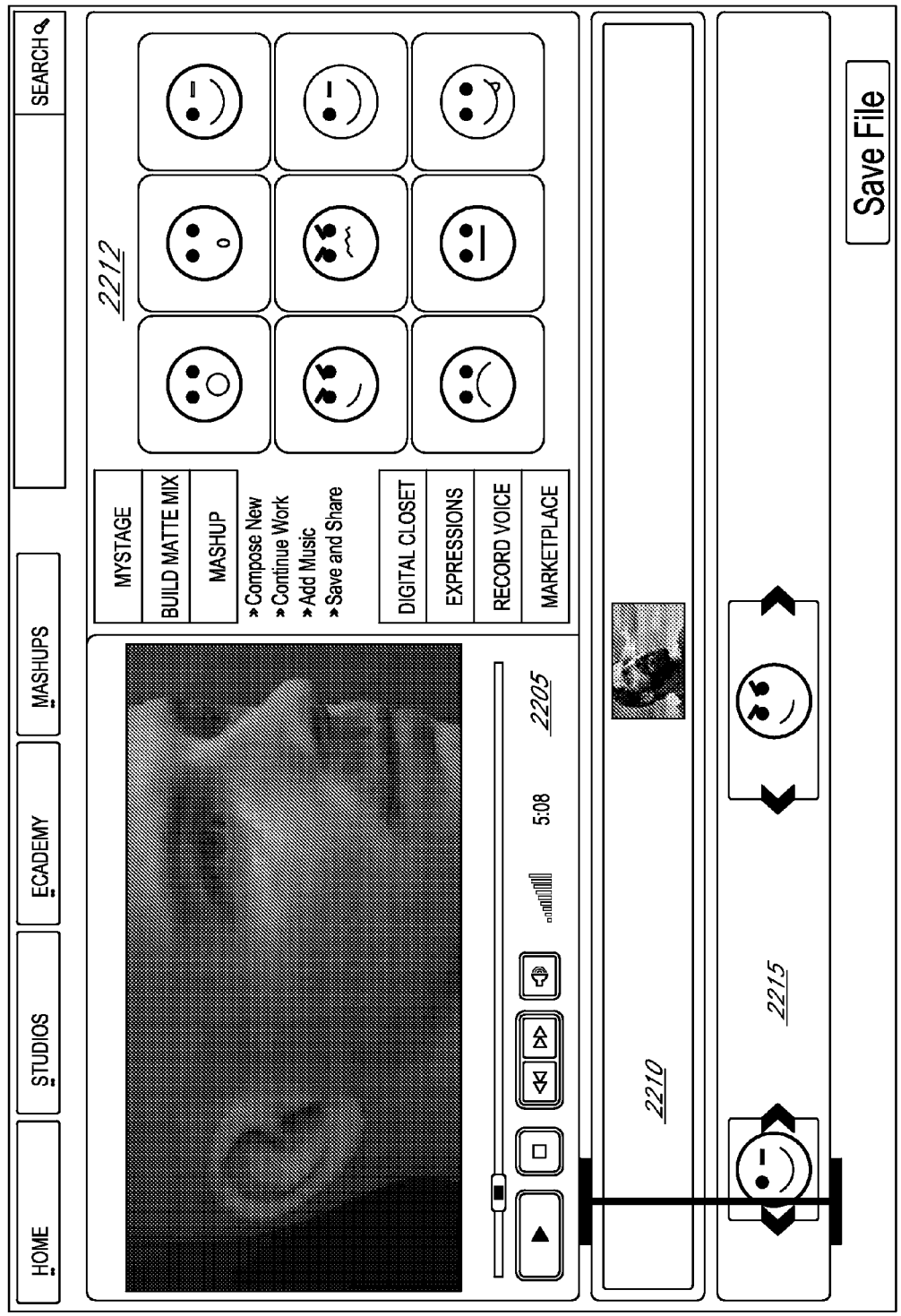

The animation creation tool 2100 can also include various other optional functions and indicators to facilitate the creation of personalized video content. For example, the animation creation tool 2100 further includes a record button for beginning the capture of audio content from the user and a save file button for storing the personalized video file FIG. 22 illustrates another embodiment of a graphical user interface of an animation creation tool 2200 usable by an end-user to personalize a piece of video content. As shown, the animation creation tool 2200 comprises a similar interface as that of the animation creation tool 2100 of FIG. 21. The animation creation tool 2200 further allows a user to customize playback of video content by selecting one or more expressions for affecting the playback of a head model associated with the video content.

As shown, the animation creation tool 2200 includes a control panel 2205 for controlling the playback and/or editing of video content. The animation creation tool 2200 also includes a video timeline 2210 that displays the duration of a selected background video.

The animation creation tool 2200 further includes an expression panel 2212 comprising a plurality of expression icons. In certain embodiments, each icon can represent a particular emotion and/or expression (e.g., happy, excited, scared, angry, surprised) usable to modify the video content. In particular, a selected expression can be associated with modifying a 3D head model and can be used to affect the facial expressions of the 3D model in the video content and/or the audio track accompanying the video content. In certain embodiments, each expression is associated with corresponding stored data usable to modify facial expressions (including lip movement) and/or audio playback.

In certain embodiments, the user is able to select an expression icon and drag the icon from the expression panel 2212 to an audio timeline 2215. Thus, when playback of the video content and associated audio content reaches a point where an expression icon has been inserted, playback is modified based on the selected expression. Moreover, in certain embodiments, the user can modify the width of the selected expression icon along the audio timeline 2215 to increase or decrease the time that the expression is applied to playback of the video content.

For instance, if an "angry" expression icon is selected, modification of the video and audio playback can comprise furrowing or lowering the brow of the 3D model, temporarily increasing the volume of the audio playback, combinations of the same or the like. It should be appreciated by one of ordinary skill in the art, based on the disclosure herein, that expressions can be generated by adding one or more blendshapes, as described in connection with FIGS. 3C-3G.

As with the animation creation tool 2100, the animation creation tool 2200 can also include various other optional functions and indicators to facilitate the creation of personalized video content. For example, the animation creation tool 2200 further includes a record button for beginning the capture of audio content from the user and a save file button for storing the personalized video file.

Figure 23:
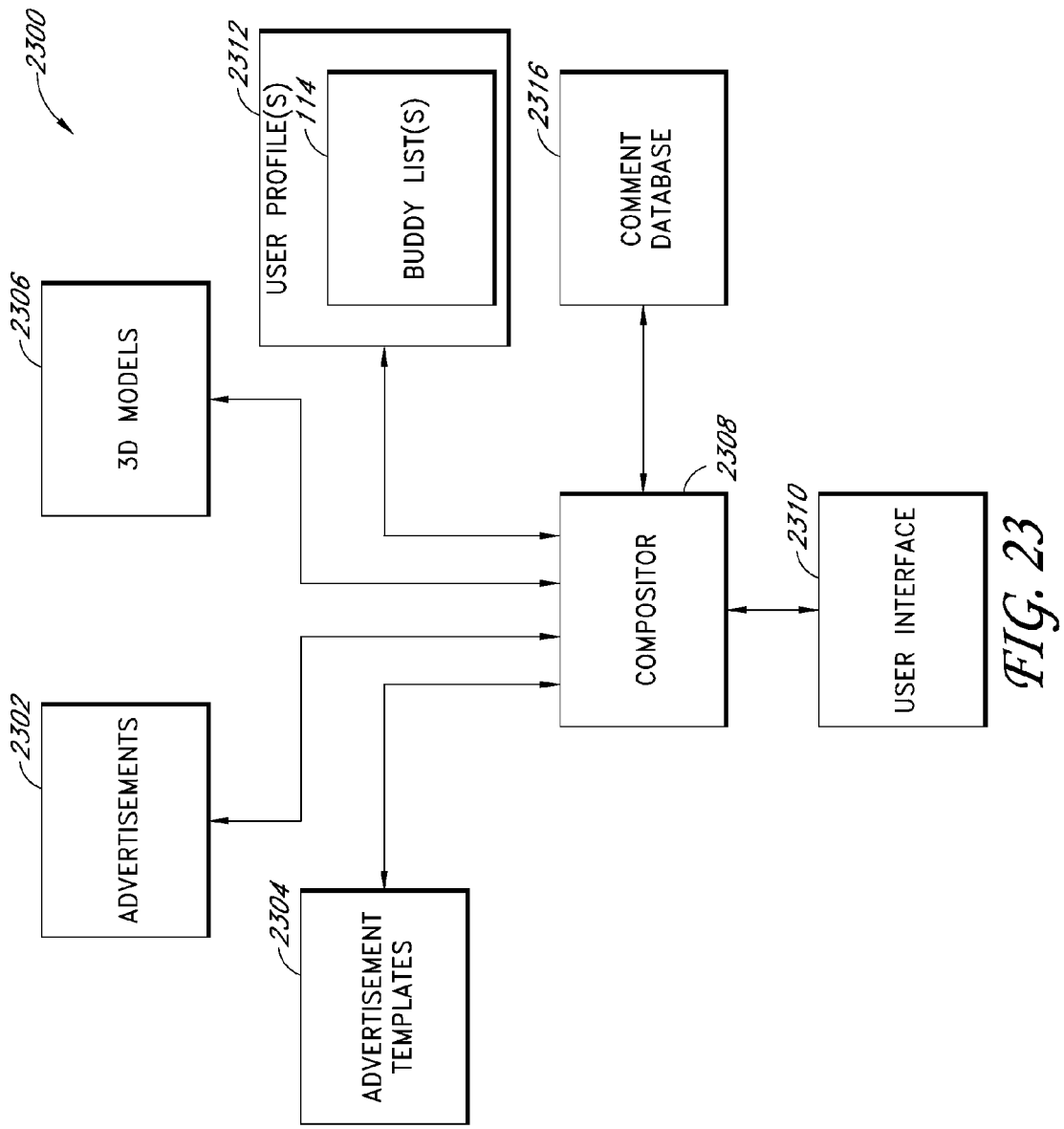
FIG. 23 illustrates a block diagram of a system for creating personalized interactive advertising content, in accordance with an embodiment of the present invention.

One example of personalized media content usable with embodiments of the invention includes interactive advertisements starring the user and his or her "buddies." FIG. 23 illustrates a block diagram of an interactive advertisement system 2300 according to certain embodiments of the invention. It should be appreciated that FIG. 23 is an exemplary embodiment of the media content personalization system 1300.

In certain embodiments, the interactive advertisement system 2300 can advantageously generate advertisements that automatically insert a personalized image, such as a 3D head model, of the viewer, or of an individual associated with a profile of the viewer, into the advertisement. In other embodiments, the interactive advertisement system 2300 can allow a viewer to build a personalized interactive advertisement from scratch based on an advertisement template. Moreover, the advertisement system 2300 can further allow the content of generated interactive advertisements to be altered by the viewer and sent to third persons for viewing and possible further alterations. The following description includes use of the term "user" and the term "viewer" in various instances. It should be appreciated that the terms can be used interchangeably.

As shown, the interactive advertisement system 2300 includes advertisements 2302, such as video advertisements, still advertisements, and/or animated advertisements for particular goods and/or services. Associated with at least one of the advertisements 2302 are advertisement templates 2304. The advertisement templates 2304, in certain embodiments, comprise data usable for inserting an image of an individual into the advertisement. For example, the advertisement templates 2304 can include information on how many default characters in a particular advertisement are available for replacement by images (2D or 3D) of one or more viewers. In certain embodiments, this information regarding the default characters can include gender information regarding the default characters.

For example, the interactive advertisement system 2300 further includes a database of 3D models 2306. In certain embodiments, these models 2306 include life-like head models of particular individuals. For instance, the head models 2306 may be generated and stored by the individualized 3D head generation system 100.

As shown, the interactive advertisement system 2300 further comprises a compositor 2308 configured to receive the advertisements 2302, the advertisement templates 2304 and/or the 3D models 2306. In certain embodiments, the compositor 2308 is configured to insert at least one 3D model 2306 into the advertisement 2302 according to the data in the advertisement template 2304. For instance, in embodiments wherein the 3D models 2306 comprise 3D head models, the compositor 2308 "replaces" the head of at least one of the default characters in the advertisement 2302 with a 3D head model 2306. In certain embodiments, such replacement includes layering the 3D head model on top of the appropriate default character in the advertisement 2302, as described in conjunction with FIG. 14.

In certain embodiments, the interactive advertisement system 2300 is advantageously configured to insert a 3D model 2306 of the advertisement viewer into the advertisement 2302. The viewer-customized advertisement is then displayed via the user interface 2310, such as, for example, a computer screen, a monitor, a television screen, a cell phone, a portable digital assistant (PDA), or the like.

In certain embodiments, the interactive advertisement system 2300 is advantageously configured to automatically insert a 3D model 2306 of the advertisement viewer into the advertisement 2302 once the viewer is identified by the interactive advertisement system 2300. Such identification can occur by any suitable means for identifying a user. For example, identification can occur through the use of cookies, detection of the viewer's IP address, entrance of user credentials (e.g., username and password), biometric identification, geotargeting information, group lists, data files, combinations of the same and the like.

Moreover, in certain embodiments, the interactive advertisement system 2300 is further configured to insert into the advertisement 2302 a 3D model 2306 of one or more other individuals associated with the user/viewer, in addition to, or without, inserting a 3D model of the user/viewer. For instance, in certain embodiments, the interactive advertisement system 2300 automatically accesses a user profile 2312 that comprises one or more buddy lists 2314, which can be used by the interactive advertisement system 2300 (e.g., the compositor 2308) to identify which additional 3D models 2306 should be used with a particular advertisement. The user profile 2312 can be stored in memory on the interactive advertisement system 2300 in some embodiments. In certain embodiments, the user profile 2312 comprises at least one of personal information, a browsing history and a location of the user.

In other embodiments, the interactive advertisement system 2300 can examine the viewer's email history, chat history, blog comments, contact database, phone call history, and/or social networking comments to see who the viewer interacts or communicates with most frequently, and based on the examination, make a determination as to which 3D models from the database of 3D models 2306 to include in a particular advertisement.

In still other embodiments, the determination as to which 3D models to include is based on accessing information contained within the profile and/or personal preferences of one or more advertisement viewers. For example, the interactive advertisement system 2300 can access residence information and hobby or interests information from the viewer's profile, and based on that information, can determine which 3D model to insert into a particular advertisement. For instance, if the interactive advertisement system 2300 determines that the viewer resides in New York and is a fan of the New York Yankees, the interactive advertisement system 2300 can automatically insert a 3D model of Derek Jeter into the advertisement.

In yet other embodiments, the interactive advertisement system 2300 selects 3D models to insert based on the viewer's tracked purchase history. For example, if the viewer bought an advertised item in the past by clicking on a personalized interactive advertisement generated by the interactive advertisement system 2300, the compositor 2308 can select the same 3D models to appear in the current advertisement. In some embodiments, the interactive advertisement system 2300 further comprises a tracking module that tracks a viewer's purchase history. For example, the tracking module can be configured to record an amount of viewer selections of the personalized advertisement. In certain embodiments, the tracking module can determine the difference between whether the viewer purchased a product by clicking on a generic advertisement or a personalized advertisement.

In yet other embodiments, the viewer selects specific 3D models for inclusion in the advertisement 2302. Such a selection, for example, can be made from one or more lists associated with the viewer (e.g., buddy list(s) 2314), a database of individuals (e.g., famous stars, athletes, or the like), combinations of the same, or the like.

It should be appreciated by one of ordinary skill in the art, based upon the disclosure herein, that the same viewer profile information can be accessed to determine what background advertisement to generate, as well as which 3D models to insert into the advertisement.

Moreover, in certain embodiments, the viewer can dynamically alter the content of the automatically generated advertisement or create an interactive advertisement from a template. For example, if the interactive advertisement system 2300 generates an advertisement including a 3D model of the viewer going off a jump on an advertised dirt bike, the viewer may decide that it would be entertaining to give himself a mohawk and black sunglasses. The viewer may then decide to share the personalized advertisement with friends by sending it to them via e-mail or posting it on a blog or website.

As another example, one or more viewers may decide to alter the advertisement to replace his or her own individualized 3D head model with a 3D head model of a friend and may further decide to alter the facial expression of the friend's 3D head model to make it look like the friend is scared stiff. The viewer may also decide to add an audio track of a person screaming or crying "Mommy" to the advertisement. Upon receiving the advertisement and after viewing the initial playback, the viewer's friend may further alter the content of the interactive advertisement and either send it back to the viewer or to another third person.

In some embodiments, the interactive advertisement system 2300 tracks alterations made by individual users for incorporation into future automatically-generated advertisements targeted at particular users. The modifications and/or alterations can include, but are not limited to, adding or modifying audio data associated with the advertisement, replacing the one or more 3D models with different models, adding and/or altering facial features, accessories or effects of the 3D models, and altering background content of the interactive advertisement.

The illustrated interactive advertisement system 2300 also allows for one or more viewers to comment on a particular advertisement 2302. Such comments are saved in a comment database 2316, which is in communication with the compositor 2308. In certain embodiments, when the interactive advertisement 2302 is displayed on the user interface 2310, the comments associated with the particular advertisement 2302 are also shown. In yet other embodiments, the interactive advertisement system 2300 can function without providing for comments on the advertisements 2302.

FIG. 24 illustrates an exemplary embodiment of a table 2400 that associates comments with a particular advertisement. In certain embodiments, the table 2400 can be stored in the comment database 2316 of the interactive advertisement system 2300.

As shown, the table 2400 includes an advertisement column 2402, a viewer column 2404, and a comment column 2406. For each row of the table 2400, a comment is associated with the viewer who made the comment and the personalized advertisement to which the comment pertains. In certain embodiments, when a particular personalized advertisement is to be displayed, the compositor 2308 can access the data in the table 2400 to determine which comments to include with the advertisement.

In other embodiments, other data structures may be used to link comments with users and/or advertisements. For instance, databases, linked lists, or the like can be used to associate user comments with advertisements.

Figure 25:
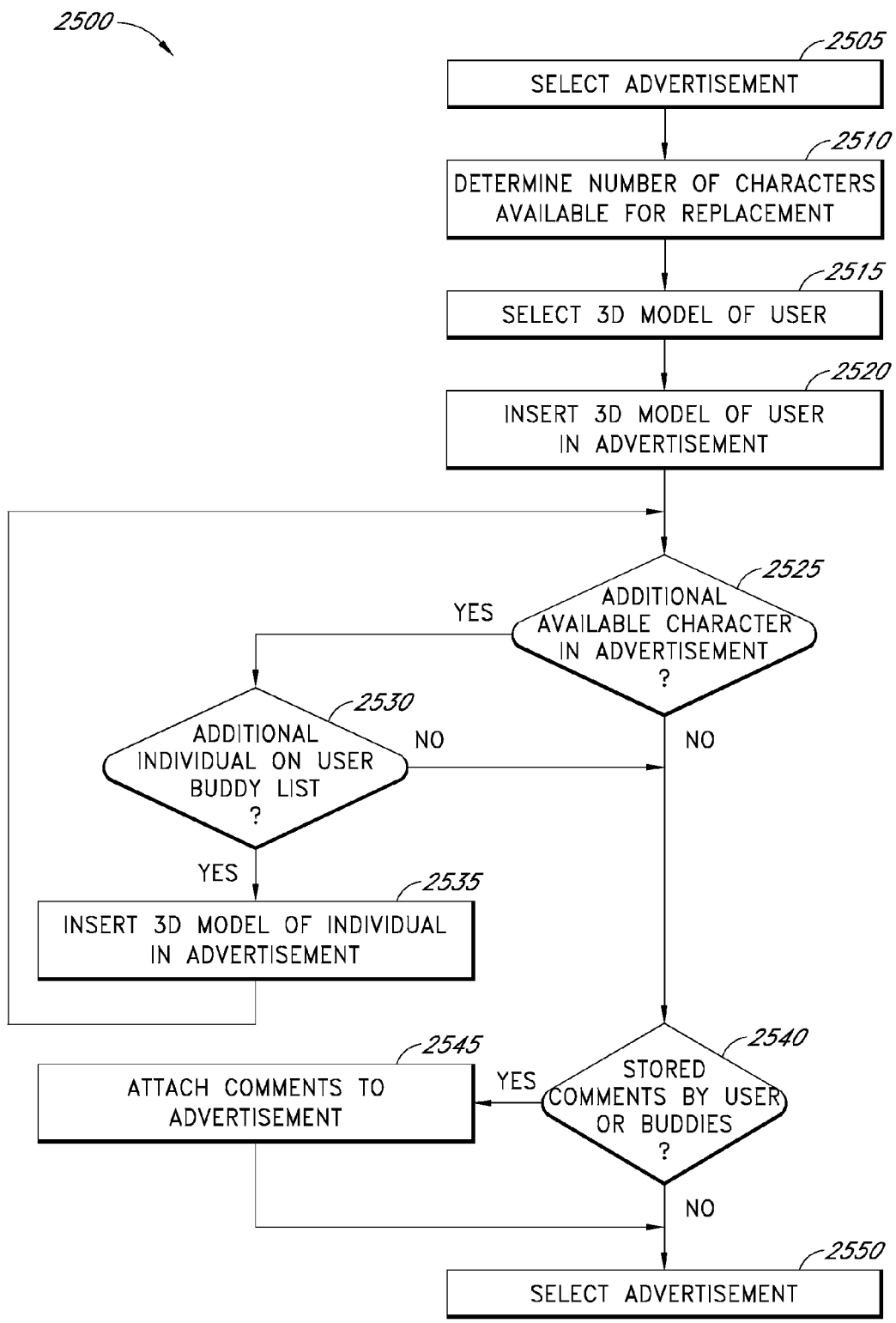
FIG. 25 illustrates a flowchart of an exemplary process for creating an interactive advertisement using the system of FIG. 23.

FIG. 25 illustrates an exemplary flowchart of a personalized advertisement creation process 2500 for creating an interactive advertisement, according to certain embodiments of the invention. For exemplary purposes, the personalized advertisement creation process 2500 will be described with reference to the components of the interactive advertisement system 2300 of FIG. 23. In certain embodiments, the compositor 2308 advantageously creates a personalized advertisement in which one or more users/viewers are inserted into the advertisement in place of one or more default characters. "Insertion" can mean actual physical insertion in some embodiments and layering on top of in other embodiments.

At Block 2505, the compositor 2308 receives a selection of an advertisement 2302. In certain embodiments, automatic selection of the advertisement 2302 is based on preferences, browsing histories, profiles, geotargeting information, purchase histories, or like information of a targeted viewer or group of viewers. In other embodiments, the viewer selects the particular advertisement 2302 that he or she would like to personalize.

At Block 2510, the compositor 2308 determines the number of characters in the advertisement 2302 that are available to be replaced with 3D models 2306. In certain embodiments, this determination is based on information stored in an advertisement template 2304. This stored information can include information about gender, skin color, and other characteristics. In other embodiments, the user is able to select how many default advertisement characters will be replaced.

The compositor 2308 then selects a 3D model 2306 associated with the viewer (Block 2515) and inserts the 3D model of the viewer in the advertisement (Block 2520). Such insertion, for instance, can be performed based on information stored in the advertisement template 2304. Moreover, in advertisements 2302 having multiple characters available for replacement, the compositor 2308 can insert the 3D model 2306 of the viewer in place of the primary character of the advertisement 2302.

At Block 2525, the compositor 2308 determines if there are additional characters in the advertisement 2302 available for replacement. If there are, the compositor 2308 accesses a buddy list 2314 of the viewer to determine if the list contains another individual having an associated 3D model that can be inserted into the advertisement 2302 (Block 2530). If so, the 3D model of the viewer's "buddy" is used to replace an additional character in the advertisement 2302 (Block 2535). The personalized advertisement creation process 2500 then returns to Block 2525 to determine if there is yet another advertisement character available for replacement.

If at Block 2525 all the characters of the advertisement 2302 have been replaced, or if there are no additional individuals on the viewer's buddy list 2314 having a 3D model for replacing an advertisement character, the personalized advertisement creation process 2500 proceeds to Block 2540. At Block 2540, the compositor 2308 determines if there are any stored comments that are associated with the advertisement 2302. If so, the compositor 2308 attaches the comments to the advertisement 2302. Finally, at Block 2550, the compositor 2308 displays the personalized interactive advertisement through the user interface 2310 (with comments, if any).

Although the personalized advertisement creation process 2500 has been described with reference to particular embodiments, it will be apparent from the disclosure herein that variations of the personalized advertisement creation process 2500 can also be used. For instance, the personalized advertisement creation process 2500 can be separated into two separate sub-processes: an advertisement creation sub-process (Blocks 2505-2535 and Block 2550) for compiling an interactive advertisement and a comment sub-process (Blocks 2540-2550) for accessing and/or displaying stored comments related to an advertisement. For instance, in such embodiments, an advertisement may be first compiled and stored by a user and then sent to other users for later comment and/or feedback. In other embodiments, the advertisement creation process 2500 does not insert a 3D head model of the viewer, but instead inserts one or more 3D head models of individuals associated with a profile of the viewer.

Figure 26:
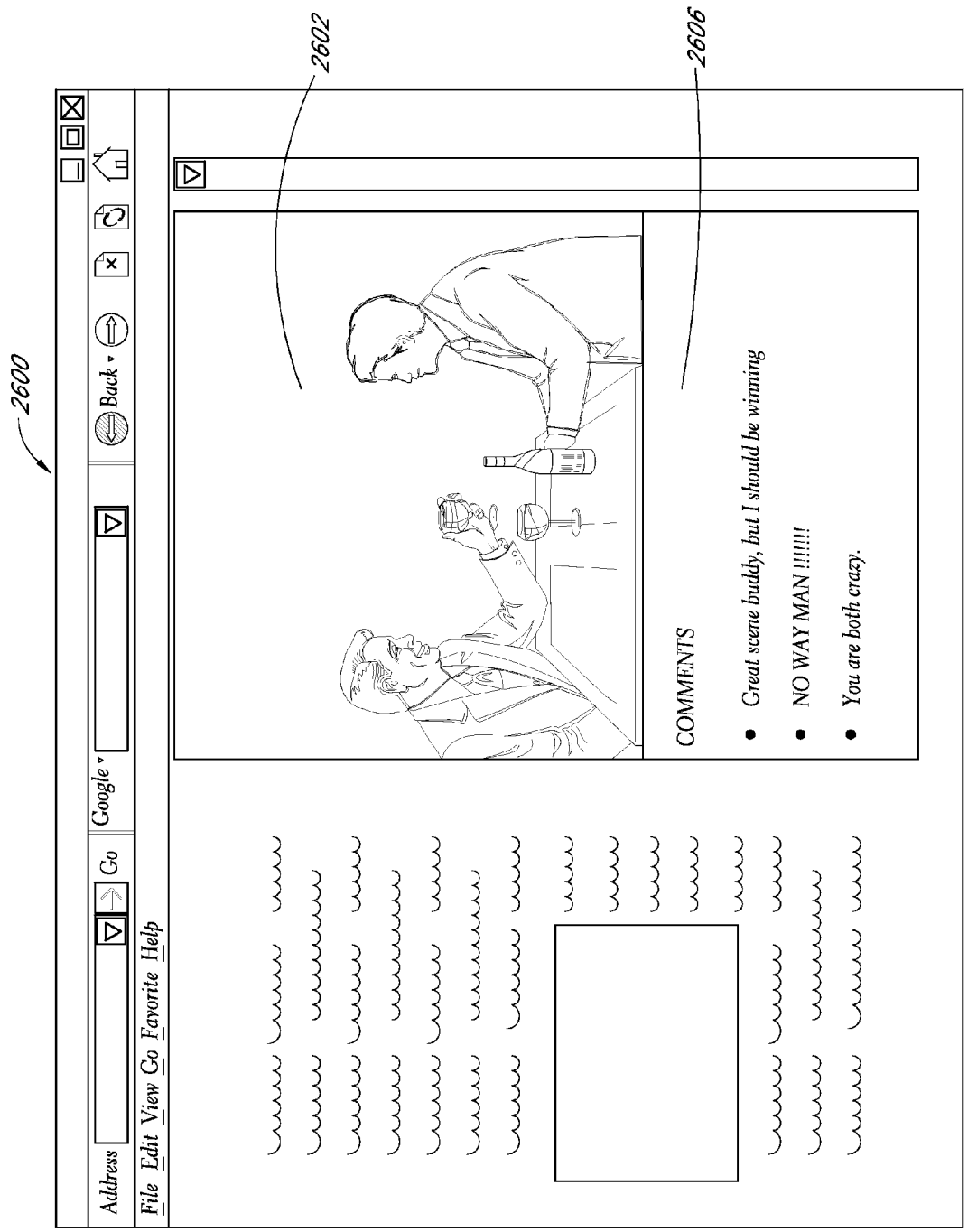
FIG. 26 illustrates an exemplary screen display of a browser window controlled and generated by the system of FIG. 23.

FIG. 26 illustrates an exemplary embodiment of a browser window 2600 usable with embodiments of the invention. In certain embodiments, the compositor 2308 of FIG. 23 generates and/or updates the browser window 2600 and displays the browser window 2600 through the user interface 2310.

As shown, the browser window 2600 comprises a personalized advertisement 2602, such as one created by the interactive advertisement system 2300 of FIG. 23 and/or through the personalized advertisement creation process 2500 of FIG. 25. The browser window 2600 further includes a comment section 2604 that displays comments associated with the personalized advertisement 2602. For instance, the browser window 2600 can comprise INTERNET EXPLORER, NETSCAPE NAVIGATOR, MOZILLA, or the like.

Figure 27A:
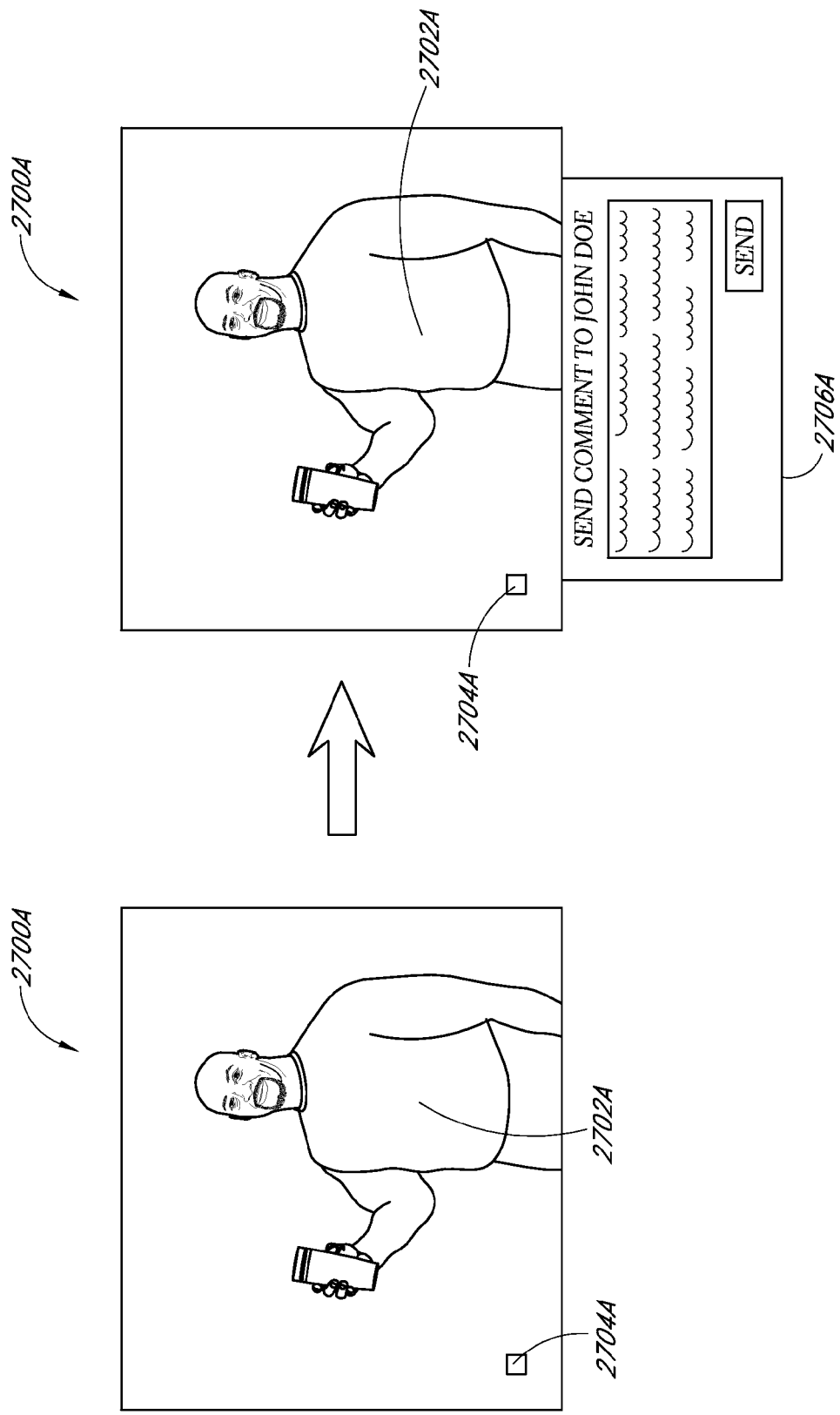

FIGS. 27A and 27B illustrate exemplary screen displays having a user comment option according to certain embodiments of the invention. For example, FIG. 27A illustrates an exemplary screen display that is usable, for example, by the interactive advertisement system 2300 of FIG. 23 and/or the personalized advertisement creation process 2500 of FIG. 25. In particular, FIG. 27A illustrates an advertisement window 2700A displaying a personalized advertisement 2702A, such as an advertisement in which a 3D model of the user has been inserted.

The illustrated advertisement window 2700A further includes a comment icon 2704A. In certain embodiments, when the user selects and/or activates the comment icon 2704A, the user is provided with a text entry area (e.g., a pop-up window, a drop-down portion or the like) in which the user is allowed to input one or more comments relating to the personalized advertisement 2702A. As shown in FIG. 27A, this text entry area 2706A automatically drops down below the advertisement 2702A. In certain embodiments, the text entry area 2706A also is capable of displaying past comments (e.g., by other users) related to the advertisement 2702A.

In other embodiments, as shown in FIG. 27B, a text entry area 2706B can at least partially overlap an advertisement 2702B of an advertisement window 2700B such that the text entry area 2706B does not interfere with other information on the graphical user interface.

In other embodiments, other selection mechanisms can be used in place of the comment icons 2704A. For instance, the user may indicate through a toolbar or by scrolling over the advertisement window 2700A that he or she is interested in viewing and/or submitting comments on the personalized advertisement 2702A. Moreover, in certain embodiments, a user can record or attach audio data to the advertisement content in addition to, or in place of, textual comments. In yet other embodiments, a user can attach image and/or video files associated with the advertisement content.

The systems and methods disclosed herein provide for a wide variety of options in creating personalized advertisements. For instance, one non-limiting example comprises a cartoon advertisement that can morph a person's photorealistic likeness into a cartoon likeness that matches the content or advertisement.

Another non-limiting example comprises a higher-quality piece of content, such as a high resolution video game advertisement. In certain embodiments, this video game advertisement can utilize the person's digital likeness with adjustments to match the content's resolution and look. The user would then see his or her digital likeness captured within the world of the video game advertisement, thereby becoming the "star" of the video game advertisement.

A further embodiment comprises insertion into a real life photorealistic piece of content such as a filmed TV commercial. The user can create his or her digital likeness and/or insert the photorealistic version directly into the commercial advertisement, creating a highly personalized piece of advertisement content ready to be sent out to his or her peers.

In some embodiments, users can advantageously utilize available off-the-shelf technology including but not limited to, digital cameras, webcams, video recorders, light projectors, small laser scanners, and/or cell phone cameras to generate data (e.g., 3D head models) for insertion into advertising content. Embodiments can also employ larger consumer devices such as a television or monitor with an associated webcam. The reconstruction can be created by the user and strategically inserted into the advertisement content.

In some embodiments, interaction with advertisement content can proceed in a free-form manner such that a user can choose what to associate with the content, thereby allowing for dynamic advertisement creation "on the fly." In some embodiments, at least some interaction with content is pre-defined. As one non-limiting embodiment, interaction with content can comprise assigning a rating or ranking with the content according to a pre-defined scale. Moreover, although the foregoing systems and methods have been described with reference to insertion of 3D models in advertisements, in other embodiments, other personalized 2D or 3D representations can be used. In addition, in some embodiments, the creation of interactive advertisements is performed in real-time, while in other embodiments, the creation of interactive advertisements is server-based and is reproduced from memory storage.

While embodiments of the invention have been described in the context of generating a 3D model of the human head and animations associated with the human face, those skilled in the art should recognize, based on the disclosure herein, that any other 3D models and animations can be generated using the principles and techniques described herein, and that the foregoing is merely exemplary of a particular application of the invention and the invention is not limited to the face and head models described herein. Moreover, it should be understood that systems and methods disclosed herein are configured to transform data representing a 2D or 3D image into data representing a personalized 3D head model. Moreover, disclosed systems and methods can also transform 3D head model data in a first state for use in a second state (e.g., interactive advertising, personalized media content, interactive voice content).

The foregoing disclosure has oftentimes partitioned devices and systems into multiple modules (e.g., components, computers, servers) for ease of explanation. It is to be understood, however, that one or more modules may operate as a single unit. Conversely, a single module may comprise one or more subcomponents that are distributed throughout one or more locations. Furthermore, the communication between the modules may occur in a variety of ways, such as hardware implementations (e.g., over a network, serial interface, parallel interface, or internal bus), software implementations (e.g., database passing variables), or a combination of hardware and software. Moreover, in certain embodiments, the systems and methods described herein can advantageously be implemented using computer software, hardware, firmware, or any combination of software, hardware, and firmware.

Each of the processes, components, and algorithms described above can be embodied in, and fully automated by, code modules executed by one or more computers or computer processors. The code modules can be stored on any type of computer-readable medium or computer storage device.

The processes and algorithms can also be implemented partially or wholly in application-specific circuitry. The results of the disclosed processes and process steps can be stored, persistently or otherwise, in any type of computer storage. In one embodiment, the code modules can advantageously be configured to execute on one or more processors. In addition, the code modules can comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, or the like.

The various features and processes described above can be used independently of one another, or can be combined in various ways. All possible combinations and subcombinations are intended to fall within the scope of this disclosure. Indeed, the novel methods and systems described herein can be embodied in a variety of other forms; furthermore, various omissions, substitutions, and changes in the form of the methods and systems described herein can be made without departing from the spirit of the disclosure. The accompanying claims and their equivalents are intended to cover such forms or modifications as would fall within the scope and spirit of the disclosure.

What is claimed is:

1. A method for creating personalized media content having multiple content layers, the method comprising:
    receiving a selection from a user of prerecorded media content comprising multiple frames having at least a first character therein, the first character appearing in successive frames in an orientation and a size that may vary from frame to frame;
    receiving an individualized three-dimensional (3D) head model;
    receiving, from computer storage, template data associated with the prerecorded media content, the template data comprising for each of selected ones of the multiple frames:
        alignment data configured to cause positioning and sizing of the individualized 3D head model to substantially overlay and align with a head of the first character in the selected frame, and
        lighting data indicative of an illumination of the individualized 3D head model; and
    processing the prerecorded media content, the individualized 3D head model, and the template data to output personalized media content comprising a plurality of separate media layers, wherein a background layer of the plurality of media layers comprises the prerecorded media content, and wherein an intermediate layer of the plurality of media layers comprises the individualized 3D head model overlaying the background layer according to the alignment data for each of the selected frames and illuminated according to the lighting data for each of the selected frames such that the personalized media content displays the first character with the individualized 3D head model and with corresponding head orientation and size.

2. The method of claim 1, wherein the individualized 3D head model comprises a first individualized 3D head model, the method additionally comprising:
    receiving a second individualized 3D head model different than the first individualized 3D head model; and
    processing the prerecorded media content, the second individualized 3D head model, and the template data to output second personalized media content comprising the background layer and a second intermediate layer comprising the second individualized 3D head model overlaying the background layer according to the alignment data and illuminated according to the lighting data such that the second personalized media content displays the first character with the second individualized 3D head model.

3. The method of claim 1, wherein the plurality of media layers further comprises a foreground layer that overlays the intermediate layer.

4. The method of claim 3, wherein the foreground layer comprises masking content for display on top of the individualized 3D head model.

5. The method of claim 3, wherein the foreground layer designates portions of the individualized 3D head model in the intermediate layer as transparent such that the background layer is displayed through the designated portions.

6. The method of claim 1, wherein the personalized media content further comprises an audio track.

7. The method of claim 6, wherein the template data further comprises animation data for animating a mouth of the individualized 3D head model to correspond to the audio track.

8. The method of claim 6, additionally comprising receiving the audio track from the prerecorded media content.

9. The method of claim 8, wherein the prerecorded media content comprises video content.

10. A method for personalizing media content having multiple content layers, the method comprising:
    receiving prerecorded media content comprising multiple frames having at least a first character therein, the first character appearing in successive frames in an orientation and a size that may vary from frame to frame;
    accessing a three-dimensional (3D) human head model;
    for selected ones of the multiple frames, overlaying the 3D human head model on a head of the first character, wherein said overlaying comprises,
        generating alignment information indicative of a position and a scaling of the 3D human head model to substantially match the position and size of the head of the first character in the respective successive frames, and
        generating lighting information indicative of an illumination of the 3D human head model;
    storing, in a memory, template data comprising the alignment information and the lighting information for each of the selected frames, wherein the template data is associated with the prerecorded media content, and wherein the template data is stored separate from the prerecorded media content for subsequent playback with each of a plurality of personalized human head models different from the 3D human head mode;
    processing the prerecorded media content, an individualized 3D head model, and the template data to output personalized media content comprising a plurality of separate media layers, wherein a background layer of the plurality of media layers comprises the prerecorded media content, and wherein an intermediate layer of the plurality of media layers comprises the individualized 3D head model overlaying the background layer according to the alignment data for each of the selected frames and illuminated according to the lighting data for each of the selected frames such that the personalized media content displays the first character with the individualized 3D head model and with corresponding head orientation and size.

11. The method of claim 10, wherein the prerecorded media content further comprises an audio track.

12. The method of claim 11, wherein the template data further comprises animation data for animating a mouth of each of the plurality of personalized human head models to correspond to the audio track.

13. The method of claim 10, wherein said overlaying further comprises selecting an expression of the 3D human head model to correspond to the first character.

14. The method of claim 13, wherein the template data further identifies one or more blendshapes that correspond to each selected expression of the 3D human head model.

15. The method of claim 10, additionally comprising interpolating alignment information for the 3D human head model that corresponds to a frame between selected frames of the prerecorded media content.

16. The method of claim 10, wherein the prerecorded media content remains unchanged during generating and storing of the template data.

17. The method of claim 10, additionally comprising:
accessing a first personalized 3D head model; and
processing the prerecorded media content, the first personalized 3D head model, and the template data to output personalized media content comprising the first personalized 3D head model overlaying the prerecorded media content according to the alignment information and illuminated according to the lighting information such that the personalized media content displays the first character as having the first personalized 3D head model.

18. The method of claim 17, additionally comprising:
receiving a second personalized 3D head model different than the first personalized 3D head model; and
processing the prerecorded media content, the second personalized 3D head model, and the template data to output second personalized media content comprising the second personalized 3D head model overlaying the prerecorded media content according to the alignment information and illuminated according to the lighting information such that the second personalized media content displays the first character as having the second personalized 3D head model.

19. A system for generating personalized media content having multiple content layers, the system comprising:
means for receiving prerecorded media content comprising multiple frames having at least a first character therein, the first character appearing in successive frames in an orientation and a size that may vary from frame to frame;
means for overlaying a 3D human head model on a head of the first character for selected ones of the multiple frames, wherein said overlaying comprises,
generating alignment data indicative of a position of the 3D human head model to substantially match the position of the head of the first character in the respective successive frames,
generating lighting data indicative of an illumination of the 3D human head model;
means for storing template data comprising the alignment data and the lighting data for each of the selected frames, wherein the template data is associated with the prerecorded media content, and wherein the template data is stored separate from the prerecorded media content for later playback with at least one personalized human head model different from the 3D human head model; and
means for processing the prerecorded media content, the at least one personalized human head model, and the template data to output personalized media content comprising a plurality of separate media layers, wherein a background layer of the plurality of media layers comprises the prerecorded media content, and wherein an intermediate layer of the plurality of media layers comprises the at least one personalized human head model overlaying the background layer according to the alignment data for each of the selected frames and illuminated according to the lighting data for each of the selected frames such that the personalized media content displays the first character with the at least one personalized human head model and with corresponding head orientation and size.

20. The system of claim 19, further comprising means for selecting a facial expression for the 3D head model for each of the selected frames.

21. The method of claim 1, wherein the prerecorded media content comprises advertising content.

22. The method of claim 1, wherein the individualized 3D head model corresponds to a person relevant to a viewer of the prerecorded media content, thereby increasing the intrinsic relevance of the prerecorded media content.

23. The method of claim 22, wherein the individualized 3D head model corresponds to the viewer of the prerecorded media content.

24. The method of claim 22, wherein the person relevant to the viewer is determined by analyzing a buddy list, email history or chat history of the viewer.

25. The method of claim 10, wherein the prerecorded media content comprises advertising content.

26. The method of claim 10, wherein the 3D human head model corresponds to a person relevant to a viewer of the prerecorded media content, thereby increasing the intrinsic relevance of the prerecorded media content.

27. The method of claim 26, wherein the individualized 3D head model corresponds to the viewer of the prerecorded media content.

28. The method of claim 26, wherein the person relevant to the viewer is determined by analyzing a buddy list, email history or chat history of the viewer.

* * * * *